United States Patent [19]
Salecker et al.

[11] Patent Number: 5,875,679
[45] Date of Patent: Mar. 2, 1999

[54] APPARATUS AND METHOD FOR REGULATING A TORQUE TRANSMISSION SYSTEM WHICH OPERATES BETWEEN A DRIVING UNIT AND A TRANSMISSION

[75] Inventors: Michael Salecker, Bühl; Wolfgang Eismann, Stuttgart, both of Germany

[73] Assignee: Luk Getriebe-Systeme GmbH, Buhl/Banden, Germany

[21] Appl. No.: 708,096

[22] Filed: Aug. 26, 1996

Related U.S. Application Data

[63] Continuation of PCT/DE95/01861 Dec. 22, 1995 published as WO96/20363 Jul. 14, 1996.

[30] Foreign Application Priority Data

Dec. 24, 1994 [DE] Germany .......................... 44 46 517.3
Dec. 24, 1994 [DE] Germany .......................... 44 46 608.0
Jul. 14, 1995 [DE] Germany ........................ 195 25 717.0

[51] Int. Cl.$^6$ .............................. F16H 59/70; B60K 41/22
[52] U.S. Cl. .................................................................. 74/335
[58] Field of Search .................................................. 74/335

[56] References Cited

U.S. PATENT DOCUMENTS

| | | | |
|---|---|---|---|
| 3,682,013 | 8/1972 | Asbery | 74/335 |
| 4,660,430 | 4/1987 | Bortfeld et al. | 74/335 |
| 4,796,485 | 1/1989 | Ebina | 74/335 |
| 4,911,031 | 3/1990 | Yoshimura et al. | 74/335 |
| 4,912,997 | 4/1990 | Malcolm et al. | 74/335 |
| 5,281,902 | 1/1994 | Edelen et al. | 74/335 |
| 5,509,322 | 4/1996 | Anderson et al. | 74/335 |
| 5,566,582 | 10/1996 | Beadle et al. | 74/335 |

FOREIGN PATENT DOCUMENTS

| | | |
|---|---|---|
| 0 423 799 | 4/1991 | European Pat. Off. . |
| 2 707 360 | 1/1995 | France . |
| 42 33 983 | 4/1994 | Germany . |
| 43 41 729 | 6/1994 | Germany . |
| 2 159 217 | 11/1985 | United Kingdom . |
| 2 277 784 | 11/1994 | United Kingdom . |
| WO 90/04122 | 4/1990 | WIPO . |
| WO 91/11638 | 8/1991 | WIPO . |

OTHER PUBLICATIONS

Patent Abstracts of Japan: "Shift Lever Mechanism of Change Gear with Automatic Clutch", vol. 10, No. 132, p. 456.

Scott, David, "Footloose", Popular Science, Mar. 1988, No. 3, pp. 64–65.

PCT Search Report for PCT/DE95/01861.

*Primary Examiner*—Dirk Wright
*Attorney, Agent, or Firm*—Darby & Darby

[57] ABSTRACT

The operation of a clutch in the power train of a motor vehicle is regulated by an electronic control unit which receives signals from sensors and effects an engagement or partial or full disengagement of the clutch by way of an actuator. One of the sensors can monitor one or more parameters of a gear ratio selecting device for the change-speed transmission in the power train, and another sensor can monitor one or more parameters of an adjusting device which shifts the transmission into a selected gear. The control unit processes the incoming signals to ascertain the selected gear of the transmission and/or the driver's intent to shift the transmission into a particular gear, and operates the actuator for the clutch accordingly.

85 Claims, 24 Drawing Sheets

Fig.1

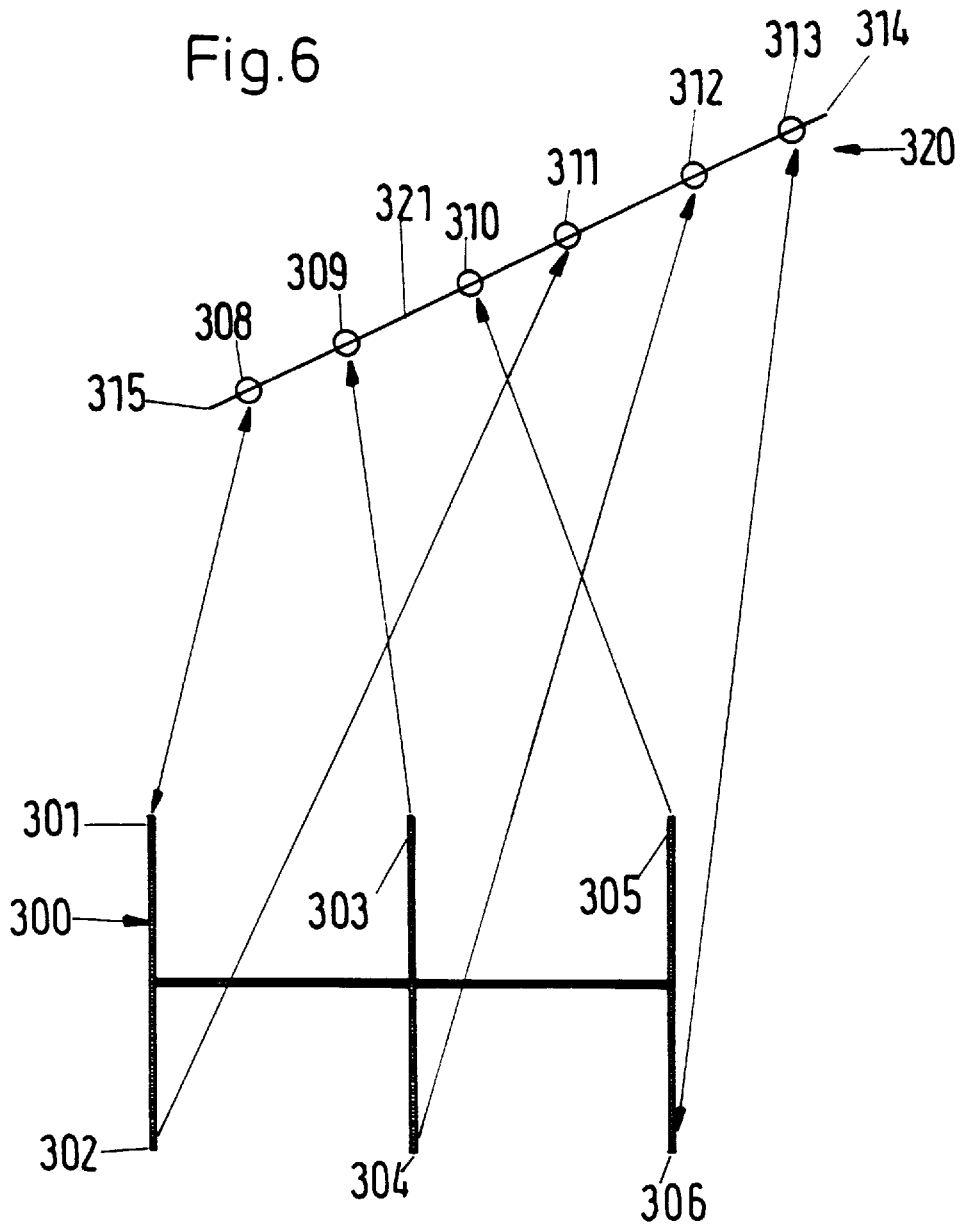

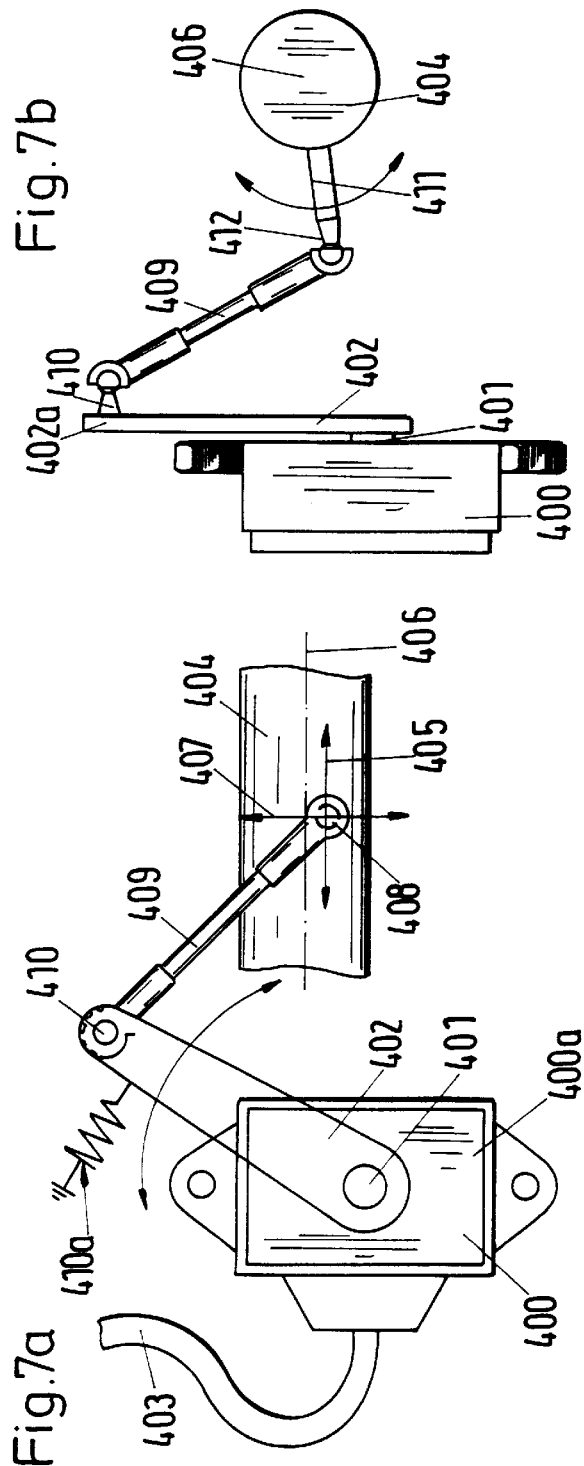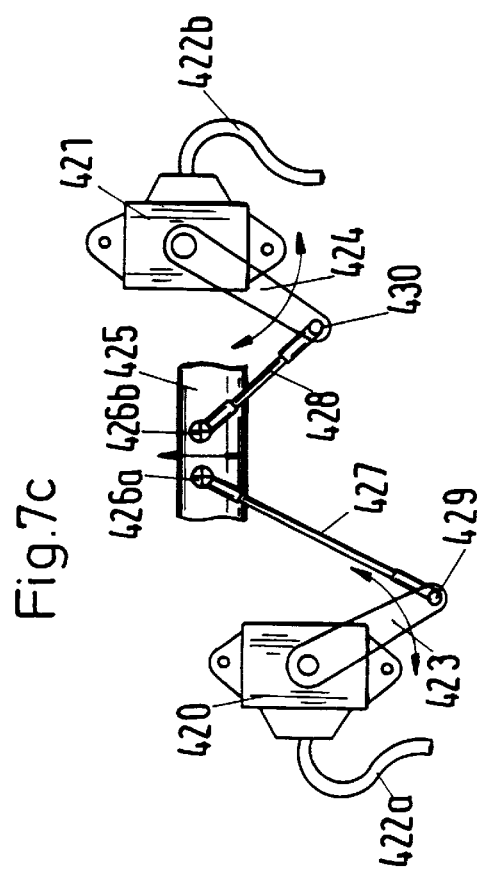

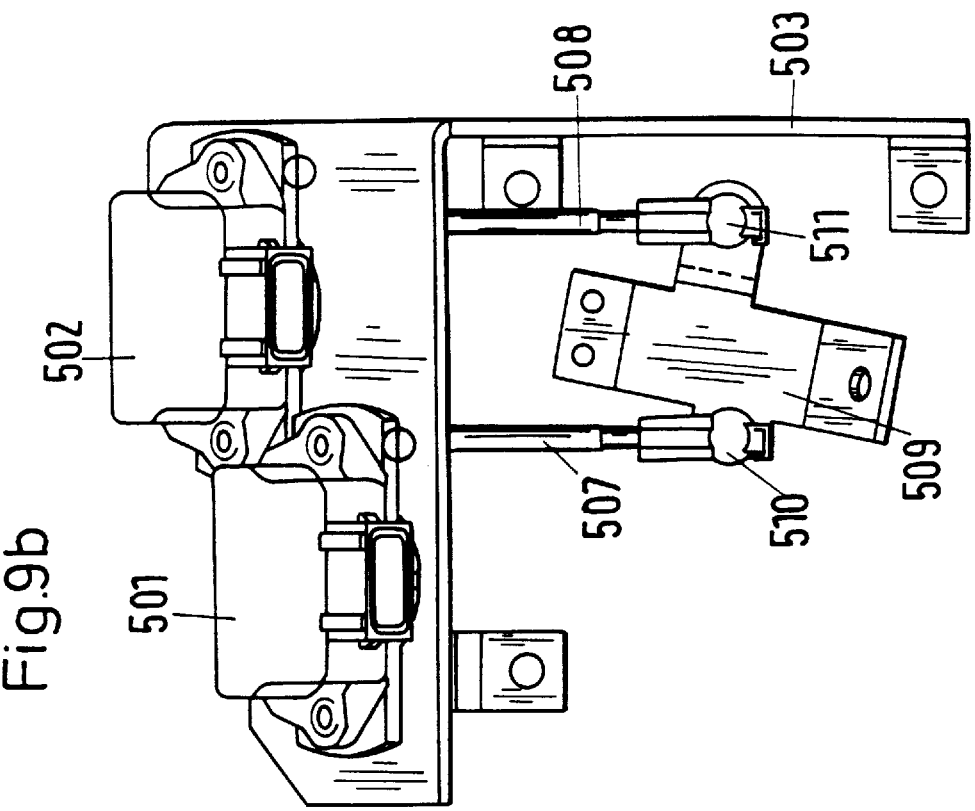
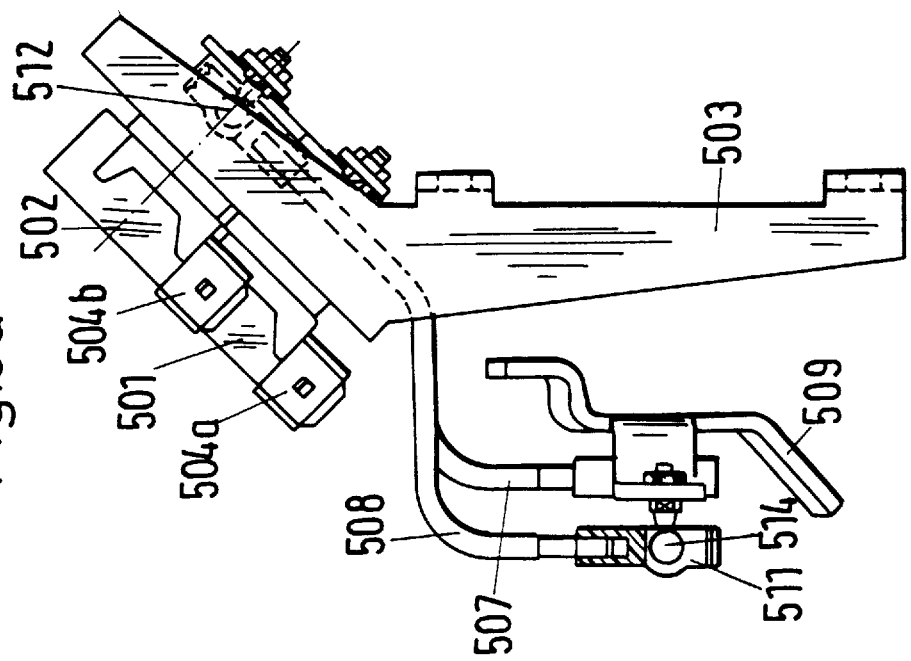

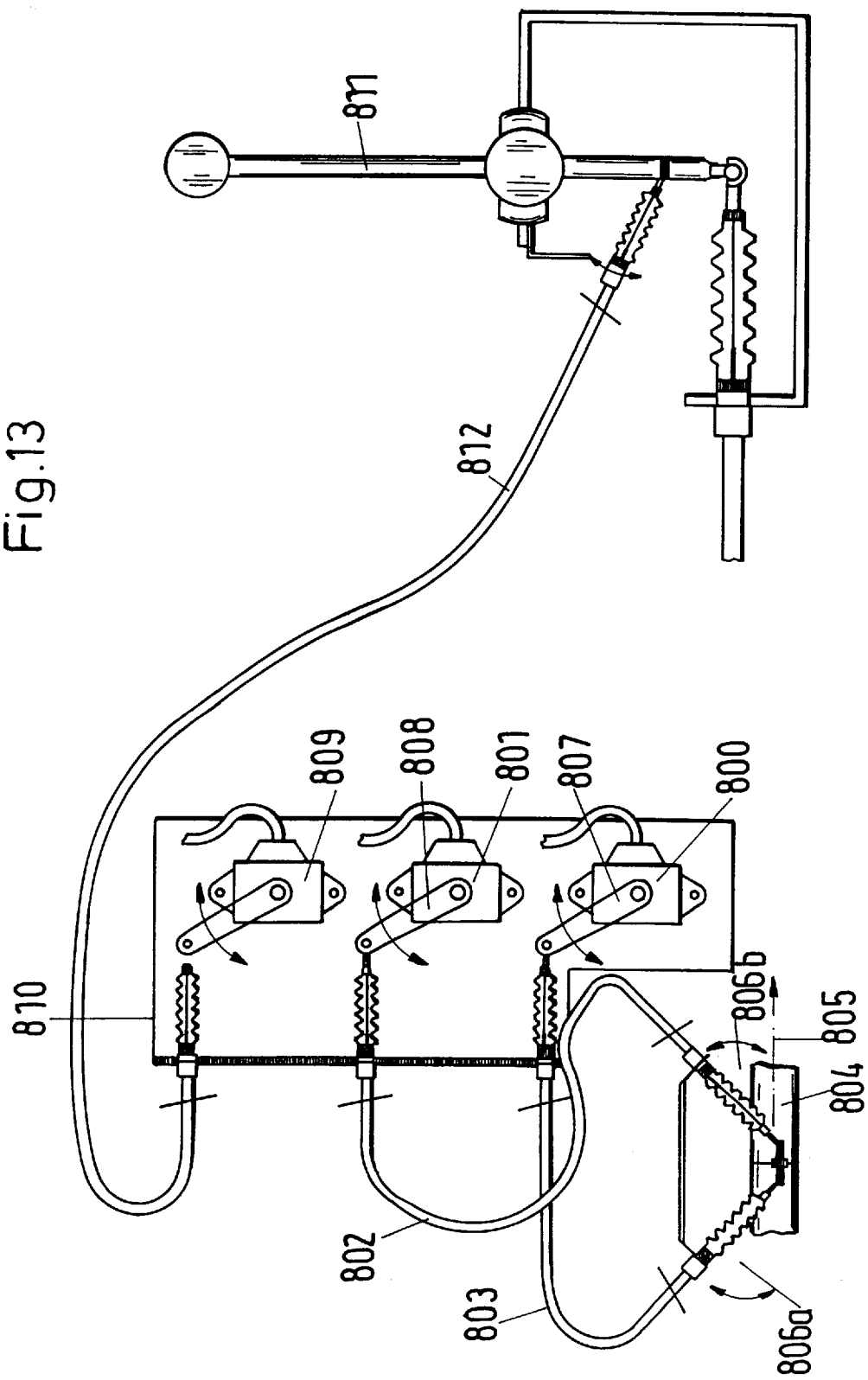

APPARATUS AND METHOD FOR REGULATING A TORQUE TRANSMISSION SYSTEM WHICH OPERATES BETWEEN A DRIVING UNIT AND A TRANSMISSION

CROSS-REFERENCE TO RELATED APPLICATIONS

This application is a continuation of International Application No. PCT/DE95/01861, with an international filing date of Dec. 22, 1995, now published as WO 96/20363 on Jul. 4, 1996.

BACKGROUND OF THE INVENTION

The invention relates to an apparatus for regulating a torque transmission system, such as a clutch or a friction clutch, a magnetic powder clutch or a torque converter lockup clutch, with a transmission having a gearshift mechanism and actuating means provided to shift the transmission into different gears as well as adjusting means provided at the transmission and connected with the actuating means, and a central control unit which receives and processes system parameters and measurement signals transmitted by sensors and controls or adjusts the regulation for the torque transmission system by way of an actuator or actor in dependency upon the operating point.

The invention further relates to a method for regulating a torque transmission system by way of a control unit and an actuator.

Furthermore, the invention relates to an apparatus for identifying and/or ascertaining and/or evaluating the positions or movements of adjusting means and/or actuating means, such as, e.g., shifting levers or selector shafts for the shifting of a transmission or a corresponding equipment, which are utilized for the practice of the novel method for controlling or regulating an automated friction clutch.

In connection with methods and/or apparatus of the above outlined character, U.S. Pat. Nos. 4,144,424, 4,183,424, 3,631,946, 3,741,035, 5,038,901 and 3,723,642 already disclose that, for the purposes of shifting intent recognition and hence for the recognition of the intended movement of a gear shift lever or an actuating means, one employs switches which, in the event of the application to the shifting lever of a force which is necessary to set the lever in motion, transmit a signal to the control system which is connected to their outputs. The aforementioned US patents further disclose that, for the purposes of identifying the selected transmission gear or of identifying the position of a gear shift lever or actuating means, one utilizes switches which are activated in the respective end positions of the switching range. Still further, the aforementioned US patents also disclose the utilization of potentiometers for the purpose of identifying an end position of an actuating means, such as a gear shift lever.

Furthermore, WO-OS 9111 638 discloses an apparatus wherein a gear position sensor is employed to distinguish between groups of gear shift positions.

OBJECTS OF THE INVENTION

An object of the invention is to provide an apparatus as well as a method of the above outlined character which render it possible to achieve an improved operation of an automated clutch, such as a friction clutch, due to an optimal and/or early shifting intent recognition and/or recognition of the selected gear.

Another object of the invention is to provide an apparatus and a method for identification of the selected gear and/or shifting intent which, due to a reduced number of parts and the nature of the chosen parts, reduce the outlay for the system and simplify the assembly.

Still further, an object of the invention is to simplify the apparatus and the method.

An additional object of the invention is to provide an improved redundancy regarding the sensors for the identification of the selected gear and shifting intent so that, in the event of a failure or another undesirable influencing of one or more sensors, the sensor or sensors which are still operative can take over at least a portion of the range of operation of the affected sensor or sensors or to ensure the establishment of an emergency operation in the event of adverse influencing of one or more sensors.

Another object of the invention is to provide an apparatus which renders it possible to detect and to process, at each time instant, the setting of the transmission and basically the entire gear shifting operation.

SUMMARY OF THE INVENTION

The objects of the invention in connection with the aforementioned apparatus and the aforementioned method are accomplished in that at least one sensor is directly or indirectly connected with, disposed at or linked to the actuating means, such as the gear selector lever, and at least one sensor is directly, or alternatively indirectly, connected with, disposed at or linked to an adjusting means, such as a central selector shaft, at the transmission. The sensors monitor the positions of the actuating and adjusting means, and at least the sensor which is linked to the actuating means ascertains at least one spatial dimension of the movement, such as for example the shifting or selecting movement, of the actuating means and at least one converting means transforms the two-dimensional movement of the adjusting means in the direction of the shifting and selecting movement into a unidimensional movement of at least one mobile means. The at least one sensor which is connected with the adjusting means by way of the converting means ascertains the unidimensional movement of the mobile means as a function of movement of the adjusting means.

Due to local separation of two sensors, such as for example, movement sensors, for the determination of the position of the actuating means and of the position of the adjusting means, the utilization of a system with a "soft" connection between the actuating means and the adjusting means, such as soft connecting means between the actuating means and the adjusting means, renders it possible to ensure that one achieves an improved operation of the aforementioned apparatus and that the above objects are accomplished.

If the connection between the actuating means and the adjusting means, such as between a gear shift lever and the central selector shaft, exhibits an elastic behavior, the movement of the adjusting means does not take place in immediate response to the movement of the actuating means because the elastic sections in the connecting path are upset or stretched in response to the application of a force.

According to the definition as used herein, the actuating means need not constitute only the gear selecting lever but can also embrace the connection from the gear selecting lever up to the "soft" connection or the elastic section of the path to the adjusting means. Thus, the actuating means can be connected with the adjusting means by the "soft" connection or by the elastic section.

The at least one sensor for detection at the actuating means, which can be connected with or linked to or operatively connected with the actuating means, renders it possible to directly ascertain very rapid movements of the actuating means without the development of a time delay or a localized lack of sharpness due to the presence of resilient or damping elements. The signal from the at least one sensor at the actuating means is thus very suitable for early observation or detection of a shifting intent because, when a gear shift is intended, the actuating means is set in motion in order to carry out a gear shift. The linking or connecting, or the establishment of an operative connection for, the sensor can also take place if one employs a contact-free sensor, even if no direct connection develops in such instance. Furthermore, a mechanical or operative connection can also be considered as constituting a coupling or linkage.

The linking of at least one sensor, such as for example a movement sensor, to the adjusting means which latter is directly connected, e.g., with the shifting sleeves of the transmission, is particularly suitable for the detection of the position, speed or acceleration of the adjusting means for the identification of the selected gear, i.e., for the detection of the actual setting of the transmission or the actual transmission ratio.

Due to the linking of at least one sensor to the actuating means and of at least one sensor to the adjusting means, or with a converting or transmitting means which is connected with the adjusting means, and assuming for example that one of the sensors is out of commission or defective, another sensor can be utilized to take over the tasks of the defective or inactive sensor at least to such an extent that one can, at the very least, establish the circumstances which are required for an emergency operation. The taking over of the task denotes that the signals contain the corresponding local information pertaining to the adjusting means or actuating means.

The objects are also accomplished in that, in an apparatus for regulating or controlling a torque transmission system, such as a clutch, with a transmission and a gearshift mechanism which can be designed to be essentially two-dimensional, and with an adjusting means which is provided to actuate or shift the transmission as well as with a transmission shifting or operating means which is connected with the adjusting means, with a central control or processing unit, such as an electronic computer unit, which receives and processes measurement signals and system parameters furnished by sensors, such as for example movement sensors, and which controls or regulates the actuation of the torque transmission system, at least one sensor is directly or indirectly linked to the actuating means and at least one sensor is linked to and/or disposed at the transmission adjusting means and/or monitors the position and/or the movement of the actuating and/or adjusting means. The sensor which is linked to and/or disposed at the actuating means monitors at least one spatial dimension of the movement, such as the shifting movement of the gear selecting means, of the actuating means and a converting means transtorms the two-dimensional movement of the adjusting means in the direction to shift and/or convert into a unidimensional movement of a mobile means, and the at least one sensor, which latter is linked to the adjusting means by the converting means and/or is disposed at the adjusting means, monitors the unidimensional movement of the mobile means as a function of movement of the adjusting means.

Furthermore, it can be of advantage if at least one sensor is directly or indirectly respectively linked to the actuating means and/or the transmission adjusting means and the position and/or the speed and/or the acceleration and/or the movement of the actuating and/or adjusting means is monitored and the sensor which is linked to the actuating means monitors a spatial dimension of the movement, such as the shifting or selecting movement, of the position and/or movement of the actuating means, and a converting means transforms the two-dimensional movement of the adjusting means in the direction of shifting and/or selection into a unidirectional movement of the mobile means, and the sensor which is linked to the adjusting means by way of the converting means monitors the unidimensional movement and/or the position of the mobile means as a function of the movement and/or the position of the adjusting means.

Furthermore, in accordance with the novel concept, one can put to use an apparatus for controlling or regulating a torque transmission system, such as an automated clutch, with an actuating means provided for the actuation or shifting of a transmission and a transmission adjusting means which is connected with the actuating means, with a central control- or processing unit which receives and processes measurement signals transmitted by sensors, such as for example movement or speed or acceleration sensors, and which controls or regulates the actuation of the torque transmission system. In this apparatus, at least one sensor directly and/or indirectly detects the position and/or the speed and/or the acceleration of the actuating means and/or the position and/or the speed and/or the acceleration of the adjusting means, and at least one signal from a sensor is employed to carry out the recognition of the selected gear of the transmission and/or a shifting intent recognition.

In addition, it can be of advantage if at least one sensor directly or indirectly monitors the position or the speed or acceleration of the actuating means or the adjusting means.

In accordance with the novel concept, it can be desirable if the control unit receives and processes the signals from the sensors as a function of time. It can also be of advantage to calculate timely functions from sensor signals, such as for example speed- or acceleration signals. For example, such timely function derivations can be carried out by digital procedures.

It can also be of advantage if the position, speed- or acceleration denoting signals which are generated by the sensor for the actuating means and by the sensor for the adjusting means are utilized to carry out a recognition of the selected transmission gear or a shifting intent recognition.

It is particularly advantageous if the control unit ascertains, by means of the signals which are transmitted by the sensors, that the actuating means is being operated in order to shift into a different gear and, during this stage of operation, the torque transmission system is actuated for the purpose of disengagement or the torque transmission system is disengaged by way of the adjusting means so that an interruption of the transmission of torque takes place.

Furthermore, it can be of advantage if the control unit ascertains the actual position of the adjusting means essentially during each and every time instant.

In this manner, the actually selected transmission gear or the movement in a direction toward a gear position can be detected at all times.

Still further, it can be of advantage if one sensor detects the position of the actuating means and two sensors detect the position of the adjusting means. At least one sensor is directly or indirectly linked to the adjusting means in such a way that a two-dimensional movement of the adjusting means is transformed into a unidimensional movement of a sensor element.

Furthermore, it can be of advantage for an apparatus according to the invention if a sensor detects the position of the actuating means and two sensors detect the position of the adjusting means, and each sensor detects a unidimensional movement of the adjusting means.

It can equally be of advantage if one sensor detects the position of the actuating means and two sensors directly or indirectly detect the position of the adjusting means and the movement-time relationships of the detected positions are processed by the control unit to ascertain the speeds or accelerations for the purpose of ascertaining the momentarily selected transmission gear or the shifting intent.

Basically, it can be of advantage if one sensor, such as a sensor for the actuating means which is directly or indirectly linked to the actuating means to monitor the position of the actuating means, detects the position of the actuating means along the shifting or gear selecting path and the central control unit utilizes such movement-time signal from the sensor for the actuating means to ascertain, in addition to the position signal, also the speed- or acceleration signals or filtered signals to utilize at least one of the e signals for recognition of the selected transmission gear or the shifting intent.

Still further, it can be of advantage if the position of the adjusting means for the transmission in the basically two-dimensional gearshift mechanism is transformed into a unidimensionally movable means and the position of such unidimensionally movable means is detected with assistance from the directly or indirectly linked sensor for the adjusting means and the control unit ascertains the position of the unidimensionally movable means as a function of the position of the adjusting means.

It can be equally advantageous if one sensor detects the position of the actuating means and two sensors detect the position of the adjusting means, and the movement-time relationships of the detected positions are utilized by the control unit to ascertain the movements, speeds and accelerations.

It can be of advantage if at least one sensor, such as the sensor for the actuating means which is directly or indirectly linked to the actuating means and/or is positioned at the actuating means monitors the position and/or the movement of the actuating means along a shifting or selecting path, and the central control- or processing unit utilizes the movement-time signal from the sensor for the actuating means to calculate and/or determine also the speed and/or the acceleration of the actuating means, and at least one of these signals is utilized to recognize the selected transmission gear and/or the shifting intent.

It can be of particular advantage if one sensor directly and/or indirectly detects and/or monitors the position and/or the speed and/or the acceleration of the actuating means and one sensor directly and/or indirectly detects and/or monitors the position and/or the speed and/or the acceleration of the adjusting means, and the thus obtained signals are utilized to carry out a determination of the momentary transmission gear and/or of the shifting intent.

Still further, it can be of advantage if the position of the adjusting means for the transmission, in the essentially two-dimensional gearshift mechanism of such transmission, is restored or transformed to the condition or position of a unidimensionally movable means and the position of such unidimensionally movable means is detected with assistance from the sensor which is directly or indirectly linked to and/or positioned to monitor the movement of the transmission adjusting means, and the control- or processing unit calculates or determines the position of the unidimensionally movable means and/or the speed and or the acceleration of the unidimensionally movable means as a function of the position and/or of the movement of the adjusting means.

Furthermore, it can be of advantage in an apparatus for detection and/or determination of the positions and/or movements of mobile parts, such as actuating means or adjusting means, for the operation, control and/or regulation of a vehicle with a torque transmission system, such as an automated clutch, to provide an actuating means for the selection of the gear of a transmission, an adjusting means for effecting the gear shift at the transmission, an operative connection between the actuating means and the adjusting means, a central control or processing unit receiving from sensors and processing measurement signals and signals denoting system input values, an actuator or actor being actuatable by the control unit to operate the clutch, and a sensor directly or indirectly connected with the actuating means or linked to or provided on the actuating means. The position, the speed or the acceleration of the actuating means along a basically unidimensional path, such as a gear shifting or a gear selecting path, is detected, and at least one converting means transforms the position, the speed or the acceleration of the adjusting means along a basically two-dimensional path of the adjusting means into a position, speed or acceleration of a basically unidirectionally movable means along a basically unidirectional path, and at least one sensor monitors the position, the movement, the speed or the acceleration of the basically unidimensionally movable means and, based upon an evaluation of the signals from the at least one sensor, the control unit carries out a recognition of the momentarily selected transmission gear and a recognition of shifting intent.

In practicing the invention, it can be desirable that the at least one converting means transform a basically two-dimensional movement of the adjusting means into a basically unidimensional movement of a mobile means and that at least one sensor detect the basically unidirectional movement of the mobile means as a function of movement of the adjusting means.

Furthermore, it might be desirable that the at least one converting means transform a basically two-dimensional translatory-rotary movement of the adjusting means into a basically unidimensional rotary movement of the mobile means and that at least one sensor detect such movement.

Still further, it can be of advantage that the at least one converting means transform a basically two-dimensional translatory movement of the adjusting means into a basically unidimensional translatory movement of a mobile means nd that at least one sensor detect such movement.

It is also of advantage that the at least one converting means transform a basically two-dimensional translatory movement of the adjusting means into a basically unidimensional rotary movement of a mobile means and that at least one sensor detect such movement.

It can also be of advantage that the at least one converting means transform a basically two-dimensional translatory movement of the adjusting means into a basically unidirectional translatory movement of a mobile means and that at least one sensor detect such movement.

Still further, it can be of advantage that the at least one converting means transform a basically two-dimensional rotary movement of the adjusting means into a basically unidimensional rotary or translatory movement of a mobile means, and that at least one sensor detect such movement.

An embodiment of the invention can be constructed in such a way that the converting means is constituted by a disc cam or a lobe and by an element which tracks the lobe.

It can also be of advantage if the converting means is constituted by at least one connecting means, such as a linkage or a Bowden wire, with at least one universal, cardan or spherical joint. The connecting means is articulately connected between the actuating means or the adjusting means and at least one sensor. Analogously, there can be provided between a sensor and the actuating means or the adjusting means a linkage or a Bowden wire which is movably mounted at both sides by way of spherical joints or universal joints or cardan joints so that it can transmit a movement.

Still further, it can be of advantage if a sensor is operatively connected with an adjusting means or an actuating means by way of a slider track. In another embodiment, it can be of advantage if a sensor is operatively connected with an adjusting means or with an actuating means by way of a straight-line mechanism or by way of a restraint.

Analogously, it can be of advantage if the actuating mans, such as a shifting lever, is coupled with a sensor by a linkage and there is provided between the sensor and the linkage, as well as between the linkage and the actuating means, a joint which allows relative movements of the individual elements. Analogously, it is of advantage if the linkage is connected with the sensor by a spherical-, universal- or cardan joint and with the shifting lever by means of a spherical- or universal joint but preferably by way of a cardan joint.

In accordance with a desirable embodiment of the invention, the converting means which is connected with the adjusting means comprises an abutment section which is contacted by a mobile means and the mobile means is operatively connected with at least one sensor serving to detect the position of the mobile means.

It is further of advantage if the mobile means which contacts the abutment section of the converting means is urged against the abutment section by resilient means. It is advisable that such resilient means be a spring, such as a coil spring, a hairspring, a leaf spring or an elastic medium of a plastic or polymeric material or a synthetic plastic.

It can be of particular advantage if the converting means comprises a portion which is connected with the adjusting means and which is form-lockingly connected with a mobile means, the latter being operatively connected with a sensor.

In accordance with a preferred embodiment of the invention, the abutment portion which is connected with the adjusting means is a cam disc or a lobe. It is particularly advantageous if the abutment portion which is connected with the adjusting means is a basically two-dimensional cam disc or a basically three-dimensional cam lobe. It can be of advantage if the cam disc or the cam lobe is provided with a surface which constitutes the abutment portion. It can be especially advantageous if the abutment portion is an arcuate surface or a sloping plane. Furthermore, the abutment portion can consist of a plurality of smaller surfaces or facets.

It can be of particular advantage if the abutment portion consists of a plurality of smaller surfaces with a gradual, such as continuous or steady, transition between the smaller surfaces.

In accordance with the inventive concept, it can also be of advantage to employ an apparatus with at least one transmission gear sensor for the detection of the actual transmission gear or of the actual transmission ratio out of a plurality of different gears or transmission ratios, the at least one sensor comprising a detecting means and a second means which cooperates with the detecting means, and at east one of these detecting and second means is movable relative to the other of the detecting and second means in a first direction and in a second direction which latter is disposed at least substantially at right angles to the first direction. Each transmission gear position is indicative of one position of the detecting and second means and the cooperation between the detecting and second means of the at least one sensor renders it possible to make available to the measuring means a signal which indicates which gear is in use or the location of the adjusting means in the gearshift. One of the detecting and second means of the at least one sensor comprises a cam disc, a cam lobe or a connection with joints for cooperation with a portion of the other means, the one means being connected with the adjusting means.

Furthermore, it can be especially advantageous if the cam disc is a two- or three-dimensional cam disc, such as a cam lobe.

Basically it can be desirable if the cam disc or the cam lobe is provided with surface regions which are connected to each other and such surface regions act as abutment portions.

It can be particularly advantageous if the cam disc or the cam lobe is provided with a continuous surface.

It can be of particular advantage in accordance with one embodiment of the invention if the connecting means between the actuating means or the adjusting means and at least one sensor constitutes a linkage, a Bowden wire or a tackle line. The, broad term "linkage" is to be understood to embrace also a differently constructed mechanical connection, such as for example a hydraulic connection.

It is particularly advantageous if the connecting means between a sensor and an actuating means is coupled by at least one mobile joint, such as a spherical joint, a cardan joint or a universal joint. Furthermore, it might be desirable if at least one sensor is directly or indirectly linked to an adjusting means or to an actuating means by means of a slider crank, or a straight-line mechanism or a restraint.

In accordance with a further inventive concept, it can be of advantage in an embodiment of the invention if two sensors are linked to the adjusting means in order to detect the shifting and selected paths, and each of the two sensors detects the two-dimensional movement of the adjusting means by way of a unidimensional sensor element. This means that the two-dimensional movement of the adjusting means is converted into a unidimensional movement of an element by resorting to a transformation, such as projection, and each of the sensors detects such unidimensional movement.

Furthermore, it can be of advantage if two sensors are linked to the adjusting means for detection of the shifting and selecting paths, and each sensor detects a unidimensional movement of the adjusting means along the selecting path or the shifting path.

In this embodiment, the linkage between the sensors is designed in such a way that only one component of the movement of the adjusting means acts upon the sensors so that the sensors can detect only a signal in the gear shifting direction or in the gear selecting direction.

In accordance with a further advantageous embodiment of the invention, it might be desirable if a sensor is linked to the actuating means, such as a shifting lever, by means of a linkage, and a connection including joints is established between the sensor and the linkage as well as between the linkage and the actuating means.

It can also be of advantage if at least one of the sensors, such as the sensor for the adjusting means or the sensor for the actuating means, is a rotary potentiometer or a linear potentiometer. Analogously, it can be of advantage if at least one of the sensors, such as the sensor for the adjusting means or the sensor for the actuating means, is a contactless sensor. Furthermore, each of these sensors can be a capacitive sensor or a resistive sensor or a magnetoresistive sensor or an inductive sensor or a Hall effect sensor and, furthermore, the sensors can also constitute optical or acoustic sensors such as for example infrared- or ultrasonic sensors or capacitively inductive sensors. An inductive sensor is a sensor which can detect speed-dependent values or parameters.

In accordance with a further novel concept, it can be of advantage if the sensors for the detection of the positions of the adjusting means and of the actuating means are installed in a housing or are assembled into groups of structural elements or into a structural unit, and the sensors are linked by means of Bowden wire or linkages.

It can also be of advantage if the control unit processes the incoming sensor signals and ascertains the actual condition on the basis of comparison with desired values and, upon recognition of a gear shifting operation which is initiated by the operator of the vehicle, disengages the clutch by way of the adjusting element, such as an actuator or actor, at least to such an extent that the transmissible torque disappears. In this context, the prevailing condition is the actual operating condition which is selected by the operational parameters. These are, for example, the engine RPM, the prevailing engine torque, the extent of engagement of the clutch, the selected setting of the transmission, the actual position of the actuating lever, the speed of the vehicle and additional operational parameters of the vehicle.

It can also be of advantage if the control unit processes the signals which are being transmitted by the sensors and recognizes the actual condition and, when the driver of the vehicle shifts the transmission into a different gear, the control unit recognizes on the basis of signals from the sensors that the shifting into a different gear is completed and engages the clutch by way of an adjusting element, such as an actuator or actor, in such a way that the clutch transmits at least a creeping torque.

It can also be of advantage if the shifting into a different gear is considered by the control unit as having been completed when a threshold value is either exceeded or reached.

It can be of particular advantage if the shifting into a different gear is considered to have been completed when a threshold value is either exceeded or reached and/or after expiration of a waiting period. The clutch is reengaged when the control unit considers the shifting into a different gear as having been completed. Under certain circumstances of operation, it might be advisable to engage the clutch to such an extent that at least a creeping moment is being transmitted and the extent of engagement of the clutch can also be controlled by other operational parameters. For example, if the position of the load lever upon completion of a shift into a different gear departs from a zero position, e.g., if the gas pedal is depressed, the clutch is engaged to an extent depending on the applied engine torque, e.g., the clutch can be fully engaged.

In selecting the sensors to be put to use, one can resort to local resolution or velocity- or acceleration resolution sensors or force sensors, and the already mentioned optical or acoustic sensors can be put to use in the form of contactless sensors. In this connection, one can resort, for example, to an infrared- or ultraviolet- or microwave sensor or to a sensor operating in the visible frequency range.

Furthermore, one can provide an ultrasonic sensor or an infrasonic sensor which cooperates or coacts with a further component, such as a reflector. However, it is also possible to resort to a system which does not employ a reflector if the component which is to be monitored can be utilized by itself as some sort of a reflector; under such circumstances, the sensor comprises a part which reflects the radiation and also comprises a further part which absorbs or detects the reflected radiation. In the case of an acoustic sensor, it can be of advantage if the source and the detector are assembled in a housing and, by reflecting against a mobile component, transmit various signals denoting different conditions and/or positions, and such signals render it possible to reach conclusions concerning the dependency upon the location. It is also possible to resort to pressure sensors as acceleration- or force sensors.

In accordance with a further inventive concept, it can be of particular advantage in a method for regulating a torque transmission system, such as a clutch, with a transmission having a basically two-dimensional gearshift mechanism and an actuating means which is provided to select the ratio of the transmission as well as a transmission adjusting means which is connected with the actuating means, and a central control unit, such as a computer unit which is in signal transmitting connection with sensors and, if necessary, other electronic units and which processes the incoming signals and transmits control signals to actuate the adjusting elements to change the torque adapted to be transmitted by the torque transmission system, if at least one sensor is directly or indirectly linked to each of the actuating means and the adjusting means and such sensors detect at least the positions of the actuating and adjusting means. A two-dimensional movement of the actuating- or adjusting means is detected by at least one unidimensionally operating sensor and, based on the signals from the sensors, the control unit ascertains the position, the speed or the acceleration of the adjusting means and of the actuating means and, based at least on such data, carries out a recognition of the momentary transmission gear or a recognition of shifting intent.

It can be equally advantageous if the signal sequence furnished by the sensor for the movements of the actuating means is utilized or applied for the identification of shifting intent.

An advantageous embodiment of the means for realizing the inventive concept can be designed in such a way that the position signal and/or the speed signal and/or the acceleration signal of the sensor for the actuating means is utilized for recognition or for the ascertainment of shifting intent.

Still further, it can be of advantage if a unidimensional position signal and/or speed signal and/or acceleration signal from the sensor for the actuating means is utilized for the recognition or for the ascertainment of a shifting intent, and/or the position- and/or movement signal of the actuating means and/or a processed signal, such as a speed- and/or acceleration signal from the sensor for the actuating means is utilized for the purposes of comparison with a reference signal in order to identify the shifting intent.

In accordance with the inventive concept, it can be equally advantageous if the position- and/or movement signal from the sensor at the actuating means and/or processed signals, such as a speed signal and/or an acceleration signal from the sensor for the actuating means, be utilized for the purposes of determination of the momentary transmission gear ratio.

Still further, it can be of advantage if the position- and/or the movement signal from the sensor at the actuating means and/or processed or derived signal, such as a speed signal and/or an acceleration signal from the sensor at the actuating means, is employed for the purposes of recognition of the momentary transmission gear ratio in the event of a failure or defectiveness of the sensor for the adjusting means.

Furthermore, it can be of advantage in accordance with the inventive concept if the position signal and/or the speed- and/or the acceleration signal from the sensor at the adjusting means be employed for the purposes of recognition of the momentary transmission ratio.

For advantageous realization of the inventive concept, the position signal and/or the speed- and/or the acceleration signal from the sensor at the adjusting means can be put to use for the recognition of the momentary transmission ratio on the basis of adaption of threshold values of the shifting path.

It can be of advantage if the position signal and/or the speed- and/or the acceleration signal from the sensor at the adjusting means is put to use for the purpose of recognition of the momentary transmission ratio by recognizing the threshold value of the shifting movement.

It can be equally advantageous if the position signal and/or the speed- and/or the acceleration signal from the sensor at the adjusting means be put to use for the recognition of the momentary transmission ratio by recognizing the threshold values of the shifting movement and/or for the recognition of the shifting intent by ascertaining the threshold values of the shifting movement.

Furthermore, it can be of advantage if the position signal and/or the speed signal and/or the acceleration signal from the sensor at the adjusting means is utilized for the recognition of shifting intent by adapting the threshold values of the shifting movement.

It can be of advantage for the realization of the inventive concept if the position signal and/or the speed- and/or the acceleration signal from the at least one sensor at the adjusting means is utilized for the recognition of the momentary transmission ratio, and the threshold values can vary from one ratio to another ratio.

Still further, it can be of advantage for the novel method if the position signal and/or the speed- and/or the acceleration signal from the sensor at the actuating means is utilized for the detection of specific physical positions of transmission parts at individual transmission gear ratios.

It can be equally advantageous if the determination of specific positions of transmission parts, as ascertained on the basis of the position-, speed- and/or acceleration signal from the at least one sensor at the adjusting means and/or the sensor for the distance covered by the actuating means be employed for the recognition of the momentary transmission ratio.

Furthermore, it can be of advantage if the position- and/or the speed- and/or the acceleration signal from the at least one sensor at the adjusting means is utilized for detection of specific physical positions of transmission parts at the individual transmission gear ratios.

It can be equally advantageous if the specific physical positions of the transmission parts constitute the synchronizing position and/or the position during engagement of the shifting teeth and/or the ratio idling position and/or the positions of overcoming the detents and/or neutral zones.

It can also be of advantage if the position signal and/or the speed- and/or the acceleration signal from the at least one sensor at the adjusting means be utilized for the detection of the respective synchronization position of the individual transmission gear ratios.

Furthermore, it can be of advantage for the novel method if the position signal and/or the speed- and/or the acceleration signal from the sensor at the actuating means is utilized for the detection of the respective synchronization position of the individual transmission gear ratios.

It can be of equal advantage if the ascertainment of the synchronization position, as determined on the basis of the position-, speed- and/or acceleration signal from the at least one sensor at the adjusting means and/or from the sensor for the movement of the actuating means, be utilized for recognition of the momentary transmission gear ratio.

It can be of advantage for the carrying out of the inventive concept if the position- and/or speed- and/or acceleration signal from the at least one sensor at the adjusting means is utilized for the calculation and/or determination of the transmission ratio, and it can be of equal advantage if the position- and/or speed- and/or acceleration signal from the at least one sensor at the adjusting means be utilized for the detection of the neutral position.

It is of advantage if, in order to realize the inventive concept, the position- and/or speed- and/or acceleration signal from the sensor at the actuating means is utilized for the detection of the neutral position, and it can be equally advantageous if the position- and/or speed- and/or acceleration signal from the at least one sensor at the adjusting means is utilized for the recognition of the selected gear ratio, for the recognition of the ratio and/or for the determination of the transmission gear ratio.

It is especially advantageous if, in accordance with the novel method, and in the novel apparatus, the control- or processing unit recognizes a defectiveness or a failure or anoter undesirable influencing of at least one sensor on the basis of the signals from the sensors or the absence of signals and/or other system input values and, in the event of a defectiveness or malfunction or failure of a sensor, such as a sensor for the actuating means or a sensor for the adjusting means, the control- or processing unit shifts to a controlling or regulating phase or stage in which the recognition of the ratio and the recognition of the shifting intent are carried out with the non-defective sensor within the framework of an emergency operation or a substitute strategy.

It is further of advantage if, in realizing the inventive concept, two unidimensionally operating sensors are employed to build a redundant detection- and monitoring system in order to ensure the recognition of the ratio and the recognition of the shifting intent and wherein emergency operation characteristics are maintained in the event of the failure or defectiveness of one sensor.

It is particularly desirable that, in the event of the failure or defectiveness or another adverse influencing of a sensor at the actuating means, the position signal and/or the speed- and/or the acceleration signal from the at least one sensor at the adjusting means be utilized for the recognition or for the determination of a shifting intent and/or that the position- and/or speed- and/or acceleration signal from a sensor at the actuating means be utilized for the recognition of the momentary ratio in the event of failure or defectiveness or another adverse influencing of the at least one sensor at the adjusting means.

In accordance with an advantageous aspect of the inventive concept, the failure or defectiveness or another adverse influencing of the sensor at the actuating means or of the at least one sensor at the adjusting means entails that the sensor which is still operative takes over or compensates for, at least in part, the range of functions of the defective sensor in order to ensure the establishment of an emergency operation.

In a desirable embodiment of the invention, it can be of advantage if the transformation of the two-dimensional movement of the adjusting means or of the actuating means into a unidimensional movement of a sensor element takes place by way of a lever, a linkage or a cam disc, a cam lobe or a transmission gearing or a Bowden wire. Furthermore, it-can be of advantage if at least one signal or the timely progress of a signal from a sensor is linked by an actuating means so as to enable the control unit to identify a shifting intent.

Furthermore, it can be of advantage if the position- or the speed- or the acceleration signal from the sensor which is linked to the actuating means is utilized by the control unit to recognize a shifting intent.

It can be equally advantageous if the position- or the movement signal or a processed signal from a sensor for the actuating means is utilized for the purposes of comparison with a reference signal from the control unit in order to identify a shifting intention.

In accordance with another advantageous embodiment, the position- or the movement signal from a sensor at the actuating means or a processed signal can be utilized for the recognition of the transmission gear ratio. Furthermore, it can be of advantage if the position- or movement signal from a sensor at the actuating means or a processed signal is utilized for the recognition of the transmission gear ratio in the event of failure or improper operation of a sensor or the adjusting means.

It can be equally advantageous if the position- and/or the speed- and/or the acceleration signal from at least one sensor which is linked to the adjusting means be utilized for the recognition of the transmission gear ratio.

Furthermore, it can be of particular advantage if the position-, speed- or acceleration signal from at least one sensor which cooperates with the adjusting means is utilized for the recognition of the transmission gear ratio by utilizing the threshold values of the shifting movement. Furthermore, by recognizing and adapting the threshold values of the shifting movement, such signal can be utilized for the recognition of the transmission gear ratio.

In a particularly advantageous manner, the position-, the speed- or the acceleration signal from the at least one sensor which cooperates with the adjusting means can be put to use for the purposes of recognizing the shifting intent by identifying the threshold values of the shifting movement. Still further, the recognition of shifting intention can be carried out by recognizing and adapting the threshold values of the shifting movement.

It can be of particular advantage if the position-, the speed- or the acceleration signal from at least one sensor which is tied to the adjusting means can be utilized for the recognition of the transmission gear ratio by identification and/or adaption of the threshold values and the threshold values vary from ratio to ratio.

Furthermore, it can be of advantage if the position-, the speed- or the acceleration signal from at least one sensor which is linked to the adjusting means is utilized for the detection of specific physical positions of transmission parts at different speed ratios.

In accordance with the inventive concept, it can be of advantage if the position-, the speed- or the acceleration signal from at least one sensor which is linked to the actuating means is utilized for the detection of specific physical positions of the transmission parts for individual ratios.

Still further, it can be particularly desirable if the ascertainment of specific physical parameters of transmission parts, as determined on the basis of position-, speed- or acceleration signal from at least one sensor at the adjusting means or at the actuating means, be put to use for the purposes of identification of the transmission gear ratio. It can be particularly advantageous if the specific physical positions of transmission parts constitute one of the positions including the synchronizing position, the position at the time of engagement of the shifting teeth, the gear idleness position, the position of overcoming the detent means or the position of the neutral range.

Furthermore, it can be of advantage if the position-, speed- or acceleration signal from at least one sensor which is linked to the actuating- or adjusting means is put to use for the determination of the transmission ratio or the neutral range.

In accordance with the inventive concept, it can be of advantage if, in the event of a damage to or malfunction of a sensor, such as a sensor for the actuating means or a sensor for the adjusting means, the control or calculating unit shifts to a control or regulating phase or stage in which the recognition of the transmission gear ratio and the recognition of the shifting intent are carried out by way of the non-affected sensor or sensors within the framework of an emergency operation.

Furthermore, it can be of advantage for the design of the novel apparatus and for the practice of the novel method if the control unit controls or regulates the transmissible torque.

In accordance with a further inventive concept, it can be desirable in an apparatus for use in a motor vehicle with a transmission and an actuating means for selection of the transmission ratio and an automated torque transmission system which is disposed in a power flow and which is operated by a control unit and an adjusting element, such as an actor, the actuating means being movably or pivotably mounted and being connected to a transmission adjusting means by at least one connecting means, if at least one sensor which is operatively connected with the actuating means or with the bearing for the actuating means detects a reaction force which is dependent upon the actuating force being applied to the actuating means and the control unit generates a shifting intent signal in dependency upon the signal from the at least one sensor.

Furthermore, it can be of advantage if the reaction force which is detected by a sensor in response to the application of an actuating force is being detected by the sensor in the region of the bearing for the lever forming part of the actuating means or in the region of the connection between the actuating means and the connecting means.

Furthermore, it can be of advantage if the sensor is disposed in the region of the bearing for the lever of the actuating means to detect the force acting between the actuating means and the bearing. It can also be of advantage if the sensor is disposed in the region of the bearing for the lever, such as a pivot bearing, to detect the force acting between the pivot bearing and the housing for the shifting lever.

It can also be of advantage if the sensor is disposed in the direct or indirect power flow between the actuating means and the connecting means in the region of an articulate connection for the connecting means.

It is desirable that a sensor be a pressure- or force responsive sensor or a distance monitoring sensor. It is particularly advantageous if a sensor is a capacitive, inductive or resistive sensor, a Hall effect sensor or a magnetic resistance sensor, a piezo- or a strain sensor. It can also be of advantage if a sensor is an analog or a digital sensor.

In an advantageous manner, a sensor can constitute a pressure measuring cell in an elastic surrounding, and it can be particularly advantageous if a sensor is a force measuring sensor within a synthetic plastic element, such as an elastomer or a rubber element.

Furthermore, it can be of advantage if, in the event of a failure or defectiveness or another adverse influencing of a sensor at the actuating means or of at least one sensor at the adjusting means, the still operative sensor or sensors take over or compensate, at least in part, for the operational range of the defective sensor or sensors in order to establish an emergency operation or an emergency setup.

Still further, it can be particularly advantageous if the sensors for the detection of the positions of the adjusting means and the actuating means are disposed in a housing in the form of a structural unit and the linking of the sensors takes place by way of Bowden wires and/or linkages.

Still further, it can be of advantage if an apparatus for automatic actuation of a clutch which is disposed between a prime mover (such as a combustion engine) and a change-speed transmission of a motor vehicle, with a manually operable shifting lever which is movable within a gearshift mechanism in two directions substantially at right angles to each other, with an adjusting element which forms part of the multi-stage transmission, which is connected with the shifting lever and which is movable in two dimensions and determines the stage of the multistage transmission, with sensors for the determination of the position of the actuating lever and/or the adjusting element as well as the operational parameters of the vehicle, and with a central control unit for the evaluation of signals which are generated by the sensors, in order to operate an actor for the clutch, is characterized in that a sensor assembly which is associated with the shifting lever ascertains the movement of the shifting lever in at least one of two possible directions which are substantially normal to each other, and in that a sensor assembly which is associated with the adjusting element determines the movements of the adjusting element in the two dimensions thereof.

BRIEF DESCRIPTION OF THE DRAWINGS

The invention will be explained in greater detail with reference to FIGS. 1 to 25. There are shown in:

FIG. 1 a schematic representation of a vehicle,

DESCRIPTION OF PREFERRED EMBODIMENTS

Figure 1:
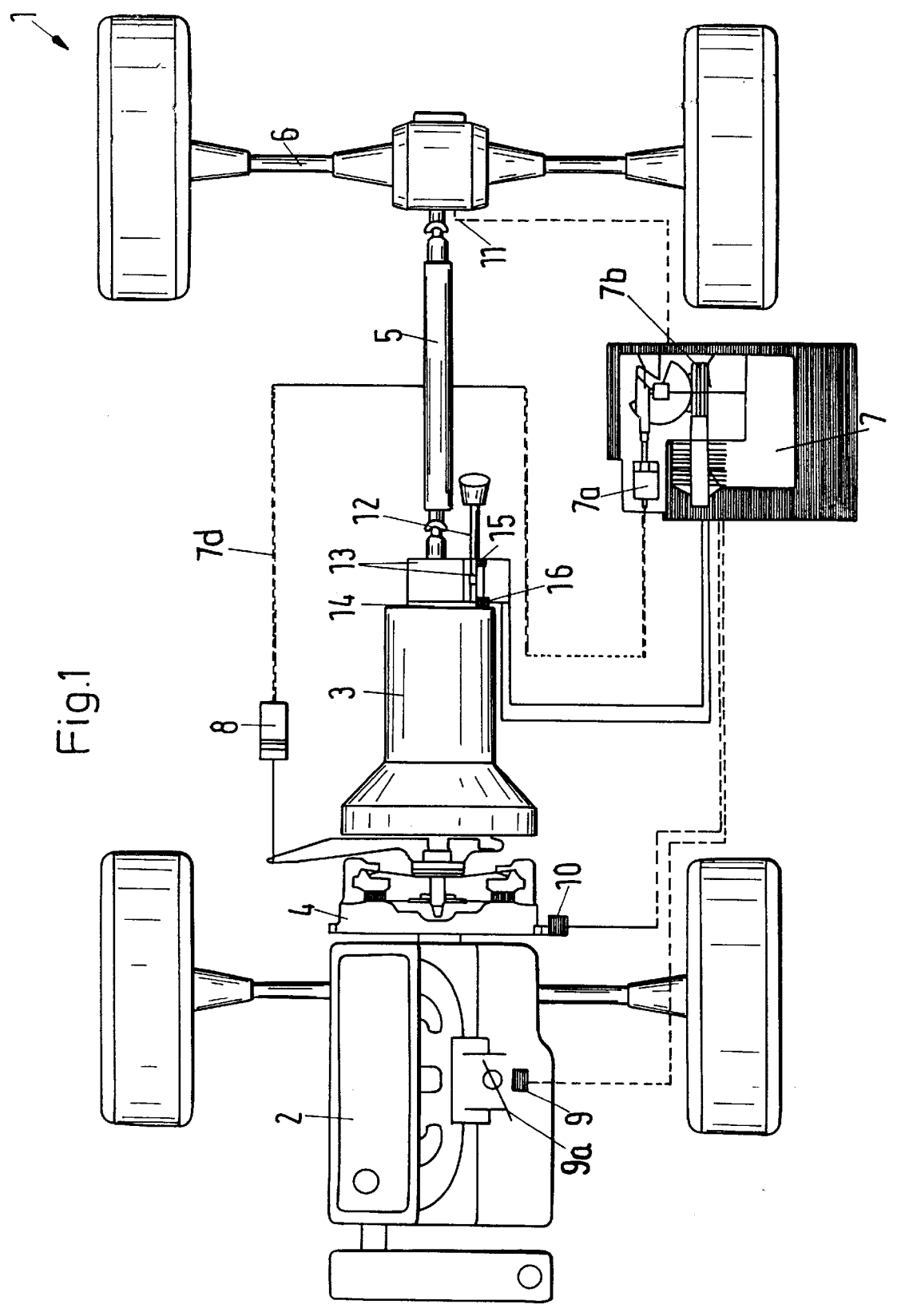
Figure 2A:
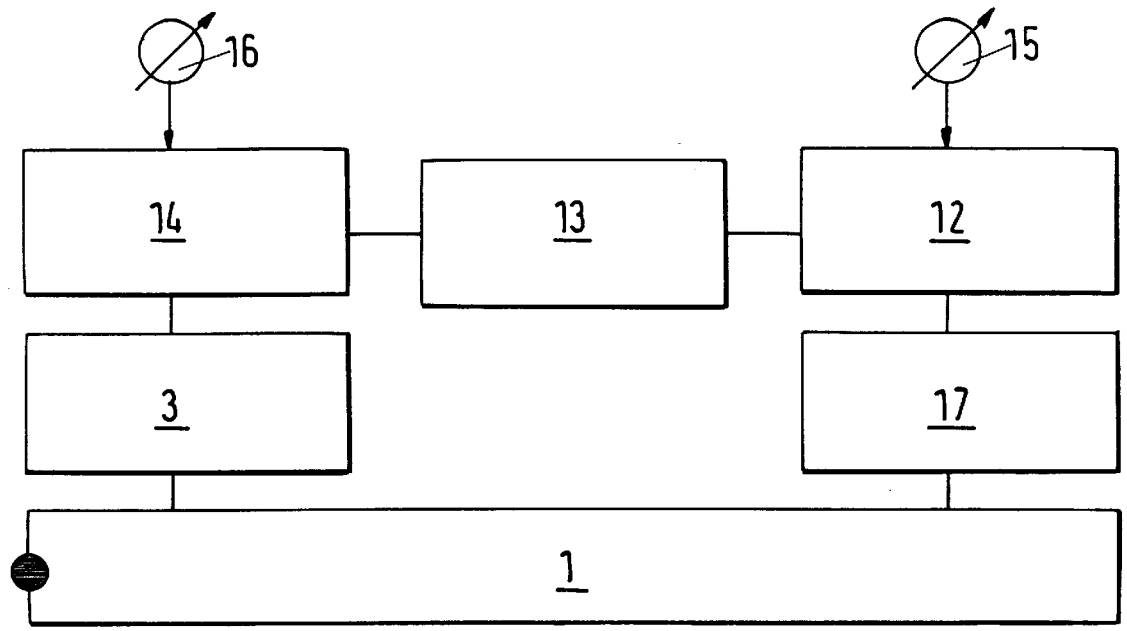
FIG. 2a a block diagram of a sensor assembly.

FIG. 1 shows schematically a vehicle 1 with the novel apparatus and the novel method put to use therein. The vehicle 1 comprises a combustion engine 2 and a transmission 3, a torque transmission system such as a clutch 4 being disposed between the engine and the transmission for regulated transmission of torque. An output shaft 5 of the transmission 3 is connected with a driven axle 6 of the vehicle 1.

The torque which the torque transmission system 4 can transmit can be selected and fixed between a zero value when the clutch is completely disengaged and a maximum value when the clutch is fully engaged. This means that, depending on the operating point, one can select a torque in the intermediate range between the two extreme values. The torque transmission system is actuated or adjusted by way of an adjusting element, such as an actuator or actor. For example, this actor is actuated in an electromechanical, electromotorical, hydraulic, magnetic or another manner, and one can resort to a movement- or force regulation or control in order to select the momentarily transmittable torque at the respective operating points.

A control unit 7, containing at least the power- and control electronics, controls or regulates in a planned manner the torque which can be transmitted by the torque transmission system, in this embodiment a planned action upon the clutch 4 to thus regulate the torque which the clutch should be capable of transmitting.

The control unit 7 is provided with an integrated computer unit and is in signal transmitting communication with sensors and/or other electronic units, such as for example, the control unit of the engine electronics. Furthermore, there can exist a signal transmitting connection with an antiblocking system (ABS) or an antislip regulatior (ASR). It can also be of advantage to establish a signal transmitting connection with a transmission control.

The control unit 7 receives signals from the sensors and contains one or more data storages or memories which can store information at least for short intervals of time and from which the stored information can be retrieved.

The signals can be processed, such as filtered, by way of implemented processes or algorithms.

The control unit further comprises a zone or subunit which ascertains the actual operating condition on the basis of incoming signals. Such ascertainment of the operating condition can take place on the basis of algorithms which are fixedly determined by hardware, or it can be realized by installed software.

The control unit 7 evaluates the incoming signals and, based on the implemented algorithms, carries out a control- or regulating procedure, or triggers such procedure, in order to actuate the torque transmission system 4 at each and every point of time in accordance with a predetermined program or a characteristic curve or a characteristic fied. If necessary, this can involve procedures such as measurement of system input values by resorting to sensors, transmission of sensor signals, furnishing data, time-dependent determination of measured values, calculation of data, storing information in and retrieving information from memories, calculation of desired values, comparison of actual and desired values, selection of desired values and controlling or regulating the desired values.

The regulation or control of the condition of engagement of the clutch, such as of the torque which can be transmitted by a torque transmission system 4, takes place by setting a desired value for an adjusting element which determines the extent of engagement of the clutch. For example, the adjusting element can be assigned a desired position by the control unit 7, and a sensor monitors the actual position during starting or during setting up the desired value.

In carrying out a control operation, the distance to be covered by the adjusting element is calculated in dependency upon the actual value and the desired value, starting from an actual position and a desired position of the adjusting element, and the adjusting element is actuated accordingly. In the case of a regulation, the condition of the clutch or the position of the adjusting element can be selected by resorting to a feedback of such parameter.

In accordance with another desirable procedure, one can realize a control with an implicit adaption of parameters. To this end, characteristic curves, characteristic fields or parameters of physical systems are stored and compared with and caused to conform to actual conditions in dependency upon various operating conditions and/or as a function of time. By resorting to such a procedure, one can take into consideration parameters which vary as a function of time, such as for example changes or shifts of the disengagement path which occur as a result of wear.

By resorting to a system with or without a feedback of measured values, one can realize a regulation or a control of the system with software- or hardware algorithms.

The control unit 7 furnishes desired values for the adjusting element and the desired condition of the clutch 4 is selected, and the transmissible torque is ascertained and set up, for example, as a result of adjustment by electrical means, hydraulic means or by way of electric motors.

The control unit 7 comprises a microprocessor which is operated with an internal clock pulse rendering it possible to simultaneously realize an internal electronic clock. As a rule, the data denoting the measured values are taken up in a pulsating fashion so that the data can be associated with the instant of determination and such information, too, can be memorized.

If the data values can be assigned a time index or a time instant, such data values or measured values can be processed with mathematical operations, as concerns the time, which are based on the presumption of a time sequence. For example, it is possible to ascertain a time-dependent derivation of the data by resorting to numerical procedures, such as difference quotients. Furthermore, it is possible to carry out a time-dependent integration of the measured values.

In particular, the control unit 7 renders it possible to calculate, on the basis of position signals or measured values, similar signals and/or measured values for the speed and/or the acceleration of a component part.

In accordance with a further embodiment of the invention, it is possible to provide or couple sensors which directly measure an acceleration or a force or a speed of a structural part without it being necessary to generate a speed- or acceleration signal from a position signal or a movement signal by way of calculations.

For example, the signals emitted by the control unit 7 and denoting the desired values are transmitted to a mechanical or hydraulic element, such as an actor with a master cylinder 7a, which, if a hydraulic element is employed, acts upon a hydraulic slave cylinder 8 to ensure a planned selection of the torque to be transmitted by the clutch 4 by way of a disengaging system, such as a disengaging fork, a mechanical or a hydraulic central disengaging means.

In the illustrated embodiment, the actor comprises the hydraulic master cylinder 7a with a mobile piston, and the position of the piston within the master cylinder 7a can be varied and fixed by way of an electromechanical actuator. In this embodiment, the electromechanical actuator consists of an electric motor with downstream worm gear and crank drives serving to drive a connecting rod. By controlling the electric motor, such as by turning it on or off or by changing the direction of its rotation, the position of the piston in the master cylinder 7a can be selected to any one of numerous positions within the possible operational or value range. In order to fix a thus selected position, it might suffice to turn off the motor if the transmission, such as a worm gear drive 7b, exhibits adequate self-locking characteristics. If such self-locking is insufficient, one can resort to a brake or to a transmission blocking system which can be turned on or off. It can be particularly advantageous for the system if the blocking can be effective within the entire operating range or only within partial ranges.

The adjustment of the position of the piston of the master cylinder 7a is transmitted to the piston of the slave cylinder 8 along a hydraulic path 7d to thus initiate the engagement of the clutch 4.

The position of the piston of the slave cylinder 8 is indicative of the extent of engagement of the clutch 4 and can be detected either directly or indirectly. For example, this can be effected by linking or by operatively connecting a sensor with the piston of the slave cylinder 8 or with the piston of the master cylinder 7a or with a further piston which is disposed in the fluid path 7d. A direct detection (either contact-free or by linking) of the position of the piston of the slave cylinder 8 can also be replaced by an indirect detection in that one detects the position of another element or piston and the position of the piston of the slave cylinder 8 can be calculated on the basis of such information and the characteristics of the hydraulic path 7d.

The actual operating condition of the torque transmission system 4 is ascertained with the signals which are being transmitted to the control unit 7, and a desired extent of engagement of the clutch of the system 4, and hence of the transmissible torque, is ascertained on the basis of software or hardware algorithms. The desired extent of engagement of the clutch is related to a desired value for actuation of the adjusting element, and such value can be calculated or can be retrieved from characteristic fields. The desired value is selected by regulation or control, for example, as a result of operating a motor. The regulation or control is implemented in the control unit 7 as software and, depending on the software, can operate as a control or as a regulator. Furthermore, the actuating can also be realized as hardware. The illustrated control unit 7 is connected with a sensor 9 for a throttle valve, with an engine RPM sensor 10 and a tachometer sensor 11 which is disposed at the driven axle 6. In addition, the control unit 7 can process further system input values such as are made available, for example, by way of a data bus.

The following signals, such as sensor signals or signals from other electronic units, can be utilized to operate the torque transmission system 4: the RPM of at least one wheel, engine torque, the RPM of the engine 2, the position of the throttle valve 9a, the position of the gas pedal, the speed of the vehicle, the oil temperature, the engine drag torque, the extent of engagement of the clutch of the system 4, the temperature in the space for the clutch, the temperature in the surrounding atmosphere, the torque of the compressor of the air conditioning system, the torque of the auxiliary aggregates, the duration of stoppage of the engine 2, the momentary gear of the transmission 3, the signal denoting the shifting intent, the signal which is indicative of the operation, position of the brake and position of the hand brake, a tempomat signal, a door sensor and/or a starter release signal.

For example, such signals can be furnished by the engine controls (motronics) or by an ABS system or by a transmission control.

The actuation or selection of a gear in the transmission 3 is carried out by an actuating means or element 12, such as a shifting lever. The actuating means 12 is connected with a setting or adjusting means 14 at the transmission by way of a connector 13. An actuating means sensor 15 is disposed at or linked with or connected to the actuating means 12 in such a way that it detects a position or a movement of the actuating means 12. An adjusting means sensor 16 is disposed at the adjusting means 14 to directly or indirectly detect the movement of the adjusting means. The information, i.e., the signals furnished by the sensors 15 and 16, is transmitted to the control unit 7 by way of signal transmitting connections such as data conductors or signal conductors.

The actuating means 12, such as a shifting lever which is mounted on or guided by a gearshift lug 17 (see FIG. 2a), is coupled to the adjusting means 14 for the transmission 3 by the connector 13. The gearshift lug 17 and the transmission 3 are individually connected with the vehicle 1. The connection which is established by the connector 13 can be realized between the adjusting means 14 which is coupled to the central selector shaft of the inner gearshift mechanism and the actuating means 12, such as the outer gearshift mechanism, and can be elastic or can operate with play. For example, the elastic components of the connector 13 can be installed in a planned manner in order to isolate vibrations between the central selector shaft of the inner gearshift mechanism and the outer gearshift mechanism. A play or clearance in the connector 13 can develop, for example, as a result of wear.

The connector 13 between the actuating means 12 and the adjusting means 14 for the transmission 3 can establish a rigid connection, for example, by employing levers, pipes, rods or braces. The basically two-dimensional movement of the actuating means 12 along the gear shifting and gear selecting paths is transformed into an equal movement of the connecting means 13 and, as such, is transmitted to the adjusting means 14.

A further possibility exists in the utilization of two connecting means 13, one connector for the transmission of movement along the gear selecting path and another connector for the transmission of movement along the gear shifting path. For example, such connectors can be realized by employing two Bowden wires.

Since the connector can employ resilient parts and/or can operate with play, the movement of the adjusting means 14 can precede or trail the movement of the actuating means 12. This means that the movement of the adjusting means 14 only indirectly follows the movement of the actuating means 12 so that a spatial shift can result between these two linked movements or that the movements of the component parts 12 and 14 do not take place in a coherent manner.

The novel apparatus with an arrangement of at least one sensor for the detection of the shifting movement and/or of the selection movement comprises the sensor 15 which is disposed at a point of the outer gearshift mechanism and serves to detect an at least unidimensional movement of the actuating means 12 at the outer gearshift mechanism.

The at least one sensor 16 for the adjusting means 14 is directly or indirectly linked to or at the central selector shaft of the inner gearshift mechanism of the transmission 3. The linking of the sensor 16 for the adjusting means 14 is carried out in such a manner that, for example, the two-dimensional movement of the adjusting means 14 is transferred or transformed into a unidirectional movement of a transmitting means and the unidimensional movement of a mobile means of the transmitting means is detected by a sensor.

Furthermore, it is possible to transform the two-dimensional movement of the adjusting means 14 into a unidimensional movement of a mobile means by way of a transmitting or transforming means. Such unidimensional movement, in turn, is detected by a unidimensionally acting sensor.

Thus, the sensor transmits a signal which is indicative of the components of movement of the adjusting means 14 in the direction of the shifting movement and in the direction of the gear selecting movement, i.e., there takes place a superimposition of movement informations into a signal. If two sensors are linked to the adjusting means, one embodiment can be assembled in such a way that at least one sensor detects a component of the shifting and selecting movement and the linkages of the two sensors are disposed at an angle to each other in order to ensure that the signals from the sensors are not identical. For example, the linkages for the two sensors can be normal to each other.

If one employs a unidimensionally operating sensor as a sensor for the adjusting means 14, the signal or the measured value is not to be unequivocally associated with a position of the adjusting means 14. Under such circumstances, when the signal can denote several parameters, it is possible to additionally evaluate the signal from the sensor for the actuating means 12 in order to unequivocally pinpoint the position of the adjusting means 14.

Furthermore, it is possible to arrange two sensors in such a way that one sensor detects the gear selecting movement and the other sensor detects the gear shifting movement.

In accordance with an advantageous embodiment, the transformation of the two-dimensional shifting scheme into the measuring range of a unidimensionally operating sensor can be carried out in the form of a projection. In this manner, it is possible for example to project two different positions in the shifting scheme onto one value of the value range of the sensor. This means that, in carrying out a gear recognition, a particular transmission gear setting cannot be unequivocally related to such a value.

The linking of the signal from the sensor for the adjusting means 14 with the signal from the sensor for the actuating means 12 can eliminate such lack of unequivocality. For example, let it be assumed that the sensor for the adjusting means 14 is linked in such a way that a gear shift position 2 and a gear shift position 3 in the shifting scheme of a gearshift mechanism furnish the same adjusting means sensor signal once the transformation is completed. Since the second gear is located in the rear region of one gear shifting track and the third gear is located in the front region of another gear shifting track, the sensor for the actuating means 12 can provide a signal which can indicate the front and rear positions so that one can distinguish the second gear from the third gear.

Figure 2B:
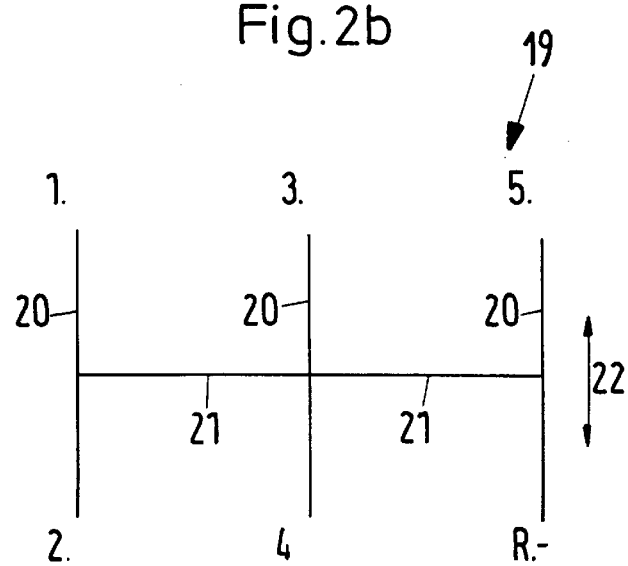
FIG. 2b a diagrammatic representation of a gearshift mechanism.

FIG. 2b shows schematically a gear shifting scheme of a gearshift mechanism in a transmission 3 wherein the individual gear shifting tracks are shown at 20, the shifting movement at 22 and the gear selecting movement at 21. The selecting movement 21 serves to select between the tracks 20, and the shifting movement 22 is the movement along the individual tracks 20. The illustrated standard shifting scheme for a motor vehicle is but one of numerous possible variations of shifting schemes for motor vehicles. In the illustrated embodiment, the movement of the actuating means along the track 20 in the shifting direction can lead to a selection between two gears. Thus, in the embodiment of FIG. 2b, the first and second gears are, for example, in the first track 20, the third and fourth gears are in the second track, and the fifth gear as well as the reverse gear are disposed in the third track. A selection of the gear to be shifted into can also be carried out by moving the actuating means 12 along the path 21 and along the selecting path.

Figure 3A:
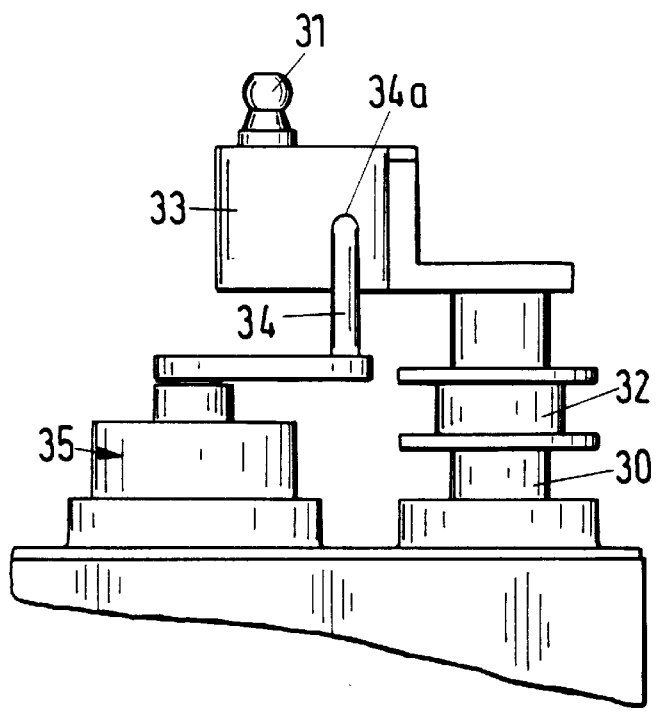
FIG. 3a an elevational view of one embodiment of the apparatus according to the invention, FIG. 3b a further elevational view of one embodiment of the apparatus according to the invention, FIG. 4 the gear positions in the signal from the sensor for the movements of the actuating means, FIG. 5 the gear position in the signal from the sensor for the movements of the adjusting means and the shifting diagram of a transmission in a motor vehicle, FIG. 6 the gear position in the signal from the sensor for the movements of the adjusting means and the shifting diagram of a transmission, FIG. 7a an example of linking a sensor, FIG. 7b an elevational view of a sensor linkage, FIG. 7c an elevational view of linkages for two sensors, FIG. 8 an array of sensors, FIG. 9a an array of sensors in a side elevational view, FIG. 9b an array of sensors in a plan view, FIG. 10a a schematically illustrated linking of two sensors, FIG. 10b a schematically illustrated linking of two sensors, FIG. 11 a linking of a sensor to the actuating means, FIG. 12a a linking of a sensor to the actuating means, FIG. 12b a linking of a sensor to the actuating means, FIG. 13 a schematic representation of linking of two sensors at the actuating means and at the adjusting means, FIG. 14 a block diagram.
Figure 3B:
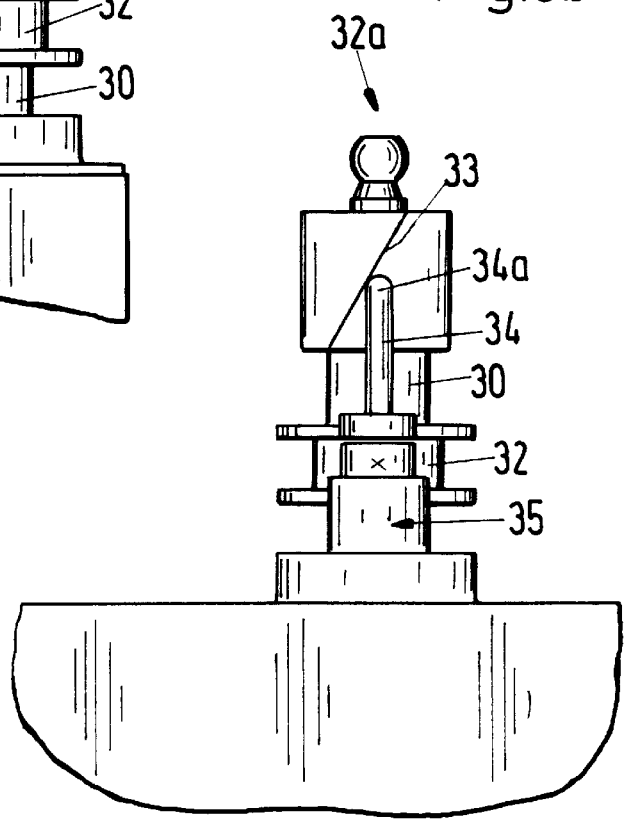

FIGS. 3a and 3b show an embodiment of the novel apparatus which transforms a two-dimensional movement of the adjusting means 14 into a unidimensional movement of a mobile means by way of a transferring or transforming means, and the unidimensional movement is detected or monitored by a unidimensionally operating distance or movement sensor 35.

FIG. 3a shows that portion of one embodiment of the novel apparatus wherein a central selector shaft 30 can be set in rotary motion, through a predetermined maximum angle, by a shifting or selecting link or lug 31 in the course of a gear shifting operation. The selecting lug or link 32 is acted upon in a vertical direction during selection of the shifting tracks 20 so that the selector shaft 30 is compelled to carry out an axial movement. Owing to the combination of linkages for the selection of and for shifting into a particular gear, the shaft 30 is compelled to carry out a combined rotary-translatory movement, such as a rotary- and/or axial movement, in the course of a gear selecting operation. The linking of the sensor 35, such as a potentiometer, takes place in the illustrated embodiment by way of a cam disc or a cam lobe 33 which is force- and form-lockingly engaged by a lever 34. The engagement of the lever 34 of the sensor 35 with the cam disc 33 can be effected by resorting to a spring in order to ensure an uninterrupted contact between the lever 34 and the cam disc 33. The spring can be disposed in the interior of the sensor housing.

In the embodiment which is shown in FIGS. 3a and 3b, a follower 34a of the lever 34 can be said to constitute a link or to establish a linking zone the position or movement of which serves to monitor the movement of the adjusting means 14. If the cam disc 33 is moved as a result of a rotary movement about the axis 32a, the engagement zone at 33/34a, and hence the lever 34, are caused to carry out a corresponding movement. An axial movement of the link or lug 32 results in an axial movement of the dam disc 33 and hence also in a movement of the follower 34a.

A translatory-rotary movement of the adjusting means (30, 32) results, in the illustrated embodiment, in a rotary movement of the lever 34 which is connected with the unidirectionally movable input part of the sensor 35.

The cam disc or cam lobe 33 which is illustrated in FIGS. 3a and 3b serves as an abutment for the lever 34 can be provided with an inclined flat surface, see FIG. 3b. The ratio between the maximum angular displacement of the shaft 30 and the slope of the cam disc or cam lobe 33 serves to establish the spacing of signals for the individual signal values denoting the various gears of the transmission 3.

If the surface of the cam disc 33 is not flat, for example, if the surface is curved, the distances between the values denoting various gears in the signal from the sensor 35 for the adjusting means 14 are no longer uniform. Thus, by selecting the shape or the surface of the cam disc or cam lobe 33, one can select the shape of the signal from the sensor 35 for the adjusting means and hence also the spacing between the values of signals denoting the various transmission gears as well as the sequence of the respective signal values associated with various gears of the transmission 3.

It is of advantage to design the cam disc or cam lobe 33 in such a way that a continuous measurement of the movement can take place, namely that each change of the position of the cam disc or cam lobe 33 is followed by a change of the signal from the sensor 35. Thus, the transferring means is then compelled to ensure a continuous transmission rather than merely placing at disposal individual portions of one and the same signal for the individual gears of the transmission 3.

Figure 4:
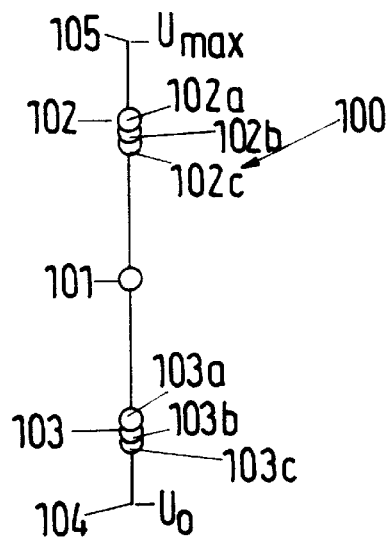

FIG. 4 illustrates the positions of the actuating means 12 by way of the signals from the sensor for the actuating means. The positions of the actuating means 12 can represent the positions of a gear shift lever in the motor vehicle 1, and parts or portions of the positions of the gear shift lever of the actuating means 12 correspond to the positions of the selected gears.

The signal 100 from the sensor 15 for the actuating means 12 has a band width between the minimum signal $U_o$ 104 and the maximum signal $U_{max}$ 105. Within the signal range between the extreme values $U_o$ and $U_{max}$ (104, 105), there are disposed those signals from the sensor 15 for the actuating means 12, such as a sensor which is linked to the gear shift lever, which can be assumed by the actuating means 12, such as the gear shift lever, or through which the gear shift lever passes, in various gears of the transmission when the actuating means 12 is set in motion.

In this embodiment, the signal 100 from the sensor 15 for the actuating means 12 exhibits a unidimensional characteristic. The unidimensional characteristic of the signal from the sensor 15 for the actuating means 12, which is shown in FIG. 4, denotes the movement of the actuating means 12 along the shifting tracks 20 within the gearshift mechanism without taking into consideration the movements along the selector paths 21 such as take place in connection with those movements of the actuating means 12 which involve a shift from one shifting track 20 to another track.

The movement signal 100 cannot always furnish a direct indication of the selected shifting track 20 because the changeover to a different shifting track 20 cannot be unequivocally detected with the signal 100. An evaluation of the signal 100 as a function of time and/or possible time-dependent derivations of the signal 100 render it possible to reach conclusions concerning a shift between different tracks 20, and this can be ascertained by the control unit 7.

In the case of a movement from one shifting track to another, there takes place a phase or stage of movement of the actuating means which is nearly zero along the gear shifting path 22. When the control unit 7 evaluates the signal from the sensor 15 for the actuating means 12, the afore-discussed change of shifting tracks 20 can be identified on the basis of comparisons of the durations of the signal.

The selected gear can be ascertained when the position of the adjusting means 14 is unequivocally determined on the basis of the data furnished by the sensor 16 for the adjusting means 14 and the sensor 15 for the actuating means 12. Furthermore, in the event of a time-dependent detection of the respective positions, it is possible to rapidly ascertain the gear into which the transmission 3 was shifted before the gear shifting operation is competed.

If a sensor 15 is linked to the actuating means 12 in such a way that the selecting path is also detected, one can carry out an unequivocal recognition of the selected transmission gear by way of the signal from the sensor 15 for the actuating means 12. For example, such linking can take place by way of a joint which connects the sensor 15 with the actuating means 12 by a lever.

The control unit 7 with an implemented control- or regulating procedure can carry out a method step which renders it possible to ascertain various synchronizing positions of the individual gear ratios on the basis of the movements of the actuating means 12 and the adjusting means 14 as a function of time to thereupon recognize the selected gear on the basis of such positions and, furthermore, can also recognize the actually selected shifting track 20.

A signal having a value corresponding to the position 101 of the signal 100 from the sensor 15 for the actuating means 12 denotes the neutral position of the actuating means. Those signals from the sensor 15 for the actuating means 12 which are consolidated at 102 denote the values of the signal from the sensor 15 for the actuating means 12 at the selected gears 2, 4 or the reverse gear, and those signals from the sensor 15 for the actuating means 12 which are consolidated at 103 denote the positions of the actuating means at the selected gear 1, 3 or 5 if one resorts, for example, to the gearshift mechanism 19 shown in FIG. 2b.

If the gearshift mechanism is different from that shown at 19 in FIG. 2b, the various transmission gears depart from the aforedescribed positions accordingly. The signals which are consolidated in the signal range 102 denote gear ratios necessitating a movement of the actuating means 12 in one direction in order to select one of the corresponding gear ratios. On the other hand, the signals which are consolidated in the signal region 103 necessitate a movement of the actuating means 12 in another direction.

Thus, the signals 102a to 102c and 103a to 103c which are respectively assembled into the groups 102 and 103 denote the positions of the actuating means 12 within the gearshift mechanism 19 which, as considered from the neutral region, necessitate a movement in one direction (upwardly) or in another direction (downwardly). The positions of the actuating means 12 in the gear 1, 3 or 5 in the respectively engaged condition of the transmission 3 can or are likely to depart from each other due to the selected design and tolerances of the transmission, and this can also be the case in connection with the gears 2, 4 and reverse. Such potentially different positions can be detected and/or adaptively ascertained to be utilized for the recognition of the selected gears. This means that, by recognizing the locus of the synchronizing position, it is possible to detect a value which is characteristic for a particular gear and this renders it possible to carry out a detection of the selected gear.

The exact values of the synchronized positions can vary during the life span of the vehicle 1 or they can change, and such variations or changes can be monitored and taken into consideration for the purposes of identification of the selected gear. Such an adaption can take place under a variety of operating conditions.

The detection of the movement of the actuating means 12 along the shifting path by the sensor 15 for the actuating means can involve the detection of the movement of the actuating means from one position to another position. A discrimination between the various gears which are assembled into the groups 102 and 103 can take place by way of different synchronized positions and/or end positions of the actuating means 12. Furthermore, it is possible to achieve an unequivocal association or identification in cooperation with the signal from the sensor 16 for the adjusting means 14.

The synchronizing position or the end zones of the tracks or the end positions can be ascertained on the basis of time-dependent analysis of the respective signals. If the actuating means 12 is moved or shifted in a direction toward a specific gear and advances beyond the synchronizing position or beyond the detent position, this entails a short-lasting altered distance-time behavior of the signals from the sensor 15 because, when the actuating means 12 reaches the aforementioned positions, it is subjected to the action of additional forces which alter the distance-time relationship. The exact nature of such forces is dependent upon the design of the transmission 3.

For example, a change of the slope of the distance-time signal can be ascertained by the control unit 7 to be identified as one of the aforementioned characteristic features. One can refer, by way of example, to FIG. 15 which illustrates a distance-time relationship.

A shifting intent can also be ascertained on the basis of signals from sensors, and one can resort to any one of a variety of procedures intended to facilitate a recognition of shifting intention. One possibility consists in that one can monitor the signals which are transmitted by the sensors, or at least the signal from one sensor and, based on a change of the signal as a function of time, one establishes an indication, such as a signal, for an intended movement. For example, if the actuating means 12 is basically at a standstill and a sensor 15 detects, starting at an instant $t_o$, a changed position of the actuating means 12, this can be indicative of a shifting intent. It is also possible that a shifting intent exists in the event that a threshold value, which is not in the range of the position of standstill, is exceeded for the position or the speed or the acceleration of the actuating means 12.

In such an event, the control unit 7 compares the value of the signal from the sensor 15 with a value which is stored in a memory and, when the value of the signal exceeds or is less than the memorized value, this constitutes a recognition of a shifting intent and the clutch of the system 4 is actuated by the control unit 7, by way of the adjusting means 14, in such a way that the clutch is disengaged in order to permit the carrying out of a shifting operation.

In the event of a recognition of shifting intent, it is of advantage if the incoming signals are evaluated in such a way that a vibration of the shifting lever due to vibrations in the vehicle 1 does not cause the generation of a shifting intent signal.

If a shifting intent signal is registered in the control unit 7, the clutch of the system 4 is disengaged to such an extent, namely the adjusting means 14 receives such a desired value signal, that no torque is being transmitted and a shift into a different transmission gear can take place.

The time-dependent derivations of the movement of the actuating means 12, which can be ascertained on the basis of the distance-time signal from the sensor 15 for the actuating means 12 and correspond to the speed of the acceleration of the actuating means, render it possible to recognize an intended movement of the actuating means, i.e., shifting intent recognition. The shifting intent recognition or the recognition of an intended movement of the actuating means 12 can be achieved on the basis of a comparison of changes of the position of the actuating means as a function of time or on the basis of changes of the speed or the acceleration of the actuating means in comparison with reference values, and the reference values can be ascertained adaptively and/or can be predetermined.

The recognition of a selected gear can also be carried out with a signal in dependency upon the distance covered by the actuating means 12, the speed of the actuating means and/or the acceleration of the actuating means, and such signals can be ascertained on the basis of a processed and/or filtered and/or added up signal.

It is particularly advantageous if one can achieve an early recognition of the intention to shift into a particular gear, namely in the course of the shifting operation. In this manner, it is possible to ascertain, in good time, the force and the speed with and at which the clutch of the system 4 must be engaged in order to optimally adjust or to prevent, in a selected gear, the slippage between the driving and driven sides of the clutch. Early recognition of the actual gear renders it possible to carry out a comfortable clutch engaging operation. By resorting to a continuous monitoring of the adjusting means 14 or of the actuating means 12, any changes in the positions of such means can be registered at all times. By substantially continuously monitoring the movements and/or the distances covered by such means 12 and/or 14, one can not only detect the end positions but one can also recognize each intermediate position at any time instant. Such continuous or steady detection of the positions of the adjusting means 14 and/or the actuating means 12 renders it necessary to employ sensors (such as 15 and/or 16) which operate substantially continuously within the useful movement or distance range.

In accordance with the novel method of recognizing a shifting intent, the controlling procedure can distinguish, on the basis of changes of signals from the sensor 15 for the actuating means 12 as a function of time or on the basis of time-dependent derivations arrived at therefrom, whether the change of the position of the actuating means 12 is desirable, i.e., whether or not a genuine shifting intent exists, or whether the change of the position of the actuating means 12 was not intended such as, for example, a change which is attributable to the transmission of vibrations from the motor vehicle 1 to the actuating means 12.

Furthermore, it is possible, on the basis of characteristic vibrations of the actuating means 12, to distinguish whether or not the actuating means exhibits a changed vibrational behavior, e.g., such as can be caused by placing a hand thereon.

Figure 5:
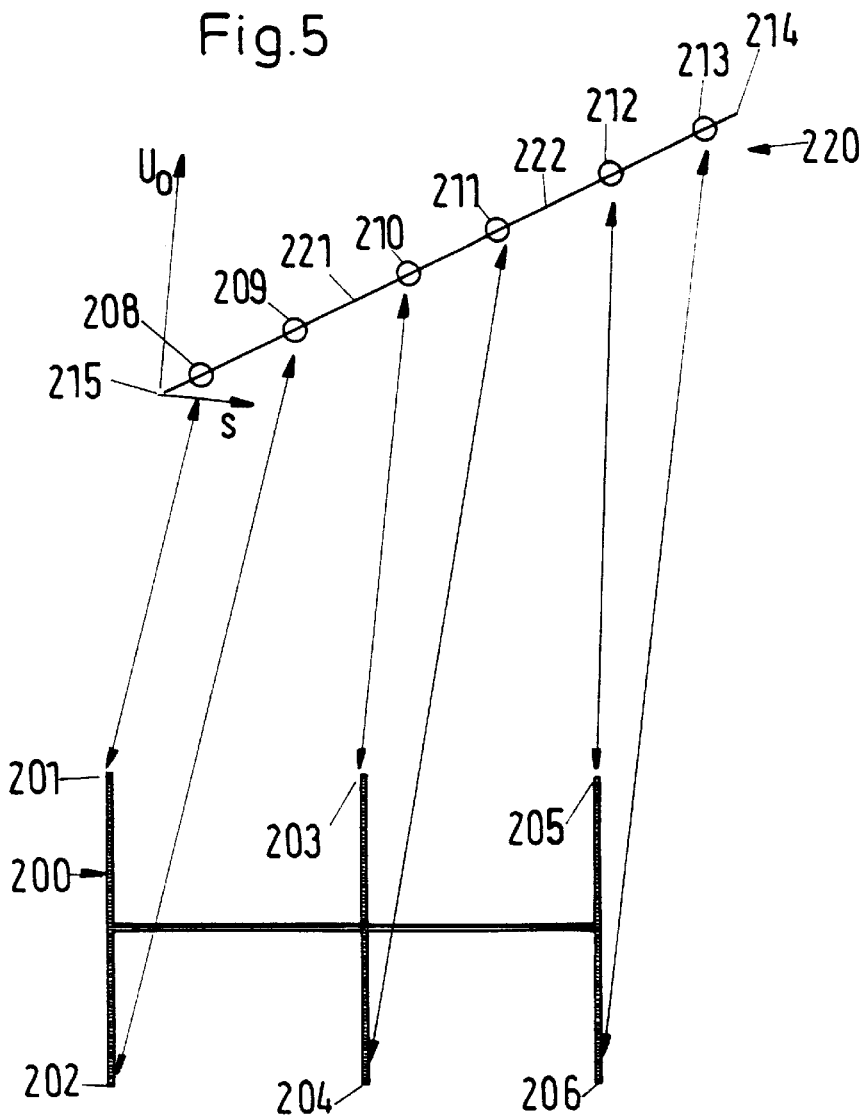

FIG. 5 shows a signal 220 from the sensor 16 for the adjusting means 14 as a function of the distance s and a schematically represented gearshift mechanism 200. For example, the gearshift mechanism 200 can constitute the gearshift mechanism in a transmission 3 with five forward speeds and a reverse speed. The forward speeds 1 to 5 are denoted by the characters 201 to 205, and the position of the reverse gear is denoted by the character 206. The distance or the position in the diagram is projected in the direction indicated by the arrows onto a unidimensional sensor signal s.

The signal from the sensor 220 to the adjusting means 14 encompasses the range from the minimal signal $U_{SO}$ 215 to the maximal signal $U_{Smax}$ 214. The positions denoted by the characters 201 to 206, which are indicative of the end positions of the shifting tracks in the gearshift mechanism 200, are represented by the values 208 to 213 of the signal from the sensor 220 for the adjusting means.

If the adjusting means assumes the position 201, which is indicative of the first forward speed, the value of the signal from the sensor 220 for the adjusting means is that which is shown at 208. If the adjusting means is shifted from the position 201 to the position 202, namely if it is in the second gear, the signal from the sensor 220 for the adjusting means changes its value from that shown at 208 to that shown at 209. Analogous applies for a change of the locus of the adjusting means from the position 203 to the position 204 which involves a change of the value of the signal from the sensor 220 for the adjusting means from the value 210 to the value 211. If the position of the adjusting means is changed from the position 205 to the position 206, the value of the signal from the sensor 220 for the adjusting means changes from the value 212 to the value 213. A movement of the adjusting means within a shifting track of the gearshift mechanism 200 entails a change of the signal from the sensor for the adjusting means from one of the operating points 208 to 213 to a neighboring one of the operating points 208 to 213.

In the event of a change of the adjusting means from one shifting track to another shifting track, the range of signals from the sensor 220 for the adjusting means reaches and exceeds the signal values 221 and/or 222. A recognition that one of the two values 221 and/or 222 has been reached or exceeded is indicated by the controlling means as a switch from one to another shifting track.

For example, if the adjusting means is moved from the position 201 to the position 203, the value of the signal from the sensor 220 for the adjusting means changes from the value 208 to the value 210. In the event of such change from the value 208 to the value 210, the value 209 is reached within the elapsed interval. Since the value 209 denotes the position 202 of the adjusting means, the control unit 7 or the control method recognizes that the value 209 has not been set for a longer interval of time but has only been reached for and exceeded after a short interval of time. In order to ensure that the exceeding of a signal value can be utilized to denote a change from one shifting track to another, one can again resort to a signal from the sensor 15 for the actuating means 12. In the event of advancement across, e.g., the position indicating signal 209 during a changeover from one shifting track to another, the signal 100 from the sensor for the actuating means is within the range of the value 101. Such signal value 101 denotes that the actuating means has assumed the neutral or idling position or is located in the range of the selecting path. A combination of the informations furnished by the signals 110 and 220 thus renders it possible to achieve an unequivocal identification of the selected gear or of the actual position of the adjusting means.

When the value 221, 222 is exceeded, the control unit 7 or the control process recognizes that the shifting track is being changed and, on stationary reaching the value 210, 212, the control method ascertains that the adjusting means has reached the position 203, 205. In such instance, the combination of the signals 110 and 220 again allows an unequivocal determination.

FIG. 6 illustrates a gearshift mechanism 300 and a signal 320 from the adjusting means. The coordination of the positions 301 to 306 of the adjusting means within the gearshift mechanism 300 to the signal 320 from the sensor for the adjusting means is made in a manner other than that described with reference to FIG. 5. In this embodiment, the arrangement of signal values 308 to 313 in the range of the signal 320 from the sensor for the adjusting means with reference to the extreme values 314 and 315 as well as in relation to the positions 301 to 306 of the adjusting means in the gearshift mechanism 300 is selected in such a way that the values of the signal stemming from the position along one track are not immediately adjacent each other. For example, the transition from the position 301 to the position 302 entails a change in the signal value from 308 to 311 so that it is necessary to traverse the signal values 309 and 310 which respectively correspond to the positions 303 and 305. The recognition of the selected gear can again be achieved unequivocally in a stationary condition. However, in a dynamic case the control method must evaluate the dynamics of the signal 320 from the sensor for the adjusting means in order to ascertain whether the value of the signal 320 from the sensor for the adjusting means is reached or traversed only for a short interval of time or whether a long-term signal value has been selected. In order to unequivocally recognize the selected gear, it is also possible to employ the signal from the sensor for the actuating means.

The equidistant spacings of the signal values 208 to 213 and 308 to 313 which are respectively shown in FIGS. 5 and 6 correspond to the utilization of a specific embodiment of a linkage employing as transmitting means, for example, a cam disc or a cam lobe or a linkage, the cam disc constituting e.g. a two-dimensional or three-dimensional cam disc to generate, for example, a non-equidistant array of signal values corresponding to special transmission gears. The arrangement of signal values depends upon the nature of the employed linkage. It is also possible to employ equivalent embodiments which assign equidistant or non-equidistant signal values to the corresponding transmission gears.

The novel apparatus converts the two-dimensional system of the gearshift mechanism 200 or 300 into a unidimensional signal 220 or 320 from the sensor for the adjusting means. The signal from the sensor for the adjusting means contains information pertaining to the position of the adjusting means in the shifting track as well as to the change from one shifting track to another shifting track. When the adjusting means is maintained in one of the possible positions of rest (201 to 206, 301 to 306), the signal 220 or 320 from the sensor for the adjusting means is an unequivocal signal. In the event of a change of the position of the adjusting means within the gearshift mechanism, it is possible that in selecting the neutral position or during traversal of the neutral position there takes place a "passing through" or "passing over" a gear position, i.e., a passing through and beyond a signal value corresponding to a particular gear of the transmission.

The detection of the position of the actuating means with assistance from the sensor for the actuating means can be utilized by the control method for the purpose of properly evaluating a signal (such as 220 or 320) which is transmitted by the sensor for the adjusting means and is not unequivocal during traversal of the neutral position.

The dynamics of the signal from the sensor for the actuating means and/or the signal (such as 220 or 320) from the sensor for the adjusting means are detected and are utilized to ascertain whether a value of the signal from the sensor for the adjusting means has been reached and selected or whether it has been exceeded in order to reach a different value of the signal from the sensor for the adjusting means. The control unit 7 recognizes, on the basis of the dynamics of the signal from the sensor for the actuating means and/or the signal (such as 220 or 320) from the sensor for the adjusting means, whether the adjusting means has assisted in the selection of a particular gear so that a certain value of the signal From the sensor for the adjusting means remains constant or nearly constant for a certain period of time, or the adjusting means is being moved or is maintained in the neutral position or a value of the signal from the sensor for the adjusting means, namely a value denoting the position of a particular gear, has been reached only for a short interval of time and is thereupon exceeded.

In order to control the operation of an automated clutch system (such as 4) with a comfortable behavior during engagement and disengagement of the clutch, one can resort to information pertaining to the positions and/or speeds and/or accelerations of the actuating means and of the adjusting means to control the engagement and disengagement of the clutch. In the event of a defectiveness or improper operation or failure of one of the two sensors such as the sensor (e.g., 16) for the adjusting means (e.g., 14) or the sensor (e.g., 15) for the actuating means (e.g., 12), the non-affected sensor can ensure the setting up of an emergency operation.

For example, the characteristics which are necessary for the setting up of an emergency operation can be ensured in that, in the event of a failure of the sensor for the actuating means, a recognition of the position of the adjusting means is ensured by the signal from the sensor for the adjusting means and the dynamics of the actuating means can be adequately detected and/or adapted by the dynamics of the adjusting means in order to ensure an at least limited operation of the system.

In motor vehicles with a basically rigid non-damped connector 13 between the actuating means 12 and the adjusting means 14, an evaluation and/or adaption of the dynamics of the adjusting means can be utilized for the purpose of ensuring the recognition of shifting intent by way of the sensor 16 for the adjusting means 14 and within the framework of the emergency operation characteristics.

In the event of a defectiveness or malfunction or failure of the sensor for the adjusting means, one can carry out a recognition of the selected gear within the framework of the emergency operation characteristics on the basis of the signal from the sensor for the actuating means with assistance from an evaluation or adaption of the signal from the sensor for the actuating means. Such recognition of the gear is achieved in that, for example, the synchronized position is ascertained with assistance from the sensor for the actuating means. This is possible with assistance from the sensor for the actuating means when the synchronized positions of the individual gears of the sets of gears which are assembled into the groups 102 and/or 103 are not identical and, consequently, it is possible to adapt and to thus distinguish them from each other based on the dynamics of the distance-time behavior of the signal from the sensor for the actuating means.

Furthermore, the selected gear can be ascertained, for example, on the basis of the relationship between the input RPM and the output RPM of the transmission 3 when the clutch begins to become engaged or is engaged. The control unit 7 can ascertain a gear, at a predetermined engaging movement, on the basis of memorized reference values which are compared with real values.

The transmitting means which are illustrated in the aforedescribed Figures employ a transmitting means, such as a cam disc or a cam lobe, which can be designed to constitute a two-dimensional or a three-dimensional structure and which cooperates with a follower means tracking the cam disc so that a two-dimensional movement of the cam disc is transformed into a unidimensional movement of the follower means abutting the cam disc and the movement of such follower means is tracked and detected by a sensor.

The following Figures illustrate embodiments wherein the aforedescribed transformation is achieved by means of an articulately coupled lever. For example, the sensor which is being utilized is a sensor with a rotary input shaft and the active direction of movement is selected to be unidimensional. Such a sensor merely permits a unidimensional movement and, by applying spring pressure to the sensor arm in one direction, the movement of the sensor arm is unequivocally related to the movement of the adjusting means.

FIG. 7a shows schematically a sensor 400 with a central rotary shaft 401 and a lever 402 which latter is nonrotatably connected to the shaft, for example, by a screw or by upsetting, or which is of one piece with the shaft so that the shaft 401 is rotated through a certain angle in response to pivoting as a result of the application of a force to the lever 402. Within the sensor 400, or within the sensor housing 400a, there is disposed a non-illustrated means for detecting the angular position of the rotary shaft 401, and such detecting means transmits to a central control unit, by way of an electrical connection 403, the signal which denotes the angular position of the shaft 401. Since such sensors are known in the art, the sensor 400 need not be described in greater detail.

FIG. 7a further shows schematically a portion of a shifting-/selecting shaft 404 which can be moved not only in an axial direction as indicated by the arrow 405 but can also carry out a rotary movement about an axis 406 as indicated by an arrow 407.

The shaft 404 carries an extension or lug 408 acted upon by a connecting means 409 which, in turn, is connected with the lever 402 of the sensor 400. The connection in the region 410 between the connecting means 409 and the lever 402, as well as the connection in the region 408 between the shaft 404 and the connecting means 409 constitutes a spherical joint, a cardan joint or a universal joint.

The lever 402 can be acted upon in one direction by a spring element which is not shown in FIG. 7a. In response to an axial shifting or a rotary movement about the rotational axis 406 or a combined movement of the shaft 4047 the lever 402 of the sensor 400 is set in rotary motion about the axis of the rotary shaft 401. Due to such mode of operation, a two-dimensional movement of the shaft 404, which latter can also constitute a shifting lever or a shifting rod, is transformed into a monitored or detected unidimensional movement of the lever and hence of the sensor shaft 401.

FIG. 7b shows the construction or arrangement of the sensor 400 with a rotary shaft 401 and the lever 402 as well as with the shaft 404, such as a shifting-/selecting shaft or a shifting rod or a shifting lever. A spherical joint head 410 is provided on or disposed at or of one piece with the radially outer end 402a of the lever 402. Analogously, there is provided or formed on the shaft 404 a pivotable arm 411 having a radially outer end 412 which also carries the head of a joint. The heads 410 and 412 of the lever 402 and the pivotable arm 411 are coupled to each other by a connecting means 409, and the two end portions of the connecting means are provided with sockets which are applied over the respective heads, e.g., they can be glued thereto. The articulate connections in the regions of the spherical joints permit relative movements between the mobile components 411 and 402.

FIG. 7b also shows that, in response to an axial translatory movement or a rotary movement about the axis 406 of the shaft 404, the lever 402 changes its position through a certain angle and thus the two-dimensional movement of the component 404 can be detected by resorting to a unidimensionally acting or monitoring sensor.

FIG. 7c shows an arrangement of two sensors 420 and 421 with connecting cables 422a and 422b, and the sensors comprise levers 423 and 424. The portion 425 of the shifting-/selecting shaft or shifting rod or shifting lever is provided with two extensions or pins 426a, 426b for the attachment of connecting means, such as for example 427 and 428. Furthermore, the levers 423, 424 of the respective sensors 420, 421 are provided with spherical joint heads 429 and 430 which perform the same functions as those shown in FIGS. 7a and 7b. In order to achieve a more satisfactory resolution and different characteristics of the two sensors 420 and 421, the angular relationships in the arrangement of FIG. 7c as well as the dimensions of the connecting elements 427 and 428 of the two discrete sensors 420, 421 are different from each other, i.e., the lengths of the connecting means and the angles in their neutral positions are different.

Figure 8:
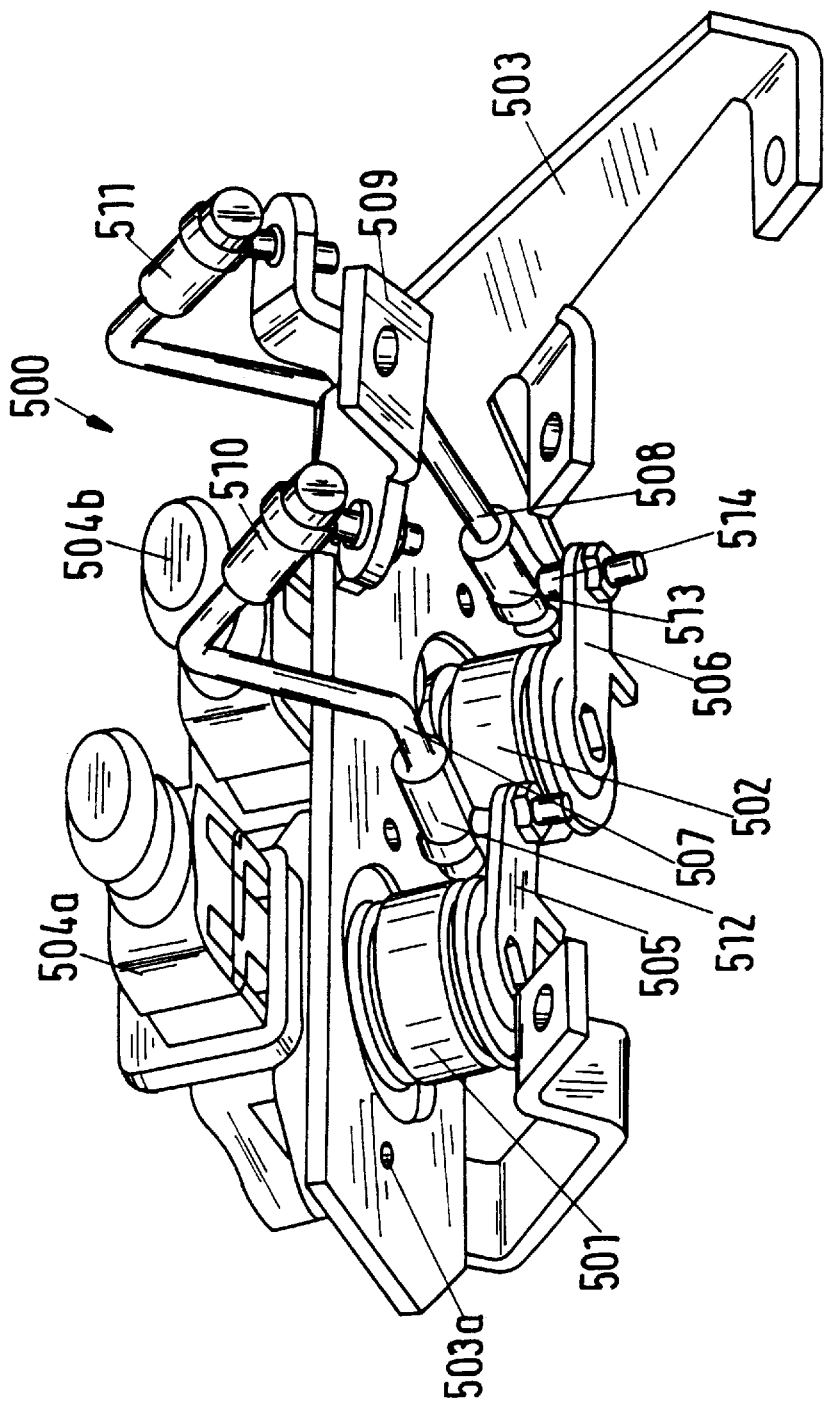

FIG. 8 shows an arrangement or array 500 of sensors 501, 502 which are mounted on a carrier such as a sheet metal carrier 503. The sensors 501, 502 are secured to the carrier 503 by screws or rivets 503a and respectively comprise connecting plugs 504a, 504b which serve to establish signal transmitting connections with a central computer or control unit so that the signals from the sensors can be processed. The connecting cable is not shown in FIG. 8.

The sensors 501 and 502 further respectively comprise rotary sensor arms 505 and 506 which are respectively provided with connecting means 507, 508 and such connecting means, in turn, are connected with a shifting-/selector shaft or with a carrier, e.g., a sheet metal carrier 509, which is provided on the shaft.

The carrier 509, which is provided on the shifting-/selecting shaft, is coupled with the connecting means 507, 508 by universal joints or spherical joints, and these connecting means, in turn, are connected with the sensor arms 505 and 506 by spherical- or universal joints. The carrier 509 is designed in such a way that the regions of coupling of the spherical- or universal joints are not disposed in a common plane. Owing to this, and to the resulting different lengths of the arms of the connecting means 507, 508, one achieves that, when the shifting-/selecting shaft and the carrier 509 which is attached thereto carry out a movement, such as a translatory or a rotary movement, the sensors 501 and 502 do not transmit identical or synchronous signals so that, owing to such coupling, it is possible to process different signals.

The linking of the sensors 501, 502 by mechanical connecting means and by spherical joints, cardan joints or universal joints is carried out in such a way that a movement of the carrier 509 in pure translation along the rotational axis of the shifting-/selecting shaft and as an angular movement about the rotational axis can be detected by the sensors 501 and 502, respectively. These sensors also detect a superimposed rotary and translatory movement of the carrier 509.

The spherical joint connections are denoted by the characters 510, 511, 512 and 513, and each thereof consists essentially of a spherical joint head 514 which is connected to the carrier 509 or to the sensor arms 505, 506, such as by being of one piece therewith or by being screwed, riveted or clamped or bonded thereto. The connecting means, such as linkages 507, 508, have end portions carrying portions of the spherical joint connections which are applied over the heads of the spherical joints, e.g., by means of clips or by snap action. When assembled, such spherical joint or universal joint ensures the establishment of a rotary connection.

FIGS. 9*a* and 9*b* show the arrangement 500 of FIG. 8 in two side elevational views. Each of the FIGS. 9*a* and 9*b* shows the sensors 501, 502 with their plug portions 504*a*, 504*b* but the complementary plug parts are not illustrated. There is further shown the carrier 509 which establishes a connection with the shifting-/selecting shaft. It is also possible to make this carrier of one piece with the shifting-/selecting shaft. The spherical joints 510, 511, 512 permit it to be seen that a movement of the carrier 509 effects a movement of the rotary sensor arms by way of the connecting means 507, 508.

Figure 10A:
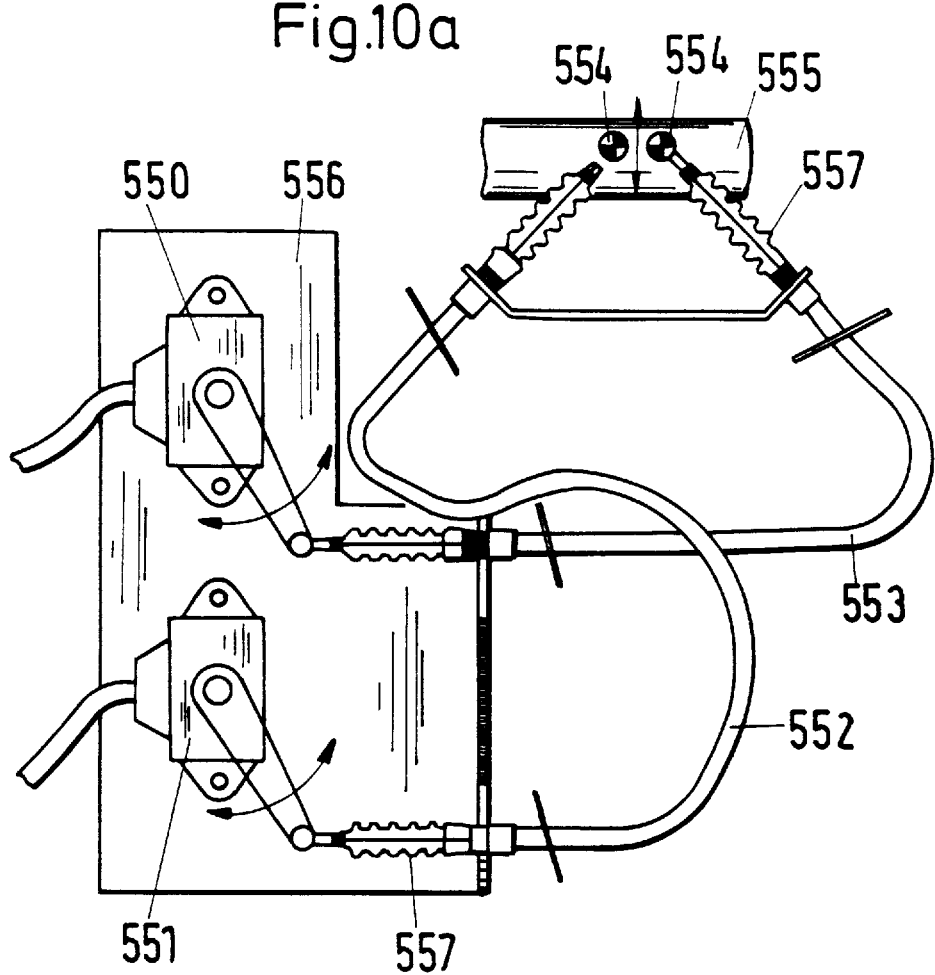

FIG. 10*a* shows an arrangement or assembly of two sensors 550, 551 which are connected with a shifting-/selecting shaft 555 by Bowden wires 552, 553. The connections between the Bowden wires 552, 553 and the shifting-/selecting shaft are established by spherical or universal joints 554, and the directions of linking of the two Bowden wires make with each other an angle so that the sensors 550 and 551 generate different signals due to different movements of the shifting-/selecting shaft.

The sensors 550, 551 are disposed in a box 556, such as a housing. The locations of entry of the Bowden wires into the box as well as the connections with the shifting-/selecting shaft are confined in elastic or synthetic plastic bellows 557 which establish an at least substantially contamination-free but nevertheless articulate connection between the sheaths and the actual wires of the Bowden wires so that the guide means for the Bowden wires are shielded from contaminants.

Figure 10B:
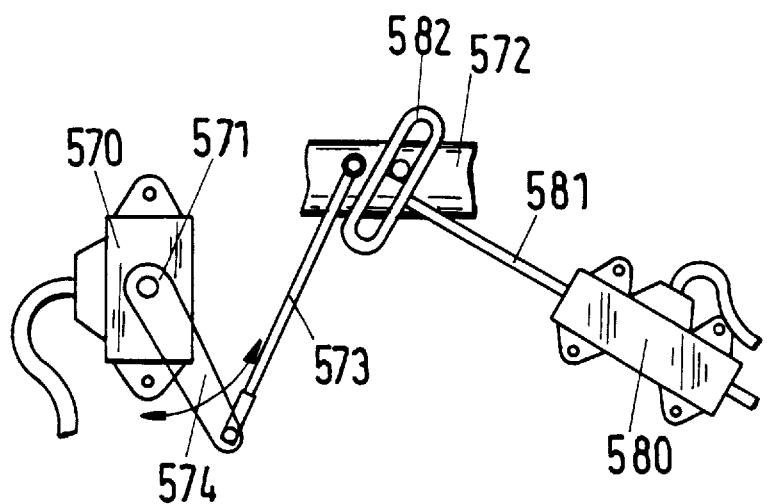

FIG. 10*b* illustrates a sensor 570 which detects movements of a part, such as a shifting-/selecting shaft 572, by way of a connecting means 573 and a lever 574 as an angular movement of a rotary shaft 571. The connection between the lever 574 and the shifting-/selecting shaft 572 is realized by way of a connecting element with universal joints. FIG. 10*b* further shows a sensor 580 which is designed to act as a transversal or linear sensor. An operating element 581 for the sensor 580 is designed to carry out a transverse movement and it establishes a connection with the shifting-/selecting shaft 572 by way of a crank mechanism with restricted guidance, such as a loop 582.

Figure 11:
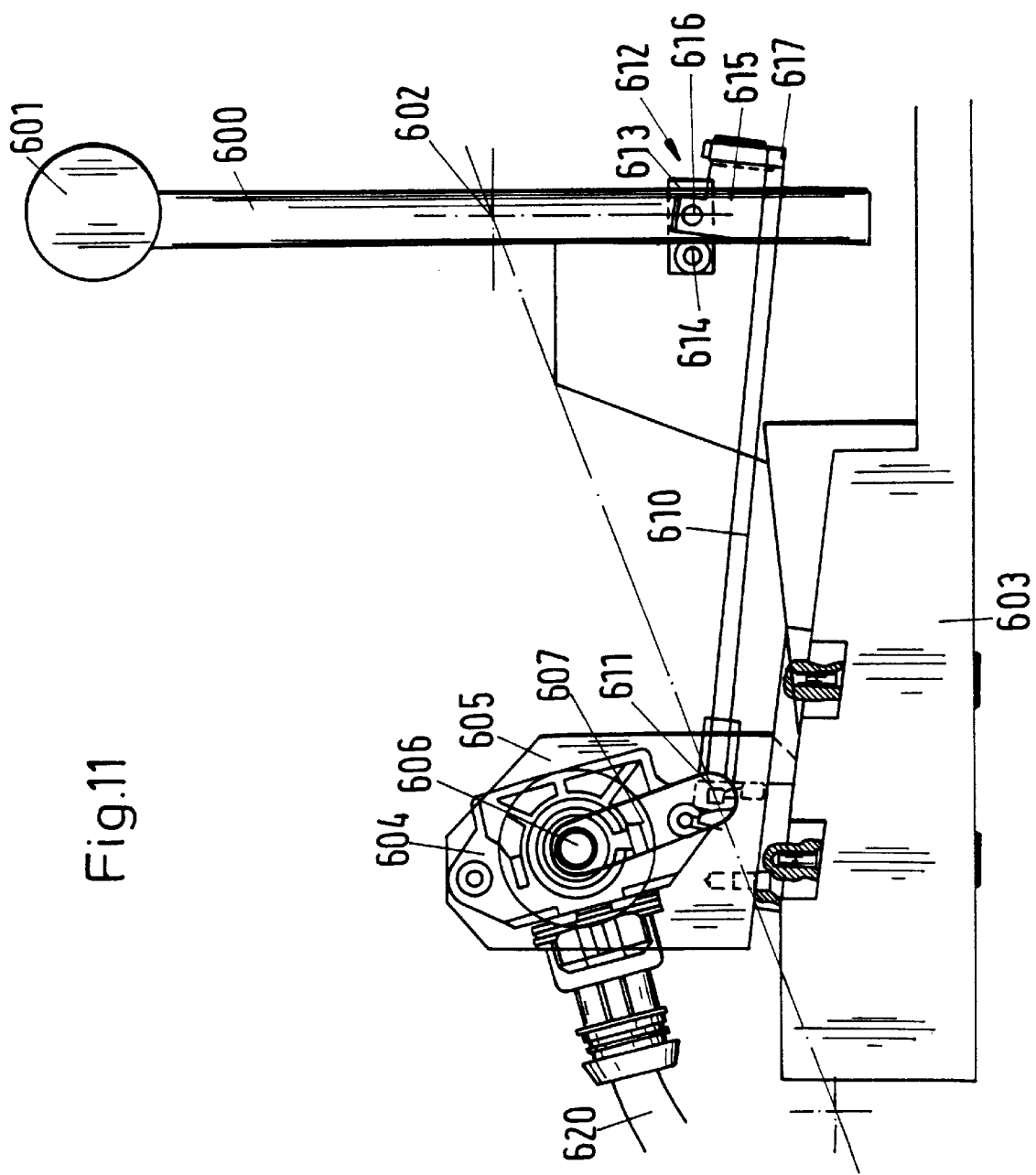

FIG. 11 shows one embodiment of means for linking a sensor 604 to a shifting or selecting lever 600 of a vehicle. The shifting or selecting lever 600 comprises a handgrip portion 601. Furthermore, the lever 600 is movable or is movably mounted at a location 602 by way of a spherical joint or another joint.

FIG. 11 further shows a base 603 to which the sensor 604 is secured by a carrier 605. The sensor 604 is a rotary sensor, such as for example a rotary potentiometer, and comprises a shaft 606 and a lever 607.

A connection is installed between the lever 607 and the lever 600 by way of a coupling 610, such connection between the lever 607 and the coupling 610 being established by way of a spherical joint 611 and a cardan joint 612.

The spherical joint 611 permits a movement of the coupling 610 relative to the lever 607 and can constitute a simple synthetic plastic part which is secured to the spherical head of the lever 607 by clips or the like.

The cardan joint 612 comprises a first annular portion 613 which is provided with a threaded fastener 614 to ensure the establishment of a clamping action between the annular portion 613 and the lever 600 when the fastener 614 is tightened. A component 615 is pivotally connected with the annular portion 613 in the region of a swivel joint 616. The coupling 610, in turn, is rotatable in the region of a shaft 617 and is connected with the component 615. Owing to the provision of the cardan joint 612 and of the swivel joint 616 and the component 615, one can establish between the coupling 610 and the lever 600 a connection with two degrees of freedom of movement. In FIG. 11, the arrangement of the lever 600 and the sensor 604 is such that the sensor can detect each and every movement of the lever 600 along the shifting tracks or during a change from one shifting track to another. The thus obtained information is transmitted to and processed in a downstream control unit, and such information is transmitted by a conductor such as a cable 620.

For example, the signals from the sensor 604 can be resorted to for carrying out a gear recognition or a recognition of shifting intent. The position-, speed- and acceleration values which are either detected or calculated can be put to use for the purpose of recognizing the gear and/or the shifting intent.

Figure 12B:
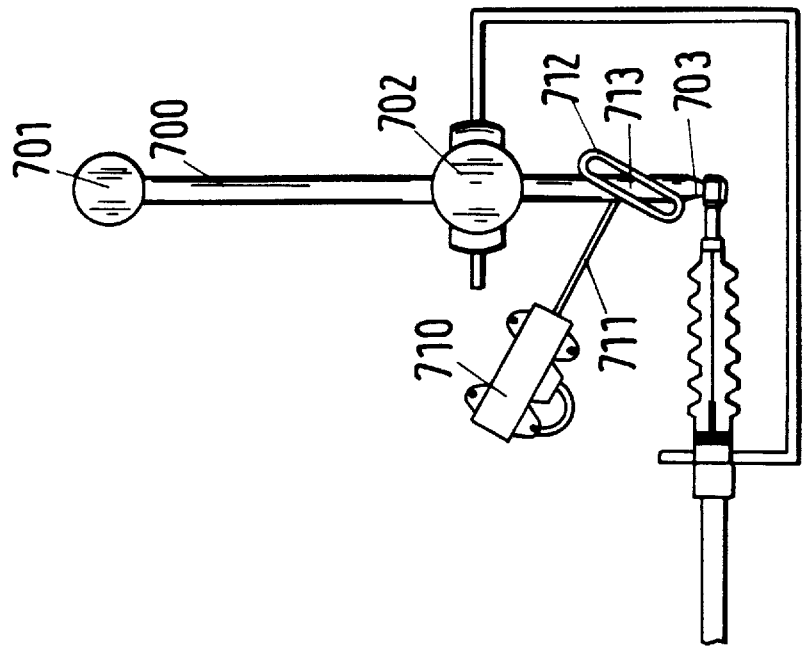
Figure 12A:
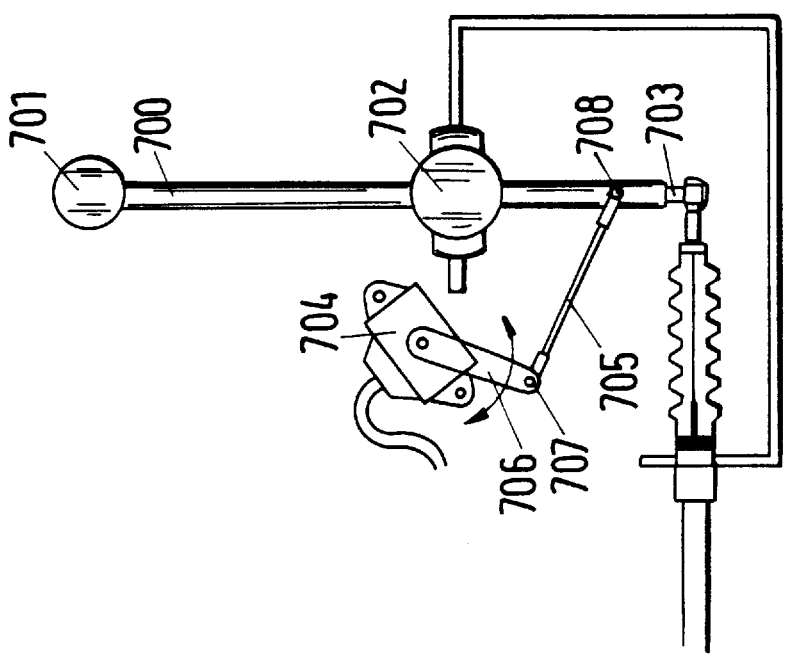

FIGS. 12*a* and 12*b* illustrate a shifting lever 700 with a handgrip portion 701 and a spherical joint 702, the shifting lever being movably mounted in the region of the spherical joint. The end 703 of the lever 700 is provided with a coupling for a rigid mechanical connection or a flexible mechanical connection, and such connection can constitute a linkage or a Bowden wire.

By moving the lever 700, one can manually initiate and carry out a change of the transmission gear or ratio. In the embodiment of FIG. 12*a*, a sensor 704, which can constitute a rotary sensor such as a rotary potentiometer, is linked to the lever 700 by a connection 705 which is disposed between the shifting lever 700 and a lever 706 of the sensor. Spherical joints are installed at the ends of the connection 705, as at 707 and 708.

FIG. 12*b* illustrates a linear sensor 710 which is coupled with a lever 700 by a connector 711 and a restraint 712. The basically loop-shaped portion of the restraint 712 permits movements of a pin 713 within the confines of the loop while the lever 700 is moved, and this entails an actuation of the sensor 710.

FIG. 13 shows an arrangement of sensors 800, 801, 809 which are assembled into a unit within a box 810, and the linking of the sensors is effected by Bowden wires. The sensors 800 and 801 are connected with the shifting-/selecting shaft 804 by Bowden wires 802 and 803, respectively, and in a manner as already described with reference to FIG. 10*a*, the linking of the Bowden wires 802 and 803 is carried out at an angle to each other, i.e., a first, angle 806*b* is established between the Bowden wire 802 and the translational and rotational axis 805 of the shifting-/selecting shaft 804, and a second angle 806*a* is established between the Bowden wire 803 and the axis 805.

If the shaft 804 is moved in the direction of the arrow 805, the connection including the Bowden wire is deformed and the connection by way of the Bowden wire 803 is subjected to a pull which means that the lever 807 of the sensor 800 is moved in a counterclockwise direction and the lever 808 of the sensor 801 is moved in a clockwise direction.

The sensor 809 is connected with the shifting-/selecting lever 811 by a Bowden wire 812. The attachment of the Bowden wire 812 is effected in the same way as the attachment of the Bowden wires 802 and 803 of FIG. 13 or of the Bowden wires 552 and 553 shown in FIG. 10a. The assembly of the sensors 800, 801 and 809 in the box 810 is advantageous because this ensures adequate protection of the sensors from contamination to thus increase the safety of operation. Furthermore, by resorting to a linking by way of Bowden wires, one contributes to the flexibility of installation of the box 810 in the vehicle which is of considerable advantage due to scarcity of space in the vehicle.

Figure 14:
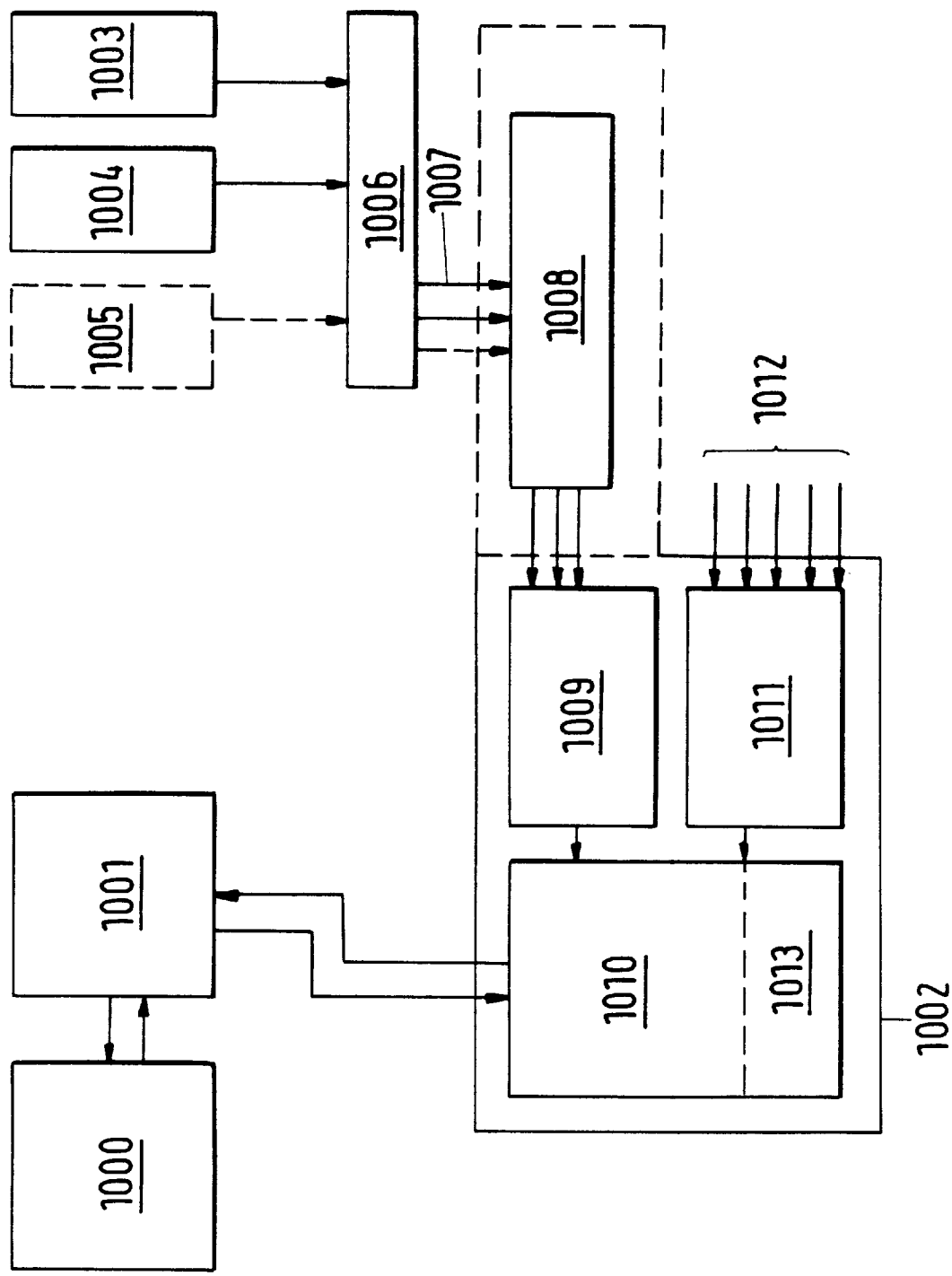

FIG. 14 is a schematic representation, in the form of a block diagram, of a torque transmission system 1000 wherein an adjusting element 1001 performs the function of selecting or initiating the selection of the transmissible torque. The torque transmission system 1000, such as a clutch, is operated automatically which means that, based on incoming signals, a control unit 1002 recognizes that a disengagement, engagement or partial engagement of the clutch is of advantage. The clutch 1000 is installed in a power flow between a non-illustrated engine and a non-illustrated transmission, and the selection of the transmission gears, i.e., the selection of the transmission ratio, is carried out manually, for example, by the operator. The selection of gears is carried out by way of an actuating means, such as a shifting lever. Furthermore, there is provided on or at the transmission an adjusting means which operates the internal elements, such as the sliding selector shafts, of the transmission. The actuating lever and the adjusting means are not shown.

A sensor 1003, which is directly or indirectly linked to the adjusting means, serves to detect the position and/or the speed and/or the acceleration of the adjusting means. A transmitting or converting means for transformation of the movement can be installed between the adjusting means and the sensor 1003.

A sensor 1004 is linked to the actuating means (directly or indirectly) and its basic function is to detect the position of the actuating means along the shifting path. It is also possible to detect the speeds or the accelerations.

It is further possible to link at least one additional sensor 1005 to the adjusting means or to the actuating means.

The sensors detect the corresponding movements and are in signal transmitting connection with an electronic unit 1006 which processes the signals for the control unit. The electronic unit 1006 can constitute an analog-digital converter or another suitable electronic unit. The signals 1007 at the output of the unit 1006 denote the movements, positions or other parameters of the adjusting- or actuating means, depending on their linkages. In the event of the utilization of a linkage according to which not only the selecting but also the shifting movement influences the direction of coordinates of a sensor signal, it is of advantage to resort to a transformation of sensor signals according to which one generates signals which are dependent exclusively upon the selecting movement or solely upon the shifting movement.

This means that the sensor signals which are dependent upon the selecting and shifting movements are retransformed in order to obtain internal signals which are not influenced by a second or a third coordinate direction. This coordination is achieved by resorting to a standard coordinate transformation such as can be carried out by the computer unit of the control unit.

In accordance with the inventive concept, at least one sensor for the adjusting means or both sensors for the adjusting means are linked in such a way that the movements in both relevant coordinate directions are detected by a unidimensionally detecting sensor. Furthermore, the sensor for the actuating means serves primarily to monitor the shifting movement. The sum total of information furnished by the sensors renders it possible to separate the signals in dependency upon the coordinate directions of the selecting and shifting paths. If two sensors are linked to the adjusting means in an "oblique" manner in accordance with the abovedescribed method, namely if each two-dimensionally monitoring sensor senses a movement along one projection of a two-dimensional movement, one of the sensors can ensure the establishment of an emergency operation in the event of the failure of the other sensor since, basically, all of the necessary information is available.

Subsequent to coordinate transformation at 1008 or, in accordance with another embodiment without any coordinate transformation, the control unit 1002 contains signals which unequivocally characterize the positions of the adjusting means and of the actuating means in the gearshift mechanism.

In order to recognize the gear, there is provided in the control unit 1002 a subunit 1009 which, by way of time-dependent signals, carries out an association of the actual position with a gear position.

The recognition of gears can be carried out in such a way that the gearshift mechanism is associated with a two-dimensional signal field and a distribution of such signal values takes place in dependency on the positions of various gears. For example, the system recognizes, either based on comparison or by establishing larger or smaller relations, the range within which the actual signal value is located and associates such signal value with a gear position.

If one resorts to larger- or smaller relations, one carries out a comparison of signals with threshold values. On the one hand, it is possible to compare whether a signal is larger or smaller than a threshold value for separation of the shifting paths. Such comparison is carried out in order to ascertain the shifting track in which the system happens to be located which means that there takes place a restriction of the gear positions to those gears which are located within the shifting track.

By resorting to a further comparison of signals, it is possible to examine whether a gear position is the one in the front, rear or median region of a shifting track. If a front or rear region is recognized, the overall information suffices to ascertain or determine the actual gear.

In order to recognize the shifting intent, one utilizes signals which have already undergone a transformation at 1008, and the block 1009 denotes a system in which comparisons are again carried out with a threshold value. If a threshold value is not reached or is exceeded, there is generated a shifting intention signal and such signal is transmitted to the building block 1010 of the control unit 1002 shown in FIG. 14. Prior to a comparison with a threshold value, the transformed signal can be scaled or converted.

A further possibility of recognizing a shifting intent is that the comparison with a threshold value is preceded by a filtering operation. Such filtering can exhibit an integrating and/or a differentiating character or, for example a $PT_I$ behavior. A $PT_I$ filter exhibits a proportionally delayed behavior which denotes that the signal progresses exponentially toward a final value. For example, if a Heaviside function f (t) (for the time t is less than $t_0$ if f=0 and for the time greater than $t_0$ if f=1) is applied to the input of the filter, this results in the generation at the output of the filter of a signal with an initial upward slope which signal follows a constant final value for the time t toward endless. Furthermore, a filtering of the signal can be preceded or followed by an addition of a fixed or time-variable summand to the signal.

Furthermore, a shifting intent recognition can be achieved on the basis of calculated or measured speed or acceleration of the actuating means by taking into consideration the direction of the movement.

The block 1010 of the control unit 1002 denotes that part of the control unit which actuates the adjusting means. The block 1011 is a function block wherein the operating point is ascertained on the basis of the incoming signals 1012, for example, parameters denoting the condition of the engine such as the RPM, the torque and other parameters. Furthermore, it is possible to transmit to the function block 1011 signals from other electronic units, such as, e.g., from an ABS electronic unit. Examples are the RPMs of the wheels.

The block 1010 provides the desired value for the adjusting element 1001 which latter is actuated accordingly in order to achieve an operation of the torque transmission system which corresponds to the implemented algorithm.

The arrows which are shown in FIG. 14 schematically represent signal transmitting connections which are established between discrete components of the system. It is possible to provide additional signal transmitting connections which are not specifically shown in FIG. 14 for the sake of clarity.

The control unit of FIG. 14 further comprises a memory unit 1013 for at least temporary or short-lasting or long-lasting storage or retrieval of data. Furthermore, the data memory can be organized in such a way that it stores data in a timely sequence and/or data with timely indexing in order to more clearly point out time-dependent changes of the signals, for example, by means of numerical procedures such as are possible by resorting to differentiation.

Figure 15:
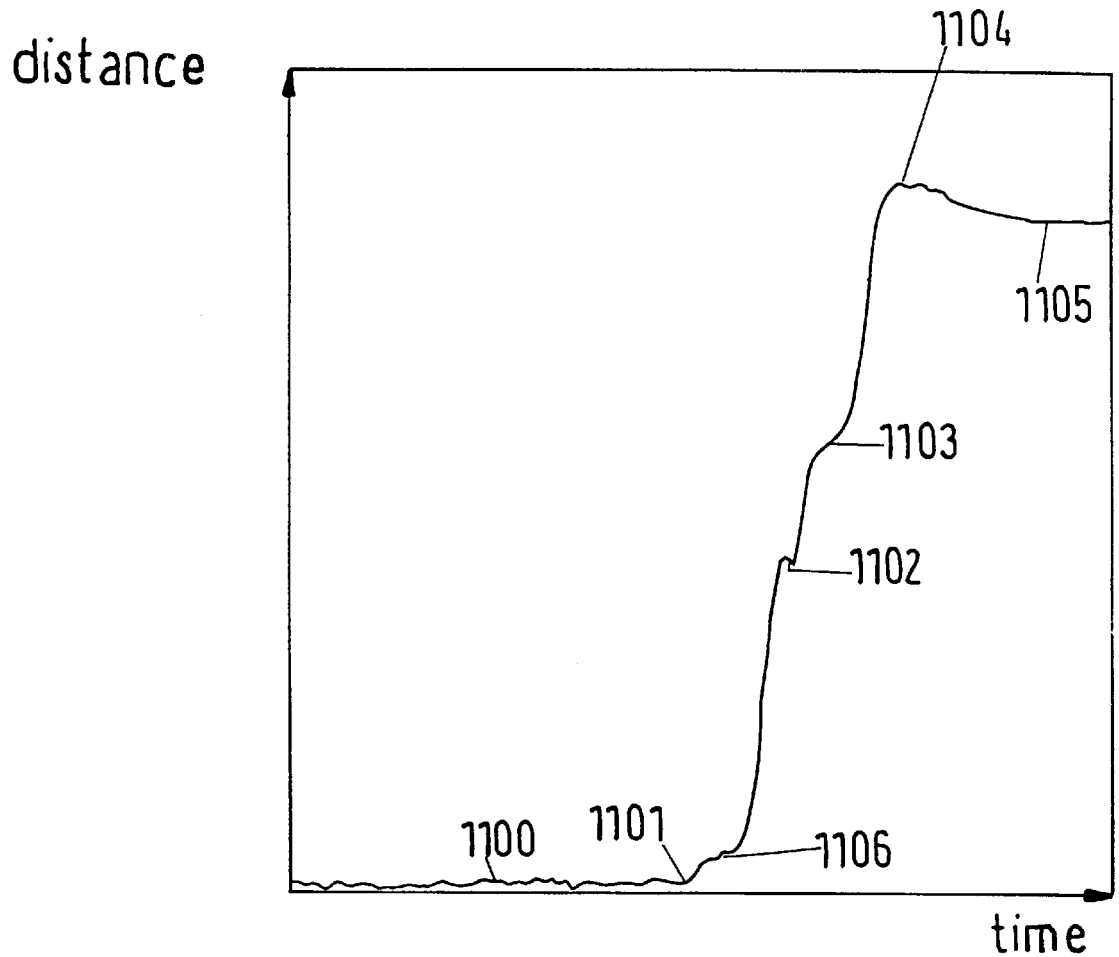
FIG. 15 a diagram.

FIG. 15 illustrates a different time-dependent progress of a movement- or distance signal 1100 which is detected by a sensor at an adjusting means of the transmission. The distance covered or movement completed by an adjusting means in the course of a gear shifting operation is measured along the abscissa, and the time is measured along the ordinate.

For example, a shifting operation from the third gear into the fourth gear in a standard manually operated transmission is initiated at the instant 1101. The flattening of the time-dependent progress of the curve within the time range 1106 is indicative of overcoming of the detent for the third gear, i.e., the detent force is overcome in the course of slowing down of the movement.

Once the force of the detent means for the third gear is overcome, the speed increases because the detent means for the neutral zone accelerates the adjusting means into the neutral position. This is indicated within the time interval 1102 which shows a momentary reduction of the speed and an actual reversal of the direction of progress of the movement-denoting signal.

The synchronizing of the fourth gear is carried out within the time interval 1103 of the shifting operation, and it will be noted that the movement- or distance-to-time relationship is indicative of a lower speed. In the course of the next-following time interval, as at 1104, the adjusting means is being pushed by the actuating means into a position corresponding to the fourth gear of the transmission before the adjusting means, which at the interval 1105 is no longer acted upon by a force, relaxes in a position corresponding to the fourth gear or speed ratio of the transmission.

As shown in FIG. 15, the synchronized position is unequivocally recognizable during shifting into gear and a recognition of the selected gear can be carried out on the basis of the locus of such synchronized position.

Figure 16:
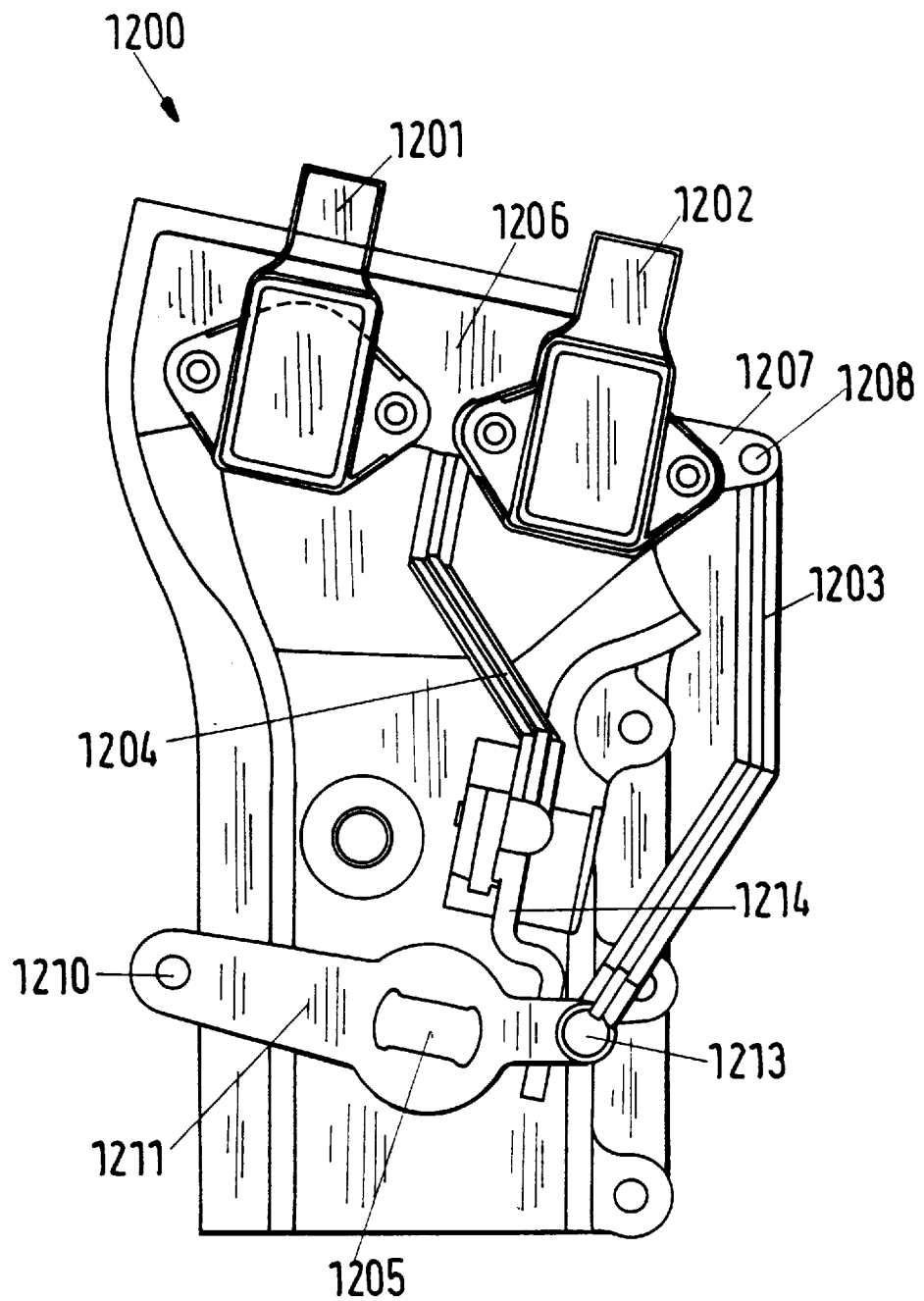
FIG. 16 an apparatus.

FIG. 16 illustrates an arrangement or assembly 1200 of two sensors 1201 and 1202 which are installed in the region of the transmission and are connected with the central shifting shaft 1205 by way of levers 1203 and 1204. The sensors 1201 and 1202 are secured to a base plate 1206 by threaded fasteners or plug-in connectors. The shaft of each sensor extends through an opening in the plate 1206 and a rotary sensor arm is carried by the respective shaft and is turnable behind such plate. Each sensor arm is coupled to the respective lever 1203 or 1204 by a spherical joint 1208.

The central shifting shaft 1205 can be moved in the selecting or shifting direction by way of connectors 1210, and such connectors can comprise, for example, Bowden wires. A first Bowden wire can be employed for the selecting movement, and a second Bowden wire can be employed for the shifting movement. In the embodiment of FIG. 16, the selecting movement is a movement of the element 1211 along the shaft 1205, and the shifting movement is an angular movement of the element 1211 about the shaft 1205.

In the course of a shifting operation, angular movement of the element 1211 is transmitted to the lever 1203 by way of a spherical joint 1213. Coupling of the lever 1204 takes place by way of a joint and a lever 1214 which latter is designed in such a way that, in the course of an angular movement of the element 1211, the lever 1214 is not moved to thus establish a sliding connection in a shifting sense. If the element 1211 is moved in the direction of the axis of the shaft 1205, the lever 1203 is again moved by way of the spherical joint 1213 and the lever 1204 is moved simultaneously by way of a transmission element 1214 so that the sensors 1201 and 1202 transmit signals in the course of a selecting movement.

In accordance with a further embodiment of the invention, the sensors 1201 and 1202 can be linked in such a way that one of the sensors only detects movements in the shifting direction whereas the other sensor detects movements only in the selecting direction.

Figure 17:
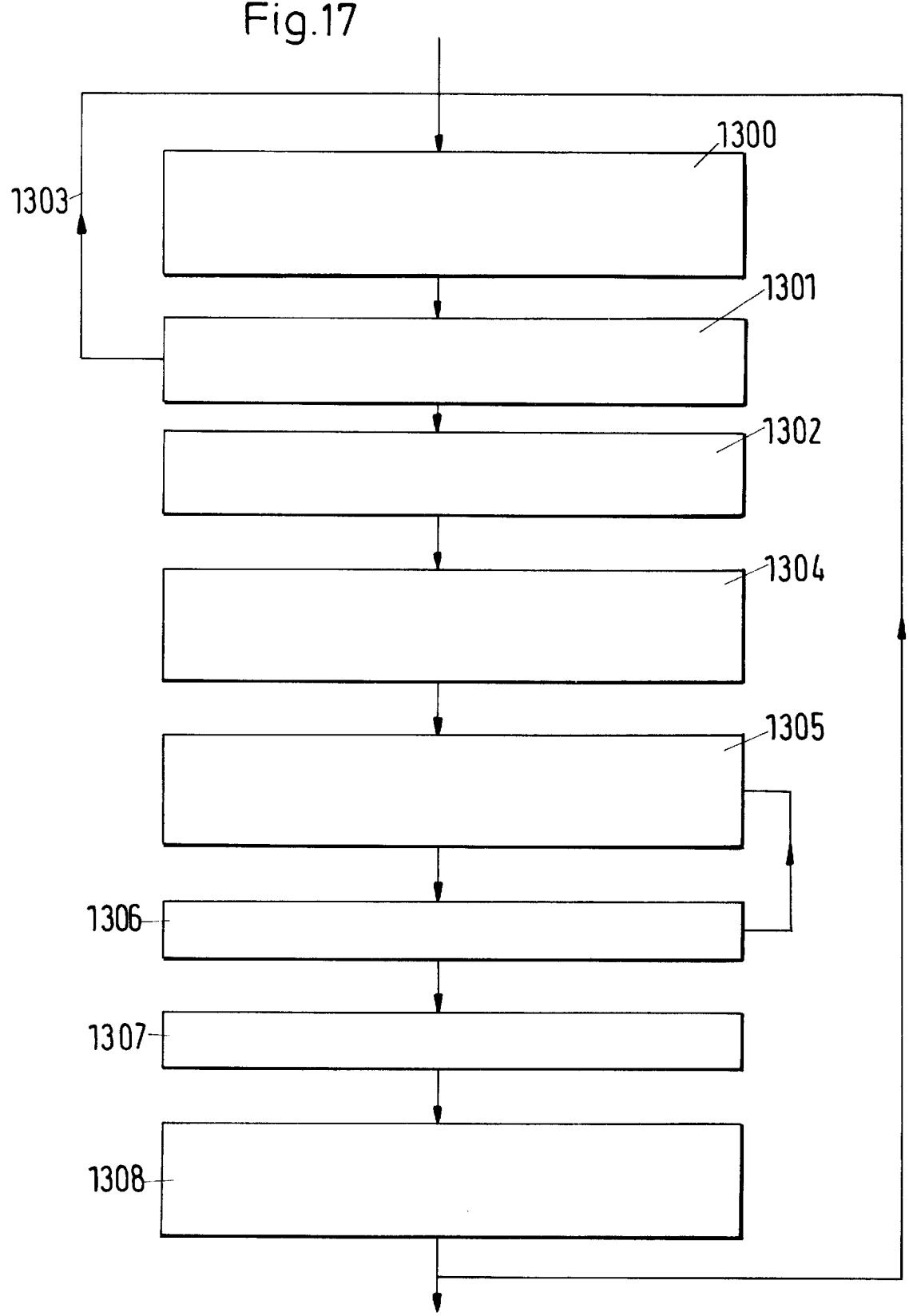
FIG. 17 a block diagram.

FIG. 17 is a block diagram showing one example of the progress of a shifting intent recognition and/or recognition of the selected gear or gear shift and, in connection with the above, an actuation or operation of the clutch. The block 1300 denotes the detection of movements of the actuating means and of the adjusting means by way of sensors which are associated with such means, as well as the transmission of signals from the sensors to the control unit for signal processing. For example, signals from the sensor for the actuating means can be processed in the block 1301 in a sense to ascertain whether or not a threshold value relating to a local resolution has been exceeded or has not been reached, i.e., whether or not the actuating means, such as a shifting lever, was moved outside of the locus of rest of a gear position so that one recognizes a shifting intent. If a threshold value has not been reached or was exceeded, there exists a shifting intent which is represented by the block 1302, and the control unit furnishes or makes available a shifting intent signal. If the threshold value is neither reached nor exceeded, there is provided an indication—see the arrow 1303—that this loop of the recognition of a shifting intent is to be repeated until terminated upon detection of the existence of a shifting intent.

If the block 1302 furnishes a signal denoting a shifting intent, the control unit actuates the adjusting element in such a way that the clutch, as indicated by the block 1304, is disengaged. The block 1305 denotes the detection of the selected gear, for example, as a result of monitoring the position of the adjusting means, and the block 1306 is indicative of the recognition whether or not an end position has been reached. Based on the recognition of the reached end position, there takes place in the block 1307 a determination whether or not the shifting operation has been completed, and the block 1308 denotes the reengagement of the clutch in response to actuation of the adjusting element.

The engagement of the clutch, as indicated by the block 1308, can take place in dependency upon the ascertained or recognized gear ratio, namely the speed of the engaging operation varies in dependency upon the selected gear ratio.

Figure 18:
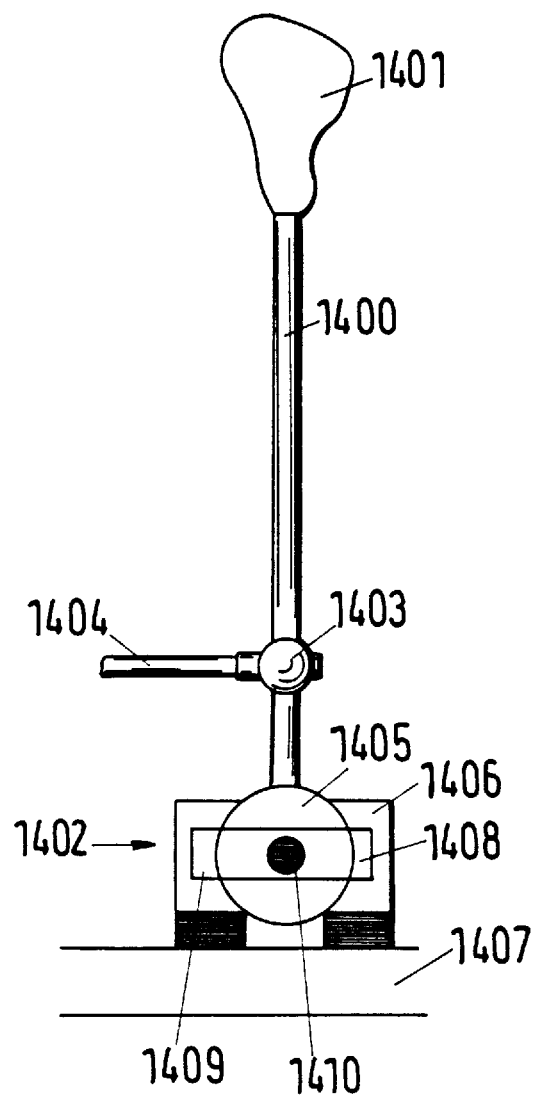
FIG. 18 an apparatus.

FIG. 18 shows an actuating means 1400, such as a lever, with a handgrip portion 1401 which is actuatable in order to select or to shift into a desired gear of the transmission. The actuating means is pivot ably mounted at 1402 so that it can perform a movement to carry out the necessary shifting- and selecting operations, and the actuating means is connected with a non-illustrated adjusting means at the transmission by way of an articulate connection in the region 1403 and by way of a connector 1404. The pivot 1402 consists essentially of a spherical or cylindrical portion 1405 which is movably mounted on a support 1407 between bearing cheeks or shells 1406 and is connected with the vehicle by a connecting means. A sensor 1408 can be disposed in such a way that it is connected with the bearing shells or cheeks 1406 in the region 1409 and is connected with the spherical or cylindrical element or portion 1405 in the region of a sensor shaft 1410 so that the sensor shaft 1410 carries out a movement in response to a movement of the actuating means 1400, i.e., one can compel or dictate a movement of the actuating means along the shifting path.

The connection between the joint for the actuating means 1400 and the sensor 1408, and more specifically the shaft of the sensor, can be established in a form-locking manner so that a shaft the cross-section of which is not exactly circular can extend into a socket or receptacle which, too, is not exactly circular but such parts permit the establishment of a form-locking connection.

Figure 19:
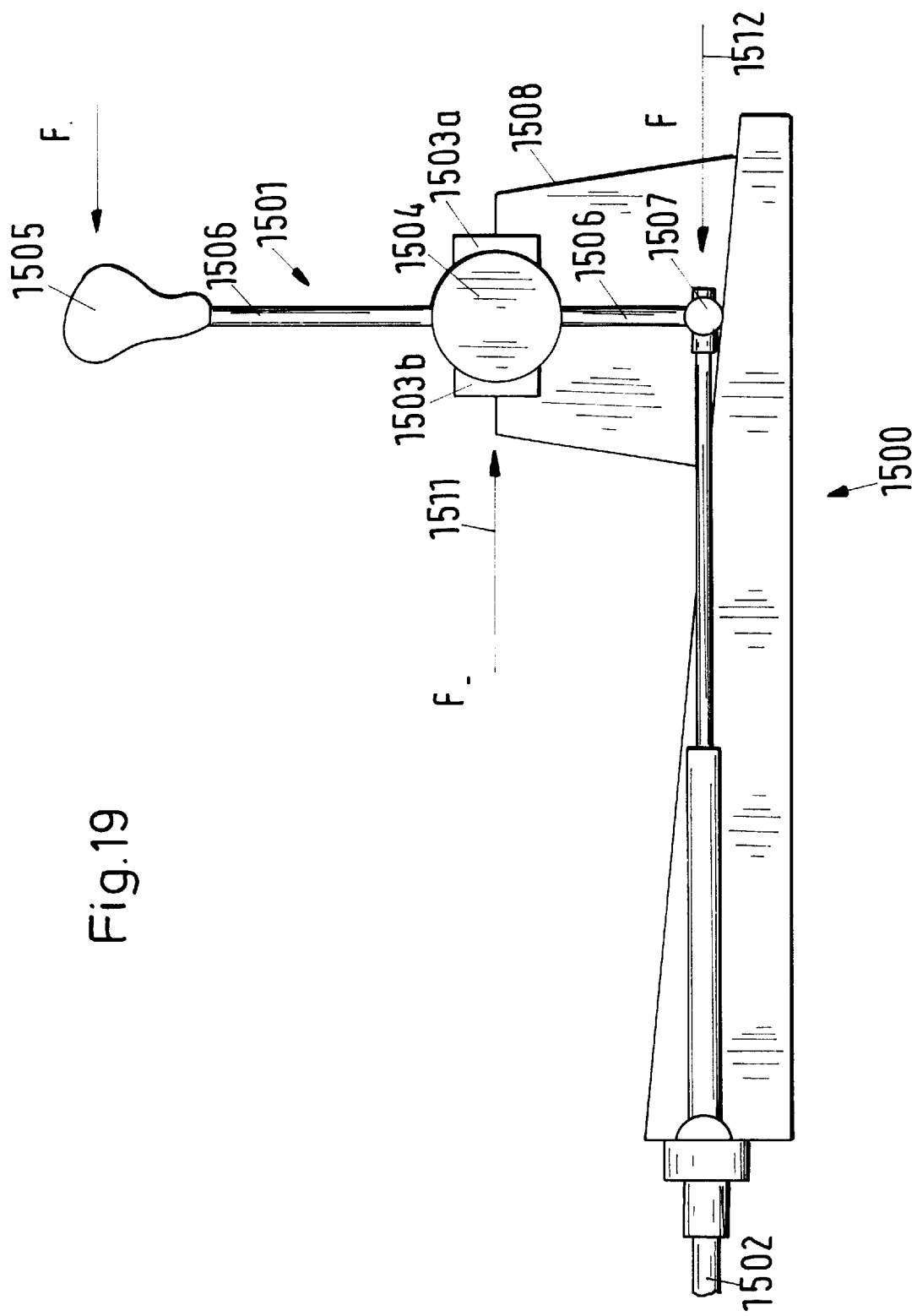
FIG. 19 an apparatus.

FIG. 19 shows a shifting support 1500 which includes an actuating means 1501 for actuation of the transmission as well as the coupling for the adjusting means for the transmission by way of a connecting means 1502. The actuating means 1501, such as a shifting lever, is pivotably mounted in a bearing which includes bearing shells or sockets 1503*a* and 1503*b*, and a spherical or cylindrical element 1504 disposed between the bearing shells 1503*a* and 1503*b*. The actuating means 1501 further comprises a handgrip portion 1505 and a linkage 1506 which constitutes a lever. In the lower region 1507, as viewed in FIG. 19, the linkage 1506 is movably connected with the connecting element 1502 by a joint. The bearing shells 1503*a* and 1503*b* maintain the actuating means 1501 in a movably journalled position and are, in turn, fixedly mounted in the vehicle by fastening means 1508.

If an actuating force F is applied to the handgrip portion 1505 of the actuating means 1501, there develops an equilibrium of forces, namely the actuating force is then in a state of equilibrium with the connecting force F acting upon the connecting means 1502 in the region of the bearing shells. The forces F, F, F are represented by arrows including the arrows 1511, 1512.

Figure 20:
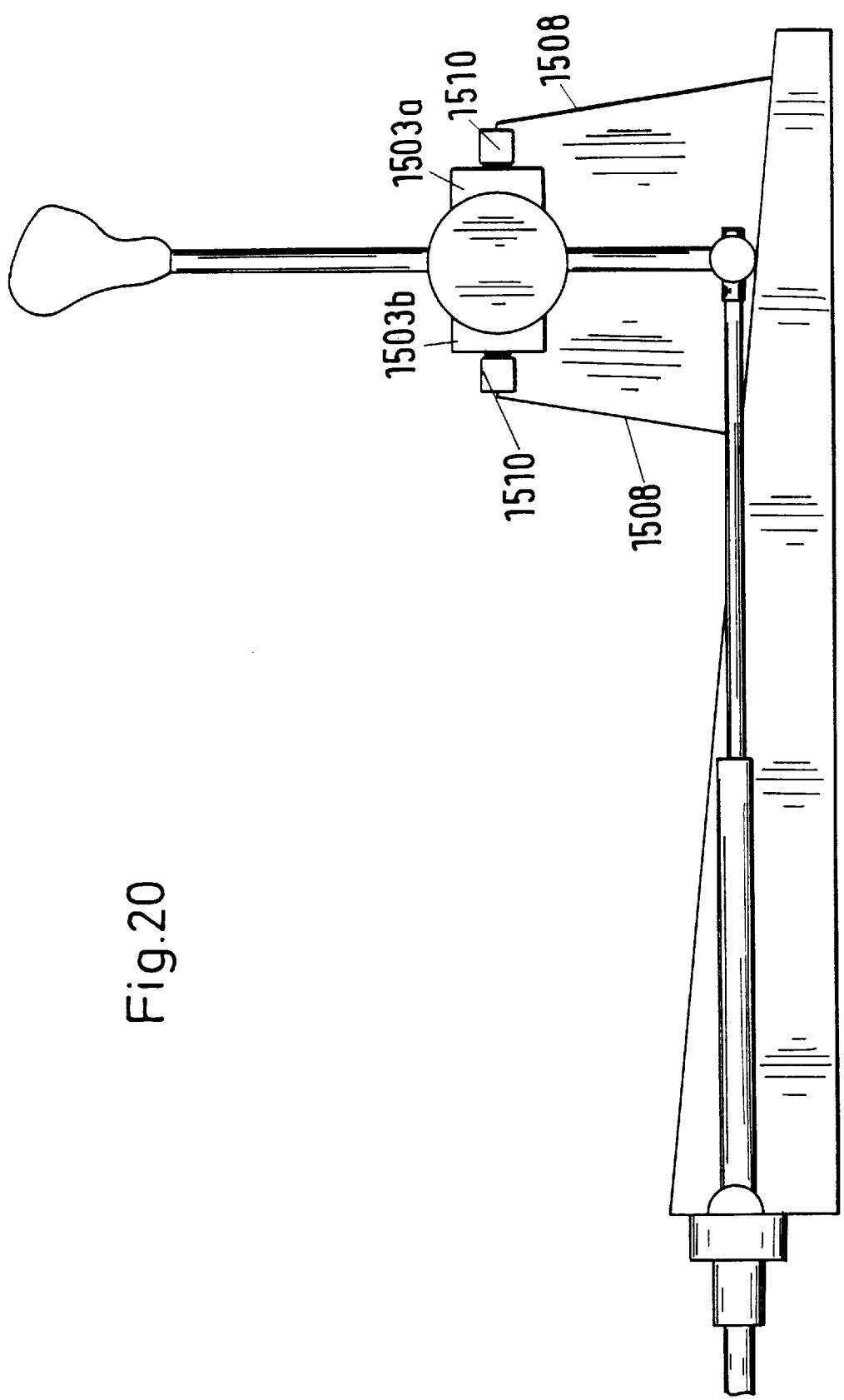
FIG. 20 an apparatus.

FIG. 20 shows an arrangement which is basically the same as that in FIG. 19 with one exception, namely that two sensors 1510 are installed between the fastening elements 1508 and the bearing shells 1503*a* and 1503*b* which sensors serve to detect or monitor the reaction force or bearing force F (see the arrow 1511 in FIG. 19) when a force is acting upon the actuating means in the region of the handgrip means of the actuating means. In this embodiment, the sensors 1510 are shown only schematically. Such sensors can constitute pressure-, force- or movement or distance monitoring sensors and their operation can be based on a capacitive, resistive, inductive or magnetoresistive principle. Still further, they can constitute Hall effect sensors or piezoelectric sensors or strain gauges.

Furthermore, the actuating force can be detected on the basis of a detected connecting force F (see the arrow 1512 in FIG. 19).

Figure 21:
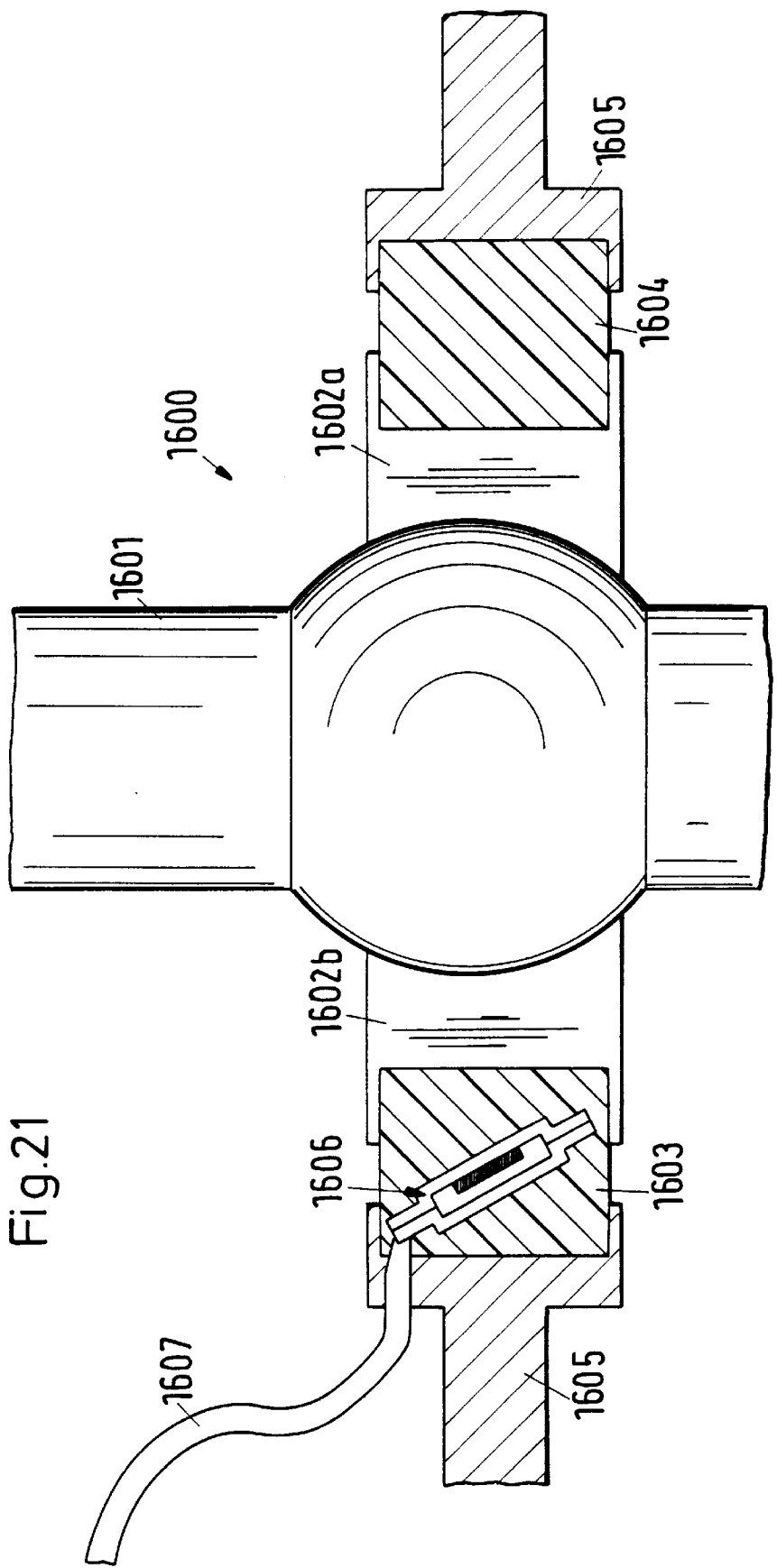
FIG. 21 a fragmentary sectional view of an apparatus.

FIG. 21 shows in partial section a detail with a spherical joint 1600 of an actuating means 1601 which is shown simply or merely in the form of a central rod, and there being further shown two bearing shells 1602*a* and 1602*b*. The bearing shells, in turn, are connected with holding means 1605 by way of resilient elements 1603 and 1604. A sensor 1606 is disposed within one of the resilient elements and serves to detect the force, such as a bearing force, acting upon the respective resilient element. If an actuating force is being applied to the actuating means, there develops a reaction force in the region of the swivel bearing and such force is detected by the sensor 1606. The sensor 1606 can respond to compressive or tensional stresses depending upon whether, when moving in the shifting direction, the actuating means 1601 is caused to move forwardly or rearwardly or, stated otherwise, whether the actuating force is being directed forwardly or rearwardly.

In the embodiment of FIG. 21, the sensor 1606 is a pressure-responsive sensor which is shown as being confined in a resilient element 1603. For example, the sensor 1606 can constitute a capacitive sensor, i.e., a change of capacity takes place in the sensor in response to stressing of the resilient element 1603. There is further shown a connecting cable 1607, and FIG. 21 also shows that a connecting cable can be fixedly installed without being compelled to share the movements of other parts because the sensor is disposed on a stationary part. This entails a reduction of stressing of the cable connection so that, in this region, the likelihood of problems such as resulting from buckling or vibrations is reduced accordingly.

Figure 22:
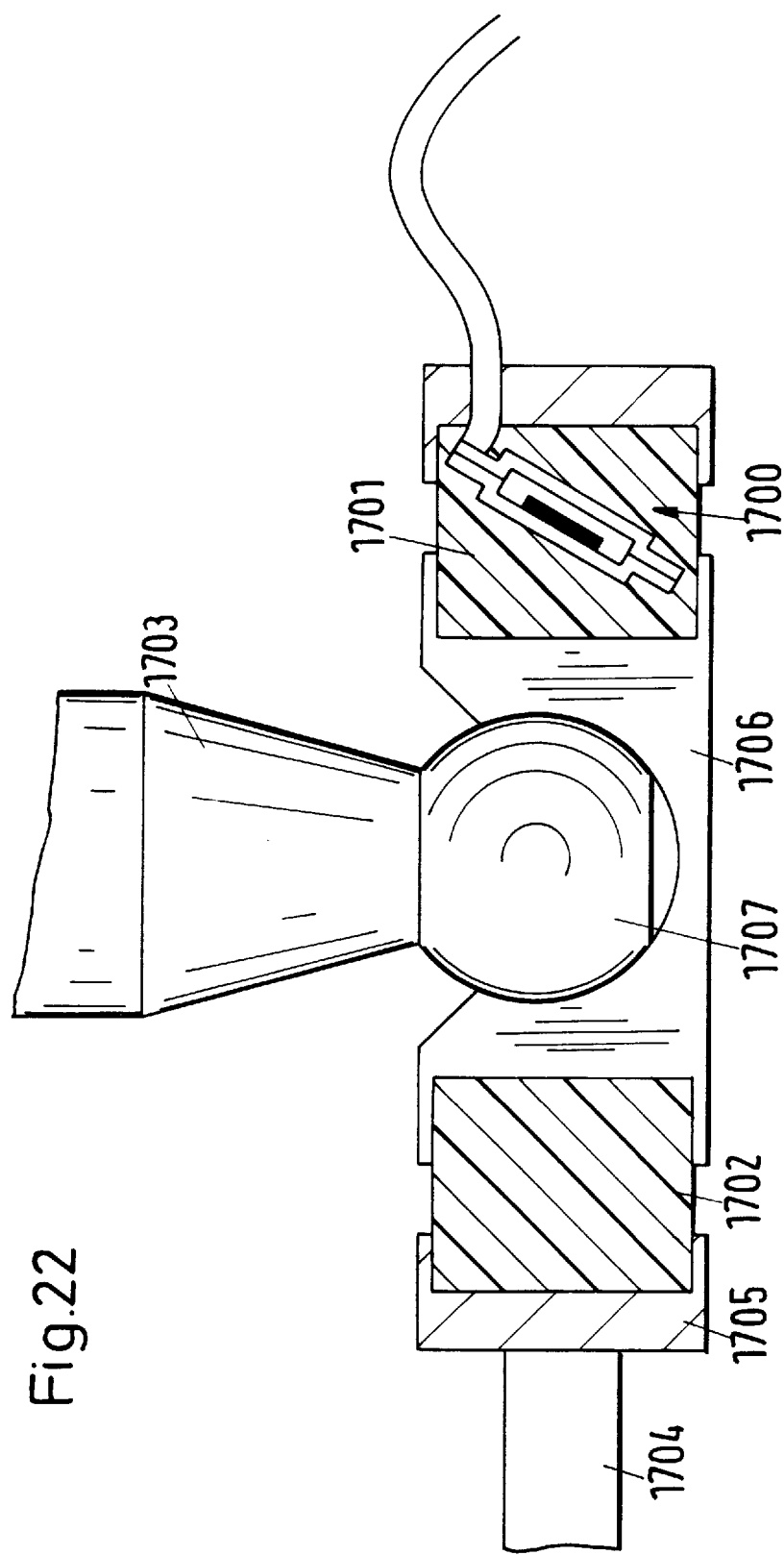
FIG. 22 a fragmentary sectional view of an apparatus.

FIG. 22 illustrates a sensor 1700 the construction of which corresponds to that of the sensor 1606 in FIG. 21 and which is installed in an elastic element 1701. In this embodiment, the elastic element 1701 and a second elastic element 1702 are disposed in the direct or indirect power flow between the pivotable connection of the actuating lever 1703 and the connecting means 1704, and this part of the articulate connection 1707 corresponds to that shown in FIG. 19. This is the region of the application of connecting force F (indicated by the arrow 1512) which acts upon the connecting means 1407, 1502. An annular element 1705 surrounds the element 1706, and the spherical joint 1707 is fitted into the element 1706. In response to the application of a connecting force, the element 1706 moves relative to the annular component 1705, and the elastic elements 1701 and 1702 are respectively stretched and compressed so that the sensor 1700 can detect the connecting force or a force which is proportional to the connecting force. Thus, the sensor 1700 of FIG. 22 or the sensor 1606 of FIG. 21 is a pressure- or force sensor within an elastic medium, such as rubber or an elastomer. When acted upon by a force, the elastic medium transmits to the sensor 1700 a force, and such force is detected by the sensor. As regards their deformation, elastomers or rubber-like components act not unlike fluids, namely if acted upon by an external force and while simultaneously partially prevented from expanding, they develop internal stresses or pressures which can be detected by the confined or even molded-in sensor, such as a pressure responsive sensor. Furthermore, it is of advantage if the sensor is surrounded by rubber or the elastomeric medium so that it is quasi hermetically confined and thus shielded from influences in the surrounding atmosphere. In installing such a sensor, it is not necessary to employ any parts in addition to the normal outlay because, as a rule, it is customary to employ in such locations elastic elements but, of course, not any elastic elements which are provided with sensors.

Furthermore, the orientation of a molded-in sensor can be selected basically at will because the measurement of pressures is relatively independent of the orientation of the sensor.

The normally employed plastic elements, such as those serving to render harmless or isolate vibrations, can be replaced by vibration absorbing or isolating elements which are provided with sensors.

The aforediscussed embodiment of an arrangement including a sensor within an apparatus for actuating a torque transmission apparatus and wherein the apparatus can carry out a shifting intent recognition exhibits the additional advantage that the installation or mounting of the sensor can be relatively simple and that the information transmitting conductors which are connected with the sensor, such as cables, need not be moved and/or deformed when in actual use. This contributes to the reliability of operation of the entire system.

In a sensor linking arrangement of the above outlined character with a sensor at the actuating means, such as a shifting lever, and with at least one sensor at the adjusting means for the transmission, and wherein the signal from the at least one sensor for the adjusting means can be transformed into a signal denoting the shifting movement and a signal denoting the selecting movement, or wherein such signal is already available in the form of two signals, an advantageous modification of the invention can be designed in such a way that the signal denoting the shifting movement or distance is evaluated for the recognition of the selected gear and the signal denoting the movement or distance covered by the actuating means in the direction of the shifting path is evaluated by the control unit for the purpose of shifting intent recognition. Thus, each of the two sensors (namely the sensor for the actuating means and the sensor for the adjusting means) can present a signal denoting the movement of a means along the shifting path.

In the event of damage to or failure of a sensor or a sensor signal, the other sensor or the other sensor signal can be used as a substitute. This means that the signal from the actuating means can be put to use for the recognition of a selected gear or the signal from the adjusting means is being put to use for the recognition of shifting intent in the event of the inability of the other sensor to perform its assigned function.

Figure 23A:
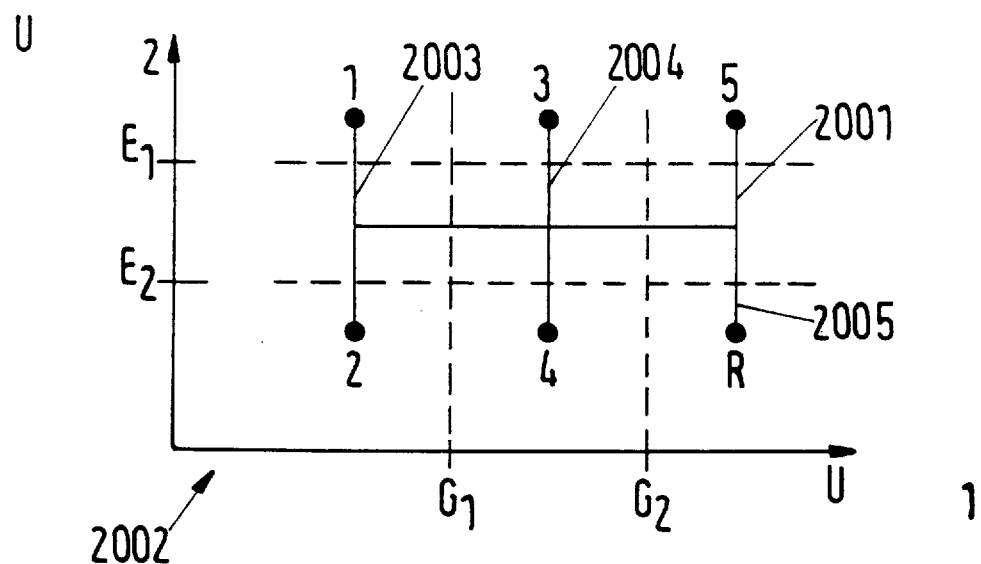
FIGS. 23a and 23b diagrams.

FIG. 23a shows a gearshift mechanism 2001 which is imaged or projected upon a coordinate system 2002 of measured values. The voltage $U_{Sensor1}$ of the sensor 1 is measured along the X-axis of the coordinate system, and the voltage or signal $U_{Sensor2}$ of the sensor 2 is measured along the Y-axis of the coordinate system. For example, the sensor 1 and the sensor 2 can constitute two sensors which are associated with the adjusting means for the transmission to detect the movements or positions of the adjusting means for the transmission along the shifting path or along the selecting path. The sensor 1 detects the selecting path and the sensor 2 detects the shifting path. The characters 1 to 5 and the letter R represent the positions of the first to fifth gears and of the reverse gear. The values G1 and G2 of the signal from the sensor 1 correspond to threshold values during changeover from a first shifting track 2003 to a second shifting track 2004 and during changeover from the shifting track 2004 to a shifting track 2005, respectively. The values E1 and E2 of the sensor signal $U_{Sensor2}$ from the second sensor, such as the sensor for the shifting movement, denote the threshold values which, when not reached or exceeded, characterize the shifting into a gear.

Figure 23B:
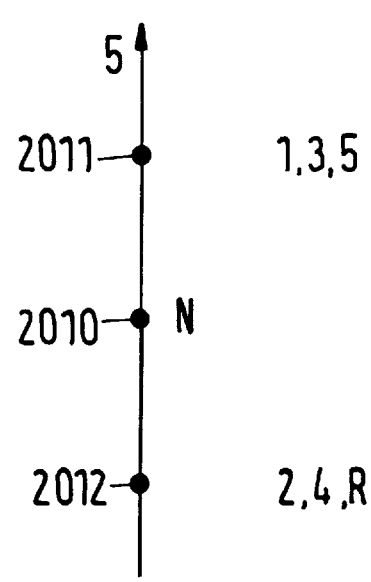

FIG. 23b shows the signal $U_{SensorS}$ from the shifting intent sensor, the neutral range being detected essentially at a central position 2010. The value 2011 denotes the selection of the gear 1, 3 or 5, and the value 2012 is indicative of one of the gears 2, 4 and reverse. In response to a movement of the actuating means, such as a shifting lever, from the gear 1 to the gear 2, the sensor signal is changed from the value 2011, through the value 2010, and to the value 2012.

Figure 24:
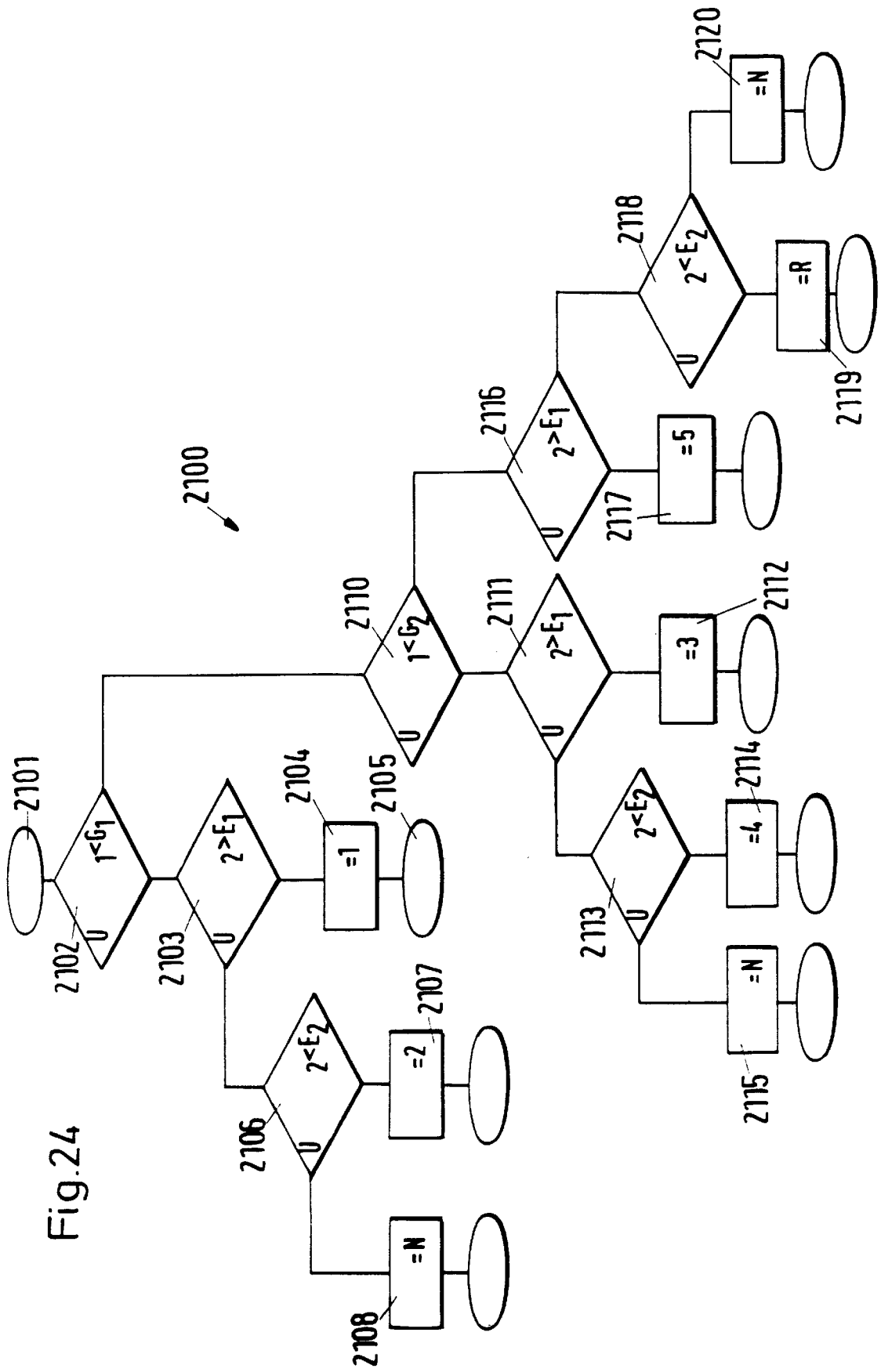
FIGS. 24 and 25 flow charts.

FIG. 24 shows a logic flow chart 2100 for the explanation of a method of recognizing the selected gear, the threshold values G1, G2 and E1 and E2 having been adopted from the FIG. 23a.

The logic flow chart 2100 begins with a start of the routine at 2101 and the sampling or interrogation at 2102 involves a determination whether or not the sensor signal $U_{Sensor1}$ is less than a threshold value G1. If this is the case, the next step involves a sampling or interrogation at 2103 whether the sensor signal $U_{Sensor2}$ from the second sensor is above the threshold value E1. If this, too, is the case, the selected gear is recognized, at 2104, as the gear 1 and the routine is terminated at 2105. If the sampling at 2103 is answered with a "No", there takes place at 2106 a sampling or interrogation whether or not the sensor signal $U_{Sensor2}$ is less than the value E2. If the sensor signal is less, the selected gear is recognized as the gear 2, as at 2107, and the routine is thereupon terminated. If the sensor signal $U_{Sensor2}$ is less than the value of E2, the actual gear is recognized as the neutral gear, namely at 2108. If the sampling at 2102 is negative, i.e., if it is answered with a "No", a further sampling or interrogation takes place at 2110 whether the signal from the sensor 1, namely the signal $U_{Sensor1}$ is below the threshold G2. If this is the case, a sampling or interrogation is performed at 2111 to ascertain whether the intensity of the signal $U_{Sensor2}$ is above the threshold E1 and, if this is answered with a "Yes", the gear 3 is recognized at 2112 and the routine is thereupon concluded. If the sampling or inquiry at 2111 is answered in the negative, a further sampling or interrogation takes place to ascertain, again, whether the signal $U_{Sensor2}$ is below E2. If this is the case, the gear 4 is recognized and the routine is thereupon terminated at 2114 or, if the sampling at 2113 is answered with a "No", the neutral gear is recognized at 2115 and the routine is thereupon concluded. If the sampling at 2110 is negative, i.e., if it is answered with a "No", a sampling is carried out at 2116 in order to ascertain whether the signal $U_{Sensor2}$ from the sensor 2 is above E1. If this is the case, the gear 5 is recognized at 2117 and the routine is thereupon concluded. If the sampling at 2116 is negative, a sampling is carried out at 2118 to ascertain whether the sensor signal $U_{Sensor2}$ is less than E2. If the sampling is answered in the positive, the reverse gear is recognized at 2119. If not, the neutral gear is recognized at 2120 and the routine is thereupon terminated.

The above method is based on the threshold values of FIG. 23a. The threshold value E1 is valid for each of the gears 1, 3 and 5, and the threshold value E2 is valid for the gears 2, 4 and reverse. It is possible to further modify the system in a simple manner by selecting a different threshold value for each of the gears, for example, as can be done by selecting them on the basis of an adaption.

Figure 25:
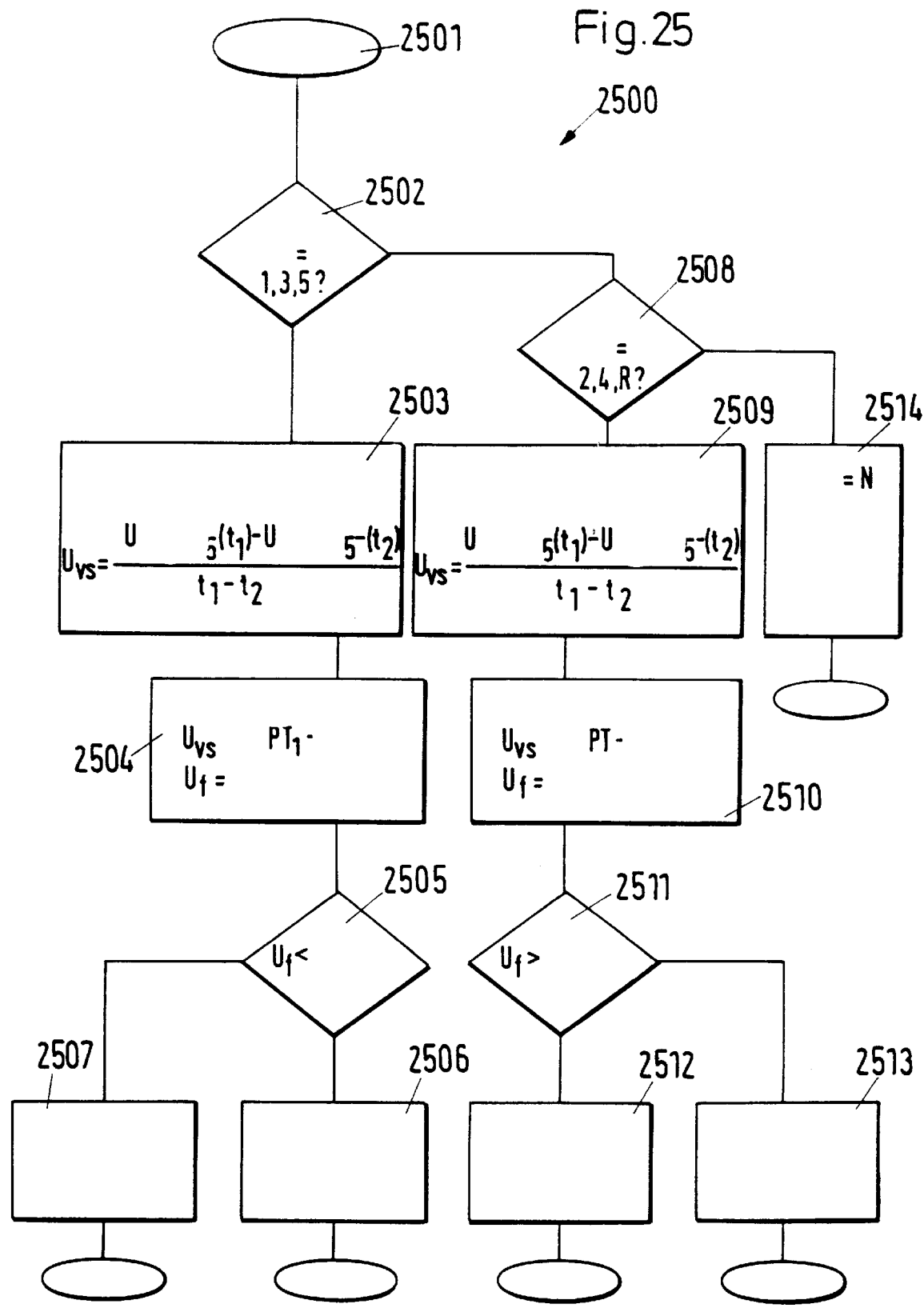

FIG. 25 illustrates a flow chart 2500 of a shifting intent recognition. One proceeds from the assumption that a gear recognition system exists and is capable of recognizing or has already recognized the gears. The flow chart 2500 illustrates the progress of a shifting intent recognition with a $PT_I$ filtering of the type already described hereinbefore. The routine is started at 2501 and a sampling or interrogation takes place at 2502 in order to ascertain whether or not the gear which has actually been selected is the gear 1, 3 or 5. If such sampling at 2502 is answered in the affirmative, the signal $U_{SensorS}$ from the sensor which signal is associated with the shifting lever and is generated at a series of successive intervals is utilized to calculate the speed $U_{VS}$ of movement of the shifting lever. The calculation of the speed is carried out in the form of a difference quotient in such a way that the sensor signals $U_{SensorS}$ furnished at two successive instants of time of signal transmission are subtracted from each other and are divided by the difference between the two successive instants of time. This is the simplest mode of calculating the speed but it is equally possible to resort to other numerical procedures or difference quotients. It is particularly possible to process the differences between the values of signals which are generated at two or three or four successive instants of time.

Thus, the calculation of the speed at 2503 furnishes a signal $U_{VS}$ which is filtered at 2504 with a $PT_I$ filter. The $PT_I$ filter exhibits a proportionally delayed behavior in a manner as already described hereinabove, the answer of a Sprung function being a signal the intensity of which increases at a constant slope and which conforms to an end value. At 2505, there takes place a sampling or interrogation in order to ascertain whether the filtered signal $U_S$, which is supplied by a filter, is below a threshold value. If the sampling is answered with a "Yes", a shifting intent is indicated at 2506 prior to termination of the routine. If the sampling at 2505 is negative, an indication is made at 2507 that no shifting intent exists.

$U_{VS}$ need not be calculated if one resorts to a speed sensor.

If the sampling at 2502 is answered in the negative, a sampling is carried out at 2508, i.e., one determines whether the actually selected gear is one of the gears 2, 4 and R. If this is the case, the speed of the shifting lever is calculated at 2509 in the same way as described with reference to 2503, namely one again resorts to a difference quotient calculation. In the next step, the speed signal is filtered at 2510 in a manner analogous to that described above with reference to 2504, and one obtains a signal $U_f$. In the next step, a sampling at 2511 ascertains whether the signal $U_f$ is above a threshold value and, if the answer is in the affirmative, identification is made at 2512 that a shifting intent does exist. If the sampling at 2511 is negative, a determination is made at 2513 that no shifting intent exists. If the sampling at 2508 is negative, i.e., if it is answered with a "No", a determination is made at 2514 that the transmission is in neutral gear and that no shifting intent exists. The determination of comparison values of filtered data with threshold values, once on the basis of a comparison for a value below the threshold and once on the basis of a comparison for a value above the threshold, takes place because, when the gear 1, 4 or 5 is selected, the shifting lever is moved in a predetermined direction, namely in a direction for example toward the gear 2 and thus the speed is determined in accordance with its direction. An inquiry is made in advance at 2511 whether the gear 2, 4 or R has been selected and, accordingly, the speed has a different direction or a different sign. Thus, one can determine by sampling whether the speed is a positive or a negative speed, namely whether the movement of the shifting lever is proper because, for example, if the gear 2 has been selected it is not proper to actuate the shifting lever in a direction other than toward the neutral range.

If an indication of the selection of the neutral gear or of the neutral range is made at 2514, this can be identified as the absence of shifting intent because, based on the control strategy, the actuated clutch is disengaged in the event of shifting into neutral gear. Consequently, it is immaterial whether a shifting intent is ascertained under such circumstances because it is quite possible to shift into a gear when the clutch is disengaged. For example, if the clutch is engaged while in neutral, a shifting intent can be detected under such circumstances and this can be carried out in accordance with the flow chart of FIG. 25 wherein the calculation of the speed and the filtering can be carried out simultaneously and a shifting intention signal can be recognized or detected as being in existence independently of the direction while the value $U_f$ is being exceeded.

The patent claims which are being filed with the application are not intended to prejudice the acquisition of broader patent protection. Applicant reserves the right to claim additional features such as, up to this time, are disclosed only in the specification and/or are shown in the drawings.

Furthermore, the invention is not limited to the embodiments which are described in the specification. On the contrary, it is possible to carry out within the framework of the invention numerous changes and modifications, particularly those modifications which can be arrived at by combining or modifying individual features and/or elements or method steps referred to in connection with the general description and the description of the illustrated embodiments.

The invention can also be practiced with advantage in situations when the shifting lever can be motorically operated by a driving arrangement so that a manual transmission is automated in that the gear shifting proceeds automatically in accordance with a program. The driving arrangement for the shifting lever can be deactivated when desired so that it is possible to operate semiautomatically (a merely automated clutch) of in a fully automatic way.

We claim:

1. Apparatus for operating a torque transmission system in a motor vehicle including a transmission having a gearshift mechanism, actuating means arranged to shift the transmission and transmission adjusting means connected with said actuating means, and a central control unit which receives and processes system parameters and measurement signals from sensors and operates said torque transmission system by way of an actuator, each of said actuating and adjusting means being movable to a plurality of different positions, at least one of said sensors being connected with said actuating means and at least one of said sensors being connected with said transmission adjusting means, said sensors respectively ascertaining the positions of said actuating and said adjusting means and the at least one sensor which is connected with said actuating means being arranged to ascertain at least one spatial dimension of the movement of said actuating means, at least one converting means being provided to transform a two-dimensional movement of said adjusting means in the shifting and selecting directions into a unidirectional movement of a mobile means, and the at least one sensor which is connected with said adjusting means by said at least one converting means being arranged to detect said unidimensional movement of said mobile means as a function of movement of said adjusting means.

2. Apparatus according to claim 1, wherein at least one of said sensors is arranged to detect at least one of the position, the speed and the acceleration of one of said actuating means and said adjusting means.

3. Apparatus according to claim 1, wherein said control unit is arranged to detect and process sensor signals as a function of time.

4. Apparatus according to claim 3, wherein said control unit is arranged to calculate time-dependent derivations of sensor signals.

5. Apparatus according to claim 1, wherein the signals which are generated by the sensors for said actuating means and said adjusting means and which denote at least one of the position, the speed and the acceleration of at least one of said actuating and adjusting means are utilized for the carrying out of a recognition of at least one of the transmission gear and a gear shifting intent.

6. Apparatus according to claim 5 wherein, based on the signals from said sensors, said control unit is arranged to ascertain that said actuating means is being operated for the purpose of shifting into a different gear and, under such circumstances of operation, said torque transmission system is operated to interrupt the transmission of torque.

7. Apparatus according to claim 6, wherein said control unit is arranged to ascertain the actual position of said adjusting means at each instant of time.

8. Apparatus according to claim 1, wherein one of said sensors is arranged to detect the position of said actuating means and two of said sensors are arranged to detect the position of said adjusting means, at least one of said two sensors being connected with said adjusting means in such a way that a two-dimensional movement of said adjusting means is transformed into a unidirectional movement of a sensor element.

9. Apparatus according to claim 8, wherein one sensor detects the position of said actuating means and two sensors detect the position of said adjusting means, each of said two sensors being arranged to select a unidimensional movement of said adjusting means.

10. Apparatus according to claim 1, wherein one sensor detects the position of said actuating means and two sensors detect the position of said adjusting means the distance-time characteristics of at least one of the detected positions, speeds and accelerations being ascertained by said control unit and being utilized for the recognition of one of the transmission gear and the shifting intent.

11. Apparatus according to claim 1, wherein one sensor is arranged to detect the position of said actuating means along a shifting path or along a gear selecting path and said control unit, with assistance from a movement-time signal transmitted by said sensor for said actuating means, is arranged to ascertain speed- or acceleration signals or filtered signals in addition to the position signal and to employ at least one of these signals for the recognition of at least one of the gear and the shifting intent.

12. Apparatus according to claim 1, wherein the position of said transmission adjusting means in the basically two-dimensional gearshift mechanism is transformed into the position of said mobile means and the position of said mobile means is detected with assistance from said sensor for said adjusting means which is connected with said mobile means, said control unit being arranged to ascertain the position of said mobile means as a function of the position of said adjusting means.

13. Apparatus for detecting the positions of movable actuating means and movable adjusting means in a vehicle with an automated clutch, said actuating means being arranged to select gears in a transmission which is shiftable into a plurality of gears and said adjusting means being arranged to shift said transmission into selected gears, said actuating means and said adjusting means being operatively connected with each other and a central control unit being provided for reception and processing of measurement signals transmitted thereto by sensors, and an actuator being provided to operate said clutch and being operable by said control unit, at least one of said sensors being connected with said actuating means to detect at least one of the position, the speed and the acceleration of said actuating means along a basically unidimensional path, at least one converting means being linked to said adjusting means to transform the position, the speed or the acceleration of said adjusting means along a basically two-dimensional path of the adjusting means into a position, speed or acceleration of a mobile means along a basically unidimensional path, at least one sensor being arranged to ascertain the position of said mobile means and said control unit being arranged to carry out a gear recognition and a shifting intent recognition on the basis of an evaluation of signals from said sensors.

14. Apparatus, particularly according to claim 13, characterized in that at least one converting means transforms a basically two-dimensional movement of the adjusting means 14 into a basically unidimensional movement of a mobile means and at least one sensor detects the basically unidimensional movement of the mobile means as a function of the movement of the adjusting means.

15. Apparatus according to claim 14, characterized in that at least one converting means transforms a basically two-dimensional translatory-rotary movement of the adjusting means 14 into a basically unidimensional rotary movement of a mobile means, and in that at least one sensor detects such movement of the mobile means.

16. Apparatus according to claim 14, characterized in that at least one converting means transforms a basically two-dimensional translatory-rotary movement of the adjusting means 14 into an essentially unidirectional translatory movement of a mobile means, and in that at least one sensor detects such movement of the mobile means.

17. Apparatus according to claim 14, characterized in that at least one converting means transforms a basically two-dimensional translatory movement of the adjusting means 14 into a basically unidimensional rotary movement of a mobile means, and in that at least one sensor detects such movement of the mobile means.

18. Apparatus according to claim 13, characterized in that at least one converting means transforms a basically two-dimensional translatory movement of the adjusting means 14 into a basically unidimensional translatory movement of a mobile means, as in that at least one sensor detects such movement of the mobile means.

19. Apparatus according to claim 13, characterized in that at least one converting means transforms a basically two-dimensional rotary movement of the adjusting means 14 into a basically unidimensional rotary or translatory movement of a mobile means, and in that at least one sensor detects such movement of the mobile means.

20. Apparatus according to claim 13, characterized in that the converting means comprises a cam disc 33 or a cam 33 and an element 34 abutting the cam disc or the cam.

21. Apparatus according to claim 13, characterized in that the converting means comprises at least one connecting means, such as a linkage or a Bowden wire, with at least one universal-, cardan- or spherical joint.

22. Apparatus, particularly according to claim 13, characterized in that the converting means which is connected with the adjusting means 14 comprises an abutment section which is contacted by a mobile means, and in that the mobile means is operatively connected with at least one sensor which detects the position of the mobile means.

23. Apparatus, particularly according to claim 13, characterized in that the mobile means which contacts the abutment section of the converting means is urged against the abutment section by elastic means.

24. Apparatus according to claim 23, characterized in that the elastic means is a spring 410*a*.

25. Apparatus according to claim 23, characterized in that the elastic means is a spring, such as a coil spring, a helical spring, a leaf spring or an elastic medium of a plastic material or a polymeric material or a synthetic plastic.

26. Apparatus according to claim 25, characterized in that the converting means comprises a portion which is connected with the adjusting means 14 and is form-lockingly connected with a mobile means, and in that the mobile means is operatively connected with a sensor.

27. Apparatus according to claim 1, characterized in that the abutment section which cooperates with the adjusting means 14 is a cam disc 33 or a cam portion 33.

28. Apparatus according to claim 27, characterized in that the abutment section which cooperates with the adjusting means 14 is a basically two-dimensional cam disc 33.

29. Apparatus according to claim 27, characterized in that the abutment section which cooperates with the adjusting means 14 is a basically three-dimensional cam portion 33.

30. Apparatus according to claim 29, characterized in that the cam disc 33 or the cam portion comprises a surface which constitutes the abutment section.

31. Apparatus according to claim 30, characterized in that the abutment section 33 is a curved surface.

32. Apparatus according to claim 1, characterized in that the abutment section 33 is an inclined surface.

33. Apparatus according to at least one of claims 1 to 30, characterized in that the abutment section 33 comprises a plurality of smaller surfaces.

34. Apparatus according to claim 33, characterized in that the abutment section 33 comprises a plurality of smaller surfaces with a gradual transition provided between the smaller surfaces.

35. Apparatus for detecting at least one of (a) selected gears and (b) selected ratios of a transmission which is shiftable into a plurality of gears, comprising at least one gear position sensors for the detection of the actual transmission gear or the actual transmission ratio of one of a plurality of gears or transmission ratios, said at least one sensor comprising a detecting first means and a second means cooperating with said first means, at least one of said first and second means being movable relative to the other of said first and second means in a first direction and in a second direction at least substantially at right angles to said first direction, one position of one of said first and second means being assigned to each gear and said first and second means cooperating to enable said first means to furnish a signal which indicates the selected gear or the position of an adjusting means relative to a gearshift mechanism, one of said first and second means comprising a cam disc, a cam portion, and a connection with joints for cooperation with a portion of the other of said first and second means, said one means being connected with said adjusting means.

36. Apparatus according to claim 35, characterized in that the cam disc 33 is a two- or three-dimensional cam disc, such as a portion of a cam.

37. Apparatus according to claim 35, characterized in that the cam disc 33 comprises surface portions which are connected to each other.

38. Apparatus according to claim 35, characterized in that the cam disc 33 has a continuous surface.

39. Apparatus, particularly according to claim 35, characterized in that a connecting means between one of the actuating means 12 and the adjusting means 14 and at least one sensor 15, 16 includes one of a linkage, a Bowden wire and a tackle line.

40. Apparatus, particularly according to claim 39, characterized in that the connecting means is connected between a sensor and one of an actuating means 12 and an adjusting means 14 by at least one mobile joint including at least one of a spherical joint, a cardan joint and a universal joint.

41. Apparatus according to claim 40, characterized in that at least one sensor 15, 16 is directly or indirectly coupled with one of an adjusting means 14 and an actuating means 12 by one of a straight-line mechanism and a restrains.

42. Apparatus according to claim 39, characterized in that at least one sensor 15, 16 is directly or indirectly coupled with one of an adjusting means 14 and an actuating means 12 by one of a straight-line mechanism and a restraint.

43. Apparatus according to claim 35, characterized in that two sensors are connected with an adjusting means 14 for the detection of gear shifting and gear selecting movements and in that each of said two sensors detects a two-dimensional movement of the adjusting means 14 by means of a unidimensional sensing element.

44. Apparatus according to claim 35, characterized in that two sensors are connected with an adjusting means for the detection of gear shifting and gear selecting movements and in that each of said sensors is operative to detect a unidimensional movement of the adjusting means 14 along one of a gear selecting path and a gear shifting path.

45. Apparatus according to claim 35, characterized in that an actuating means 12, such as a shifting lever, is connected with a sensor 15 by a linkage and in that connections including joints are provided between the sensor 15 and the linkage as well as between the linkage and the actuating means 12.

46. Apparatus according to claim 35, characterized in that at least one of a plurality of sensors, such as a sensor 16 cooperating with an adjusting means or a sensor 15 cooperating with an actuating means, is one of a rotary potentiometer and a linear potentiometer.

47. Apparatus according to claim 35, characterized in that at least one of a plurality of sensors, such as a sensor 16 cooperating with an adjusting means or a sensor 15 cooperating with an actuating means, is a contactless sensor.

48. Apparatus according to claim 35, characterized in that at least one of a plurality of sensors, such as a sensor 16 cooperating with an adjusting means or a sensor 15 cooperating with an actuating means, is one of capacitive, resistive, magnetoresistive, inductive, Hall effect and acoustic sensors, such as for example an infrared or an ultrasonic sensor or a capacitive-inductive sensor.

49. Apparatus according to claim 35, characterized in that a plurality of sensors for the detection of positions assumed by adjusting and actuating means are disposed in a housing 810 or in groups of in the form of a structural unit, and the sensors are coupled by Bowden wires or linkages.

50. Apparatus according to claim 35, characterized in that a control unit 7 processes incoming sensor signals to ascertain the existing condition on the basis of a comparison with desired values and, upon recognition of initiation of a gear shifting operation by the operator of the vehicle, disengages a clutch 4 by way of a shifting element, such as an actor, at least to such an extent that no transmission of torque can take place.

51. Apparatus according to claim 35, characterized in that a control unit 7 processes incoming signals to recognize the existing condition and to recognize, based upon signals from sensors and upon completion of a gear shifting operation by the operator of the vehicle, that the gear shifting operation is completed, and in that a clutch 4 is engaged—by means of an adjusting element, such as an actor 7a—in such a way that the clutch transmits at least a creeping torque.

52. Apparatus according to claim 51, characterized in that the gear shifting operation is considered completed upon reaching or exceeding a threshold value.

53. Apparatus according to claim 52, characterized in that the gear shifting operation is considered completed upon reaching or exceeding a threshold value and upon expiration of an interval of waiting.

54. Method of controlling a torque transmission system with a transmission having a basically two-dimensional gearshift mechanism, actuating means provided to select the ratio of the transmission, transmission adjusting means connected with said actuating means, and a central control unit which is connected with and receives signals from sensors to process the incoming signals and to transmit control signals for the operation of adjusting elements which alter the torque adapted to be transmitted by the torque transmission system, comprising the steps of connecting at least one sensor with each of said actuating means and said adjusting means to detect at least the positions of said actuating and adjusting means, detecting a two-dimensional movement of one of said actuating and adjusting means by at least one unidirectionally operating sensor and, based on the signals from said sensors, utilizing said control means to ascertain the positions, the speeds and the accelerations of said adjusting and actuating means to carry out, at least on the basis of such data, at least one of a recognition of the selected gear and a recognition of a shifting intent.

55. Method according to claim 54, characterized in that a transformation of the two-dimensional movement of one of the adjusting means 14 and the actuating means 12 into a unidimensional movement of a sensor element takes place by way of a lever, a linkage, a cam disc, a cam portion, a transmission or a Bowden wire.

56. Method according to claim 55, characterized in that at least one signal or the time-dependent progress of a signal from a sensor which is coupled to the actuating means 12 is utilized by the control unit 7 to dentify a shifting intent.

57. Method according to claim 54, characterized in that the signal transmitted by the sensor which is coupled to the actuating means 12 and denotes at least one of the position, the speed and the acceleration is utilized by the control unit 7 to identify the shifting intent.

58. Method, according to claim 54, characterized in that the position- or movement signal or a processed signal from the sensor 15 for the actuating means is compared by the control unit 7 with a reference signal and is utilized for the identification of a shifting intent.

59. Method, according to, claim 54, characterized in that the position or movement signal from the sensor for the actuating means 12 or a processed signal is utilized for the recognition of the gear.

60. Method according to claim 54, characterized in that the position- or movement-denoting signal from the sensor for the actuating means 12, or a processed signal, is utilized for the recognition of the gear in the event of a failure or a defect of the sensor 15 for the adjusting means.

61. Method, according to claim 60, characterized in that the position-, speed- or acceleration-denoting signal from the at least one sensor which is connected with the adjusting means 14 is utilized for the recognition of the gear.

62. Method, according to claim 61, characterized in that the position-, speed- or acceleration-denoting signal from the at least one sensor which is connected with the adjusting means 14 is utilized for the recognition of the gear with resort to threshold values of the shifting movement.

63. Method according to claim 62, characterized in that the position-, speed- or acceleration denoting signal from the at least one sensor 16 which is connected with the adjusting means 14 is utilized for the recognition of the gear by recognizing and adapting threshold values of the shifting movement.

64. Method according to claim 63, characterized in that the position-, speed- or acceleration denoting signal from the at least one sensor 16 which is connected with the adjusting means 14 is utilized for the recognition of shifting intent based on the recognition of threshold values of the shifting movement.

65. Method according to claim 64, characterized in that the position-, speed- or acceleration signal from the at least one sensor 16 which is connected with the adjusting means 14 is utilized for the recognition of shifting intent based on the recognition and adaption of threshold values of the shifting movement.

66. Method according to claim 65, characterized in that the position-, speed- or acceleration signal from the at least one sensor 16 which is connected with the adjusting means 14 is utilized for the recognition of the gear based on the recognition and adaption of threshold values, the threshold values varying from gear to gear.

67. Method according to claim 66, characterized in that the position-, speed- or acceleration signal from the at least one sensor 16 which is connected with the adjusting means 14 is utilized for the detection of specific physical positions of transmission parts in discrete gears.

68. Method according to at least one of claims 54 to 67, characterized in that the position-, speed- or acceleration signal from the at least one sensor which is linked to the actuating means 12 is utilized for the detection of specific physical positions of transmission parts in discrete gears.

69. Method according to claim 58, characterized in that the ascertainment of specific physical positions of transmission parts, as determined on the basis of the position-, speed- or acceleration signal from the at least one sensor at one of the adjusting means 14 and the actuating means 12, is utilized for the recognition of the gear.

70. Method according to claim 69, characterized in that the specific physical positions of transmission parts constitute at least one of the positions including a synchronizing position, a position during engagement of shifting gears, a gear idling position, a position of overcoming the detent means, and a position of the neutral range.

71. Method according to claim 63, characterized in that the position-, speed- or acceleration signal from the at least one sensor which is linked to one of the actuating means 12 and the adjusting means 14 is utilized for the determination of one of the transmission ratio and the neutral range.

72. Method according to claim 71, characterized in that in the event of a failure of or damage to a sensor, such as a sensor at the actuating means 12 or a sensor at the adjusting means 14, the control unit 7 shifts into a regulating stage in which the recognition of the gear and the recognition of the shifting intent are carried out by the non-affected sensors within the framework of an emergency operation.

73. Method according to claim 72, characterized in that the control unit 7 controls or regulates the transmissible torque.

74. Apparatus according to claim 13, further comprising means for generating at least one signal for starting said clutch, said at least one signal including a signal denoting at least one of a plurality of parameters including the RPM of an engine of the vehicle, the position of a throttle valve and the speed of the vehicle.

75. Apparatus for use in a motor vehicle having a transmission, actuating means for the selection of transmission gear and an automated torque transmission system 4 which is disposed in a torque transmission path and is operated by a control unit 7 and an adjusting element, such as an actor, an acuating means 12 for the torque transmission system being movably or pivotably mounted and being coupled by at least one connecting means with a transmission adjusting means 14, characterized in that at least one sensor which is operatively connected with one of the actuating means 12 or a bearing for the actuating means detects a reaction force which is a function of the actuating force being applied to the actuating means and the control unit 7 generates a shifting intention signal as a function of the signal from the sensor.

76. Apparatus according to claim 75, characterized in that the reaction force which is detected by a sensor in response to the application of the actuating force is detected in the region of one one of (a) the mounting of the lever of the actuating means 12 and (b) in the region of a coupling between the actuating means 12 and the connecting means.

77. Apparatus according to claim 75, characterized in that the sensor is disposed in the region of the mounting of the bearing, such as a pivot bearing, for the lever and detects the force between the actuating means 12 and the bearing.

78. Apparatus according to claim 75, characterized in that a sensor is disposed in a direct or indirect power flow between an actuating means 12 and a connecting means, and is installed in the region of a linking for the connecting means.

79. Apparatus according to claim 75, characterized in that the sensor is a pressure-, force or distance responsive sensor.

80. Apparatus according to claim 75, characterized in that the sensor is a capacitive, inductive, resistive, Hall effect, magnetoresistatt, piezo- or stretch measuring sensor.

81. Apparatus according to claim 75, characterized in that the sensor is an analog or digital sensor.

82. Apparatus according to claim 75, characterized in that the sensor is a pressure monitoring device in a resilient environment.

83. Apparatus according to claim 75, characterized in that the sensor is a force measuring sensor within a synthetic plastic element such as an element made of rubber or an elastomeric material.

84. Apparatus according to claim 75, characterized in that the sensor is disposed between a housing for a gear shifting lever and a bearing shell.

85. Apparatus for automatic actuating of a clutch which is disposed between a prime mover and a multi-stage gear transmission in a motor vehicle with a manually operable gear shift lever which is movable within a gearshift mechanism in two directions substantially at right angles to each other, with a transmission adjusting element which is connected to and is actuated by the gear shift lever and which is movable in two dimensions to determine the gear of the transmission, with sensors for the monitoring of the actuation of the gear shift lever and/or of the adjusting element as well as of operational parameters of the vehicle, a central control unit for the evaluation of signals which are generated by the sensors and for operating an actor for the clutch, characterized by a sensor arrangement which is associated with the gear shift lever to monitor the movements of the gear shift lever at least in the two possible directions substantially at right angles to each other, and a sensor arrangement which is associated with the adjusting element to monitor the movements of the adjusting element in the two dimensions of the adjusting element.

* * * * *

UNITED STATES PATENT AND TRADEMARK OFFICE
CERTIFICATE OF CORRECTION

PATENT NO.   :   5,875,679
DATED        :   November 9, 1999
INVENTOR(S)  :   Michael SALECKER et al.

It is certified that errors appear in the above-identified patent and that said Letters Patent is hereby corrected as shown below:

IN THE CLAIMS:

Claim 14, Column 44, line 38, delete "14"

Claim 15, Column 44, line 45, delete "14"

Claim 16, Column 44, line 51, delete "14"

Claim 17, Column 44, line 57, delete "14"

Claim 18, Column 44, line 63, delete "14"

Claim 19, Column 45, line 1, delete "14"

Claim 20, Column 45, line 6, delete "33" and second occurrence "33"

Claim 20, Column 45, line 7, delete "34"

Claim 22, Column 45, line 14, delete "14"

Claim 24, Column 45, line 23, delete "410a"

Claim 26, Column 45, line 30, delete "14"

UNITED STATES PATENT AND TRADEMARK OFFICE
CERTIFICATE OF CORRECTION

PATENT NO.    :   5,875,679
DATED         :   November 9, 1999
INVENTOR(S)   :   Michael SALECKER et al.

It is certified that errors appear in the above-identified patent and that said Letters Patent is hereby corrected as shown below:

Claim 27, Column 45, line 35, delete "14", "33" and second occurrence "33"

Claim 28, Column 45, line 38, delete "14" and "33"

Claim 29, Column 45, line 41, delete "14" and "33"

Claim 30, Column 45, line 43, delete "33"

Claim 31, Column 45, line 46, delete "33"

Claim 32, Column 45, line 48, delete "33"

Claim 33, Column 45, line 50, delete "33"

Claim 34, Column 45, line 53, delete "33"

Claim 36, Column 46, line 10, delete "33"

Claim 37, Column 46, line 13, delete "33"

Claim 38, Column 46, line 16, delete "33"

Claim 39, Column 46, line 19, delete "12" and "14"

UNITED STATES PATENT AND TRADEMARK OFFICE
CERTIFICATE OF CORRECTION

PATENT NO.   :   5,875,679
DATED        :   November 9, 1999
INVENTOR(S)  :   Michael SALECKER et al.

It is certified that errors appear in the above-identified patent and that said Letters Patent is hereby corrected as shown below:

Claim 39, Column 46, line 20, delete "15,16"

Claim 40, Column 46, line 24, delete "12"

Claim 40, Column 46, line 25, delete "14"

Claim 41, Column 46, line 28, delete "15,16"

Claim 41, Column 46, line 29, delete "14"

Claim 42, Column 46, line 32, delete "15,16"

Claim 42, Column 46, line 33, delete "14"

Claim 42, Column 46, line 34, delete "12"

Claim 43, Column 46, line 36, delete "14"

Claim 43, Column 46, line 39, delete "14"

UNITED STATES PATENT AND TRADEMARK OFFICE
CERTIFICATE OF CORRECTION

PATENT NO.    :    5,875,679

DATED         :    November 9, 1999

INVENTOR(S)   :    Michael SALECKER et al.

It is certified that errors appear in the above-identified patent and that said Letters Patent is hereby corrected as shown below:

Claim 45, Column 46, line 48, delete "12"

Claim 45, Column 46, line 49, delete "15"

Claim 45, Column 46, line 50, delete "15"

Claim 45, Column 46, line 52, delete "12"

Claim 46, Column 46, line 54, delete "16"

Claim 46, Column 46, line 55, delete "15"

Claim 47, Column 46, line 59, delete "16"

Claim 47, Column 46, line 60, delete "15"

Claim 48, Column 46, line 63, delete "16"

Claim 48, Column 46, line 64, delete "15"

Claim 49, Column 47, line 4, delete "810"

Claim 50, Column 47, line 7, delete "7"

UNITED STATES PATENT AND TRADEMARK OFFICE
CERTIFICATE OF CORRECTION

PATENT NO. : 5,875,679

DATED : November 9, 1999

INVENTOR(S) : Michael SALECKER et al.

It is certified that errors appear in the above-identified patent and that said Letters Patent is hereby corrected as shown below:

Claim 50, Column 47, line 11, delete "4"

Claim 51, Column 47, line 15, delete "7"

Claim 51, Column 47, line 19, delete "4"

Claim 51, Column 47, line 20, delete "7a"

Claim 55, Column 47, line 51, delete "14" and "12"

Claim 56, Column 47, line 57, delete "12"

Claim 56, Column 47, line 58, delete "7"

Claim 56, Column 47, line 58, change "dentify" to --identify--

Claim 57, Column 47, line 61, delete "12"

Claim 58, Column 47, line 66, delete "15"

Claim 58, Column 47, line 67, delete "7"

Claim 59, Column 48, line 3, delete "12"

UNITED STATES PATENT AND TRADEMARK OFFICE
CERTIFICATE OF CORRECTION

PATENT NO. : 5,875,679
DATED : November 9, 1999
INVENTOR(S) : Michael SALECKER et al.

It is certified that errors appear in the above-identified patent and that said Letters Patent is hereby corrected as shown below:

Claim 60, Column 48, line 7, delete "12"

Claim 60, Column 48, line 9, delete " 15"

Claim 61, Column 48, line 13, delete "14"

Claim 62, Column 48, line 17, delete "14"

Claim 63, Column 48, line 21, delete "16"

Claim 63, Column 48, line 22, delete "14"

Claim 64, Column 48, line 27, delete "16"

Claim 64, Column 48, line 28, delete "14"

Claim 65, Column 48, line 33, delete "16"

Claim 65, Column 48, line 34, delete "14"

Claim 66, Column 48, line 39, delete "16"

UNITED STATES PATENT AND TRADEMARK OFFICE
CERTIFICATE OF CORRECTION

PATENT NO. : 5,875,679
DATED : November 9, 1999
INVENTOR(S) : Michael SALECKER et al.

It is certified that errors appear in the above-identified patent and that said Letters Patent is hereby corrected as shown below:

Claim 66, Column 48, line 40, delete "14"

Claim 67, Column 48, line 45, delete "16"

Claim 67, Column 48, line 46, delete "14"

Claim 68, Column 48, line 51, delete "12"

Claim 69, Column 48, line 57, delete "14" and "12"

Claim 71, Column 48, line 67, delete "12"

Claim 71, Column 49, line 1, delete "14"

Claim 72, Column 49, line 5, delete "12"

Claim 72, Column 49, line 6, delete "14" and "7"

Claim 73, Column 49, line 11, delete "7"

Claim 75, Column 49, line 21, delete "4"

UNITED STATES PATENT AND TRADEMARK OFFICE
CERTIFICATE OF CORRECTION

PATENT NO. : 5,875,679          Page 8 of 8
DATED : November 9, 1999
INVENTOR(S) : Michael SALECKER et al.

It is certified that error appears in the above-indentified patent and that said Letters Patent is hereby corrected as shown below:

Claim 75, Column 49, line 23, delete "7"

Claim 75, Column 49, line 24, delete "12"

Claim 75, Column 49, line 27, delete "14"

Claim 75, Column 49, line 29, delete "12"

Claim 75, Column 49, line 32, delete "7"

Claim 76, Column 49, line 38, delete "12"

Claim 76, Column 49, line 39, delete "12"

Claim 77, Column 49, line 43, delete "12"

Claim 78, Column 50, line 3, delete "12"

Signed and Sealed this

Twenty-second Day of May, 2001

Attest:

NICHOLAS P. GODICI

*Attesting Officer*      Acting Director of the United States Patent and Trademark Office

UNITED STATES PATENT AND TRADEMARK OFFICE
CERTIFICATE OF CORRECTION

PATENT NO.     : 5,875,679
DATED          : March 2, 1999
INVENTOR(S)    : Michael Salecker et al.

It is certified that error appears in the above-identified patent and that said Letters Patent is hereby corrected as shown below:

<u>Column 46,</u>
Line 45, delete "14"

Signed and Sealed this

Thirty-first Day of December, 2002

JAMES E. ROGAN
*Director of the United States Patent and Trademark Office*